United States Patent
Lamba et al.

(10) Patent No.: US 9,224,141 B1
(45) Date of Patent: Dec. 29, 2015

(54) ENCODING A MAGNETIC STRIPE OF A CARD WITH DATA OF MULTIPLE CARDS

(71) Applicant: Square, Inc., San Francisco, CA (US)

(72) Inventors: Kartik Lamba, Berkeley, CA (US); Rodion T. S. V. Steshenko, Oakland, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/197,704

(22) Filed: Mar. 5, 2014

(51) Int. Cl.
| | |
|---|---|
| *G06Q 20/34* | (2012.01) |
| *G06K 19/06* | (2006.01) |
| *G06Q 20/20* | (2012.01) |
| *G06Q 30/02* | (2012.01) |

(52) U.S. Cl.
CPC ........ *G06Q 20/341* (2013.01); *G06K 19/06206* (2013.01); *G06Q 20/204* (2013.01); *G06Q 30/0226* (2013.01)

(58) Field of Classification Search
CPC ..... G06K 20/341; G06K 1/125; G06K 19/08; G06K 19/06206; G06K 19/12; G06Q 30/0205; G06Q 30/0226; G06Q 30/0238; G06Q 20/105; G06Q 20/204; G06Q 20/341
USPC .......................... 235/487, 492, 493, 379, 380
See application file for complete search history.

(56) References Cited

U.S. PATENT DOCUMENTS

| | | | |
|---|---|---|---|
| 5,590,038 | A | 12/1996 | Pitroda |
| 5,960,411 | A | 9/1999 | Hartman et al. |
| 6,175,922 | B1 | 1/2001 | Wang |
| 6,193,155 | B1 | 2/2001 | Walker et al. |
| 6,263,352 | B1 | 7/2001 | Cohen |
| 6,341,353 | B1 | 1/2002 | Herman et al. |
| 7,085,812 | B1 | 8/2006 | Sherwood |
| 7,155,411 | B1 | 12/2006 | Blinn et al. |
| 7,478,054 | B1 | 1/2009 | Adams et al. |
| 7,493,390 | B2 | 2/2009 | Bobde et al. |
| 7,552,087 | B2 | 6/2009 | Schultz et al. |
| 7,575,166 | B2 | 8/2009 | McNamara |

(Continued)

FOREIGN PATENT DOCUMENTS

KR     10-2006-0103089 A     9/2006

OTHER PUBLICATIONS

"Another EBay Band-Aid Fails to Fix the New Pricing Structure Flaws," dated Oct. 18, 2008, Retrieved from the Internet URL: https://thebrewsnews.wordpress.com/2008/10/18/another-ebay-band-aid-fails-to-fix-the-new-pricing-structure-flaws/, pp. 1-5.

(Continued)

*Primary Examiner* — Paultep Savusdiphol
(74) *Attorney, Agent, or Firm* — Perkins Coie LLP

(57) ABSTRACT

A method and apparatus for encoding a magnetic stripe area of a magnetic stripe card with account data from multiple cards are disclosed. The magnetic stripe card ("the card") can be associated with account data from multiple cards, such as account data from a driver's license and from various payment cards, such as a credit card, a debit card, and a pre-paid gift card. Location information indicating the location of the card can be obtained, and account data for the multiple cards associated with the card can be selected based on a criterion, such as based on the location information. The card includes a magnetic stripe emulator, and the emulator is encoded with account data of the multiple cards, such that with a single swipe of the card through a card reader, the card reader can read the account data of the multiple cards from the magnetic stripe area.

26 Claims, 21 Drawing Sheets

(56) References Cited

U.S. PATENT DOCUMENTS

| | | |
|---|---|---|
| 7,580,873 B1 | 8/2009 | Silver et al. |
| 7,805,378 B2 | 9/2010 | Berardi et al. |
| 8,190,514 B2 | 5/2012 | Bishop et al. |
| 8,266,551 B2 | 9/2012 | Boldyrev et al. |
| 8,423,459 B1 | 4/2013 | Green et al. |
| 8,459,544 B2 | 6/2013 | Casey et al. |
| 8,498,888 B1 | 7/2013 | Raff et al. |
| 8,577,803 B2 | 11/2013 | Chatterjee et al. |
| 8,602,296 B1 | 12/2013 | Velline et al. |
| 8,630,586 B2 | 1/2014 | Dvortsov et al. |
| 8,676,119 B2 | 3/2014 | Cohen et al. |
| 8,788,418 B2* | 7/2014 | Spodak et al. ............... 705/41 |
| 8,855,312 B1 | 10/2014 | Hodgman et al. |
| 8,859,337 B2 | 10/2014 | Gaul et al. |
| 8,892,462 B1 | 11/2014 | Borovsky et al. |
| 8,939,357 B1* | 1/2015 | Perry ............... 235/379 |
| 8,972,298 B2 | 3/2015 | Kunz et al. |
| 9,064,249 B1 | 6/2015 | Borovsky et al. |
| 9,092,776 B2 | 7/2015 | Dessert |
| 9,092,828 B2 | 7/2015 | Hosp |
| 2003/0061157 A1* | 3/2003 | Hirka et al. ............... 705/39 |
| 2003/0065805 A1* | 4/2003 | Barnes, Jr. ............... 709/231 |
| 2003/0115126 A1 | 6/2003 | Pitroda |
| 2004/0030601 A1 | 2/2004 | Pond et al. |
| 2004/0204990 A1 | 10/2004 | Lee et al. |
| 2004/0215520 A1 | 10/2004 | Butler et al. |
| 2004/0219971 A1 | 11/2004 | Ciancio et al. |
| 2006/0146839 A1 | 7/2006 | Hurwitz et al. |
| 2006/0261149 A1 | 11/2006 | Raghavendra Tulluri |
| 2007/0069013 A1 | 3/2007 | Seifert et al. |
| 2007/0073619 A1 | 3/2007 | Smith |
| 2007/0208930 A1 | 9/2007 | Blank et al. |
| 2007/0255653 A1 | 11/2007 | Tumminaro et al. |
| 2007/0255662 A1 | 11/2007 | Tumminaro |
| 2008/0037442 A1 | 2/2008 | Bill |
| 2008/0040265 A1 | 2/2008 | Rackley, III et al. |
| 2008/0052176 A1 | 2/2008 | Buchheit |
| 2008/0177826 A1 | 7/2008 | Pitroda |
| 2008/0270246 A1 | 10/2008 | Chen |
| 2008/0296978 A1 | 12/2008 | Finkenzeller et al. |
| 2009/0070228 A1 | 3/2009 | Ronen |
| 2009/0099961 A1 | 4/2009 | Ogilvy |
| 2009/0119190 A1 | 5/2009 | Realini |
| 2009/0159663 A1* | 6/2009 | Mullen et al. ............... 235/379 |
| 2009/0266884 A1 | 10/2009 | Killian et al. |
| 2009/0271265 A1 | 10/2009 | Lay et al. |
| 2009/0288012 A1 | 11/2009 | Hertel et al. |
| 2009/0313132 A1 | 12/2009 | McKenna et al. |
| 2009/0319421 A1 | 12/2009 | Mathis et al. |
| 2009/0319638 A1 | 12/2009 | Faith et al. |
| 2010/0010906 A1 | 1/2010 | Grecia |
| 2010/0076777 A1 | 3/2010 | Paretti et al. |
| 2010/0102125 A1 | 4/2010 | Gatto |
| 2010/0306099 A1 | 12/2010 | Hirson et al. |
| 2011/0029416 A1 | 2/2011 | Greenspan |
| 2011/0047013 A1 | 2/2011 | McKenzie, III |
| 2011/0055084 A1 | 3/2011 | Singh |
| 2011/0071892 A1 | 3/2011 | Dickelman |
| 2011/0145049 A1 | 6/2011 | Hertel et al. |
| 2011/0145052 A1 | 6/2011 | Lin et al. |
| 2011/0178883 A1 | 7/2011 | Granbery et al. |
| 2011/0180598 A1 | 7/2011 | Morgan et al. |
| 2011/0218871 A1 | 9/2011 | Singh |
| 2011/0246284 A1 | 10/2011 | Chaikin et al. |
| 2011/0251962 A1 | 10/2011 | Hruska |
| 2011/0258689 A1 | 10/2011 | Cohen et al. |
| 2011/0270747 A1 | 11/2011 | Xu |
| 2011/0276418 A1 | 11/2011 | Velani |
| 2011/0302019 A1 | 12/2011 | Proctor, Jr. et al. |
| 2011/0313840 A1 | 12/2011 | Mason et al. |
| 2011/0313867 A9 | 12/2011 | Silver |
| 2011/0313871 A1 | 12/2011 | Greenwood |
| 2012/0029990 A1 | 2/2012 | Fisher |
| 2012/0030044 A1 | 2/2012 | Hurst |
| 2012/0059718 A1 | 3/2012 | Ramer et al. |
| 2012/0059758 A1 | 3/2012 | Carlson |
| 2012/0074232 A1* | 3/2012 | Spodak et al. ............... 235/492 |
| 2012/0084210 A1 | 4/2012 | Farahmand |
| 2012/0110568 A1 | 5/2012 | Abel et al. |
| 2012/0143772 A1 | 6/2012 | Abadir |
| 2012/0150643 A1 | 6/2012 | Wolfe et al. |
| 2012/0150742 A1 | 6/2012 | Poon et al. |
| 2012/0166311 A1 | 6/2012 | Dwight et al. |
| 2012/0185355 A1 | 7/2012 | Kilroy |
| 2012/0197794 A1 | 8/2012 | Grigg et al. |
| 2012/0209749 A1 | 8/2012 | Hammad et al. |
| 2012/0214416 A1 | 8/2012 | Kent et al. |
| 2012/0254031 A1 | 10/2012 | Walker et al. |
| 2012/0271707 A1 | 10/2012 | Harrison et al. |
| 2012/0278727 A1 | 11/2012 | Ananthakrishnan et al. |
| 2012/0290609 A1 | 11/2012 | Britt |
| 2012/0296679 A1 | 11/2012 | Im |
| 2012/0296726 A1 | 11/2012 | Dessert et al. |
| 2012/0323685 A1 | 12/2012 | Ullah |
| 2013/0006773 A1 | 1/2013 | Lutnick et al. |
| 2013/0019284 A1 | 1/2013 | Pacyga et al. |
| 2013/0024341 A1 | 1/2013 | Jeon et al. |
| 2013/0041824 A1 | 2/2013 | Gupta |
| 2013/0048719 A1 | 2/2013 | Bennett |
| 2013/0050080 A1 | 2/2013 | Dahl et al. |
| 2013/0065672 A1 | 3/2013 | Gelman et al. |
| 2013/0066783 A1 | 3/2013 | Wolff |
| 2013/0103574 A1 | 4/2013 | Conrad et al. |
| 2013/0103946 A1 | 4/2013 | Binenstock |
| 2013/0117329 A1 | 5/2013 | Bank et al. |
| 2013/0124333 A1 | 5/2013 | Doughty et al. |
| 2013/0132274 A1 | 5/2013 | Henderson et al. |
| 2013/0134962 A1 | 5/2013 | Kamel et al. |
| 2013/0138563 A1 | 5/2013 | Gilder et al. |
| 2013/0144707 A1 | 6/2013 | Isaacson et al. |
| 2013/0151613 A1 | 6/2013 | Dhawan et al. |
| 2013/0159081 A1 | 6/2013 | Shastry et al. |
| 2013/0159172 A1 | 6/2013 | Kim |
| 2013/0159173 A1 | 6/2013 | Sivaraman et al. |
| 2013/0159446 A1 | 6/2013 | Carlson et al. |
| 2013/0166402 A1 | 6/2013 | Parento et al. |
| 2013/0166445 A1 | 6/2013 | Isaacson et al. |
| 2013/0173407 A1 | 7/2013 | Killian et al. |
| 2013/0179227 A1 | 7/2013 | Booth et al. |
| 2013/0181045 A1 | 7/2013 | Dessert et al. |
| 2013/0198018 A1 | 8/2013 | Baig |
| 2013/0204727 A1 | 8/2013 | Rothschild |
| 2013/0204793 A1 | 8/2013 | Kerridge et al. |
| 2013/0218721 A1 | 8/2013 | Borhan et al. |
| 2013/0225081 A1 | 8/2013 | Doss et al. |
| 2013/0246203 A1 | 9/2013 | Laracey |
| 2013/0248591 A1* | 9/2013 | Look et al. ............... 235/375 |
| 2013/0290420 A1 | 10/2013 | Nemeroff |
| 2013/0290522 A1 | 10/2013 | Behm, Jr. |
| 2013/0291018 A1 | 10/2013 | Billings et al. |
| 2013/0317835 A1 | 11/2013 | Mathew |
| 2013/0332354 A1 | 12/2013 | Rhee et al. |
| 2013/0332385 A1 | 12/2013 | Kilroy et al. |
| 2013/0339253 A1 | 12/2013 | Sincai |
| 2013/0346223 A1 | 12/2013 | Prabhu et al. |
| 2014/0006205 A1 | 1/2014 | Berry et al. |
| 2014/0012754 A1 | 1/2014 | Hanson et al. |
| 2014/0032297 A1 | 1/2014 | Germann et al. |
| 2014/0052617 A1 | 2/2014 | Chawla et al. |
| 2014/0057667 A1 | 2/2014 | Blankenship et al. |
| 2014/0058861 A1 | 2/2014 | Argue et al. |
| 2014/0067557 A1 | 3/2014 | van Niekerk et al. |
| 2014/0074569 A1 | 3/2014 | Francis et al. |
| 2014/0074655 A1 | 3/2014 | Lim et al. |
| 2014/0074658 A1 | 3/2014 | Sanchez |
| 2014/0074691 A1 | 3/2014 | Bank et al. |
| 2014/0074716 A1 | 3/2014 | Ni |
| 2014/0081783 A1 | 3/2014 | Paranjape et al. |
| 2014/0081854 A1 | 3/2014 | Sanchez et al. |
| 2014/0084059 A1* | 3/2014 | Sierchio et al. ............... 235/380 |
| 2014/0089073 A1 | 3/2014 | Jacobs et al. |
| 2014/0089078 A1 | 3/2014 | Dessert et al. |
| 2014/0096179 A1 | 4/2014 | Ben-Shalom et al. |
| 2014/0099888 A1 | 4/2014 | Flanagan et al. |

(56) References Cited

U.S. PATENT DOCUMENTS

| | | | |
|---|---|---|---|
| 2014/0100931 A1 | 4/2014 | Sanchez et al. | |
| 2014/0100973 A1 | 4/2014 | Brown et al. | |
| 2014/0101737 A1 | 4/2014 | Rhee | |
| 2014/0108245 A1 | 4/2014 | Drummond et al. | |
| 2014/0114775 A1 | 4/2014 | Cloin et al. | |
| 2014/0114781 A1 | 4/2014 | Watanabe | |
| 2014/0122345 A1 | 5/2014 | Argue et al. | |
| 2014/0129942 A1 | 5/2014 | Rathod | |
| 2014/0136318 A1 | 5/2014 | Alberth, Jr. et al. | |
| 2014/0136349 A1 | 5/2014 | Dave et al. | |
| 2014/0149282 A1* | 5/2014 | Philliou et al. | 705/39 |
| 2014/0156508 A1 | 6/2014 | Argue et al. | |
| 2014/0156517 A1 | 6/2014 | Argue et al. | |
| 2014/0164234 A1 | 6/2014 | Coffman et al. | |
| 2014/0184505 A1 | 7/2014 | Fullerton et al. | |
| 2014/0201067 A1 | 7/2014 | Lai et al. | |
| 2014/0214652 A1 | 7/2014 | Zheng et al. | |
| 2014/0249947 A1 | 9/2014 | Hicks et al. | |
| 2014/0250002 A1 | 9/2014 | Issacson et al. | |
| 2014/0254820 A1 | 9/2014 | Gardenfors et al. | |
| 2014/0278589 A1 | 9/2014 | Rados et al. | |
| 2014/0279098 A1 | 9/2014 | Ham | |
| 2015/0012426 A1 | 1/2015 | Purves et al. | |
| 2015/0032567 A1 | 1/2015 | Bhatia | |
| 2015/0066765 A1 | 3/2015 | Banks et al. | |
| 2015/0073907 A1 | 3/2015 | Purves et al. | |
| 2015/0095228 A1 | 4/2015 | Su et al. | |
| 2015/0100481 A1 | 4/2015 | Ghosh et al. | |
| 2015/0112822 A1 | 4/2015 | Aaron et al. | |
| 2015/0120418 A1 | 4/2015 | Cervenka et al. | |
| 2015/0134439 A1 | 5/2015 | Maxwell et al. | |
| 2015/0134513 A1* | 5/2015 | Olson et al. | 705/39 |
| 2015/0134528 A1 | 5/2015 | Fineman et al. | |
| 2015/0178755 A1 | 6/2015 | Barroso | |
| 2015/0194023 A1 | 7/2015 | Brackenridge et al. | |

OTHER PUBLICATIONS

"Online Shopping," dated Nov. 2, 2014, Retrieved from the Internet URL: http://en.wikipedia.org/wiki/Online_shopping, on Nov. 10, 2014, pp. 1-12.

Goode, L., "Paying with Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.

Myres, L., "What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.

Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.

U.S. Appl. No. 13/829,080, of Morgan, T.B., et al., filed Mar. 14, 2013.
U.S. Appl. No. 13/829,658, of Morgan, T.B., et al., filed Mar. 14, 2013.
U.S. Appl. No. 13/830,350, of Morgan, T.B., et al., filed Mar. 14, 2013.
U.S. Appl. No. 13/837,562, of Chin, H.C.A., et al., filed Mar. 15, 2013.
U.S. Appl. No. 14/088,141, of Maxwell, D.W., et al., filed Nov. 22, 2013.
U.S. Appl. No. 14/149,754, of Spindel, N., et al., filed Jan. 7, 2014.
U.S. Appl. No. 14/160,490, of Moring, D., et al., filed Jan. 21, 2014.
U.S. Appl. No. 14/165,256, of Aaron, P., filed Jan. 27, 2014.
U.S. Appl. No. 14/168,274, of Odawa, A., et al., filed Jan. 30, 2014.
U.S. Appl. No. 14/182,655, of Spindel, N., et al., filed Feb. 18, 2014.
U.S. Appl. No. 14/184,503, of Borovsky, A., et al., filed Feb. 19, 2014.
U.S. Appl. No. 14/189,869, of Lamba, K., et al., filed Feb. 25, 2014.
U.S. Appl. No. 14/189,880, of Aaron, P., et al., filed Feb. 25, 2014.
U.S. Appl. No. 14/208,800, of Thome, J.P., et al., filed Mar. 13, 2014.
U.S. Appl. No. 14/225,338, of Aaron, P., et al., filed Mar. 25, 2014.
U.S. Appl. No. 14/329,638, of Aaron, P., et al. filed Jul. 11, 2014.
U.S. Appl. No. 14/329,658, of Aaron, P., et al. filed Jul. 11, 2014.
U.S. Appl. No. 14/526,361, of White, M.W., et al., filed Oct. 28, 2014.
U.S. Appl. No. 14/692,655 of Borovsky, A., et al., filed Apr. 21, 2015.
U.S. Appl. No. 14/730,860, of Sasmaz, Y., et al. filed Jun. 4, 2015.
Non-Final Office Action mailed Apr. 4, 2014, for U.S. Appl. No. 14/172,842, of Borovsky, A., et al., filed Feb. 4, 2014.
Non-Final Office Action mailed Apr. 10, 2014, for U.S. Appl. No. 14/160,490, of Moring, D., et al., filed Jan. 21, 2014.
Restriction Requirement mailed Apr. 28, 2014, for U.S. Appl. No. 14/165,256, of Aaron, P., filed Jan. 27, 2014.
Non-Final Office Action mailed May 29, 2014, for U.S. Appl. No. 13/837,562, of Chin, H.C.A., et al., filed Mar. 15, 2013.
Notice of Allowance mailed Aug. 1, 2014, for U.S. Appl. No. 14/172,842, of Borovsky, A., et al., filed Feb. 4, 2014.
Non-Final Office Action mailed Aug. 27, 2014, U.S. Appl. No. 14/165,256, of Aaron, P., filed Jan. 27, 2014.
Final Office Action mailed Aug. 28, 2014, for U.S. Appl. No. 14/160,490, of Moring, D., et al., filed Jan. 21, 2014.
Advisory Action mailed Nov. 18, 2014, for U.S. Appl. No. 14/160,490, of Moring, D., et al., filed Jan. 21, 2014.
Non-Final Office Action mailed Jan. 9, 2015, U.S. Appl. No. 14/145,895, of Aaron, P., et al., filed Dec. 31, 2013.
Final Office Action mailed Mar. 17, 2015, for U.S. Appl. No. 14/165,256, of Aaron, P., filed Jan. 27, 2014.
Non-Final Office Action mailed Mar. 19, 2015, for U.S. Appl. No. 14/329,638, of Aaron, P., et al. filed Jul. 11, 2014.
Final Office Action mailed Jan. 26, 2015, for U.S. Appl. No. 13/837,562, of Chin, H.C.A., et al., filed Mar. 15, 2013.
Notice of Allowance mailed Feb. 20, 2015, for U.S. Appl. No. 14/513,076, of Borovsky, A., et al., filed Oct. 13, 2014.
Restriction Requirement mailed Apr. 9, 2015, for U.S. Appl. No. 14/225,338, of Aaron, P., et al., filed Mar. 25, 2014.
Non-Final Office Action mailed Apr. 27, 2015, for U.S. Appl. No. 14/184,503, of Borovsky, A., et al., filed Feb. 19, 2014.
Non-Final Office Action mailed May 12, 2015, for U.S. Appl. No. 14/189,869, of Lamba, K., et al., filed Feb. 25, 2014.
Non-Final Office Action mailed May 20, 2015, for U.S. Appl. No. 13/829,080, of Morgan, T.B., et al., filed Mar. 14, 2013.
Non-Final Office Action mailed May 26, 2015, for U.S. Appl. No. 14/225,338, of Aaron, P., et al., filed Mar. 25, 2014.
Non-Final Office Action mailed Jun. 11, 2015, for U.S. Appl. No. 14/692,655, of Borovsky, A., et al., filed Apr. 21, 2015.
Restriction Requirement mailed Jun. 19, 2015, for U.S. Appl. No. 14/329,658, of Aaron, P., et al., filed Jul. 11, 2014.
International Search Report and Written Opinion, for PCT Application No. PCT/US2014/058398, mailed on Dec. 24, 2014.
International Search Report and Written Opinion, for PCT Application No. PCT/US2014/058447, mailed on Jan. 15, 2015.
International Search Report and Written Opinion, for PCT Application No. PCT/US2014/072269, mailed on Mar. 31, 2015.
Non-Final Office Action mailed Jul. 2, 2015, for U.S. Appl. No. 14/208,800, of Thome, J.P., et al., filed Mar. 13, 2014.
Non-Final Office Action mailed Jul. 10, 2015, for U.S. Appl. No. 14/526,361, of White, M.W., et al., filed Oct. 28, 2014.
Restriction Requirement mailed Jul. 24, 2015, for U.S. Appl. No. 14/182,655, of Spindel, N., et al., filed Feb. 18, 2014.
Final Office Action mailed Aug. 18, 2015, for U.S. Appl. No. 14/145,895, of Aaron, P., et al., filed Dec. 31, 2013.
International Search Report and Written Opinion for PCT Application No. PCT/US2015/031423 mailed on Aug. 13, 2015.
"Tracking Inventory," PayPal, dated Jan. 4, 2010, Retrieved from the Internet URL: https://www.paypal-community.com/t5/How-to-use-PayPal-Archive/Tracking-inventory/td-p/19392, pp. 1-3.
Final Office Action mailed Sep. 17, 2015, for U.S. Appl. No. 13/829,080, of Morgan, T.B., et al., filed Mar. 14, 2013.
Final Office Action mailed Sep. 21, 2015, for U.S. Appl. No. 14/184,503, of Borovsky, A., et al., filed Feb. 19, 2014.

(56) References Cited

OTHER PUBLICATIONS

Non-Final Office Action mailed Sep. 30, 2015, for U.S. Appl. No. 14/189,880, of Aaron, P., filed Feb. 25, 2014.
Final Office Action mailed Oct. 2, 2015, for U.S. Appl. No. 14/225,338, of Aaron, P., et al., filed Mar. 25, 2014.
Non-Final Office Action mailed Oct. 5, 2015, for U.S. Appl. No. 13/829,658, of Morgan, T.B., et al., filed Mar. 14, 2013.
Final Office Action mailed Oct. 5, 2015, for U.S. Appl. No. 14/526,361, of White, M.W., et al., filed Oct. 28, 2014.
Non-Final Office Action mailed Oct. 6, 2015, for U.S. Appl. No. 14/329,658, of Aaron, P., et al. filed Jul. 11, 2014.
Non-Final Office Action mailed Oct. 8, 2015, for U.S. Appl. No. 14/149,754, of Spindel, N., et al., filed Jan. 7, 2014.
Non-Final Office Action mailed Oct. 8, 2015, for U.S. Appl. No. 14/165,256, of Aaron, P., filed Jan. 27, 2014.
Final Office Action mailed Oct. 16, 2015, for U.S. Appl. No. 14/692,655, of Borovsky, A., et al., filed Apr. 21, 2015.
Final Rejection mailed Oct. 21, 2015, for U.S. Appl. No. 14/329,638, of Aaron, P., et al. filed Jul. 11, 2014.

\* cited by examiner

ENCODING A MAGNETIC STRIPE OF A CARD WITH DATA OF MULTIPLE CARDS

BACKGROUND

Consumers today use many types of cards, such as payment cards (e.g., credit cards, debit cards, prepaid gift cards, etc.), loyalty cards, library cards, identification cards, etc., some of which are used to make purchases. Consumers also carry other objects to make purchases, such as a smart phone with a digital wallet. Some consumers find carrying such an array of cards and payment objects inconvenient and burdensome. For example, all these multiple cards may add to an overstuffed wallet or purse making it difficult to find a particular card. Consequently, when making a purchase, the consumer may pick the first payment card that he finds to pay for a purchase. In retrospect, the first found card may not be the best choice, such as when the consumer pays for a purchase using a credit card when he has a pre-paid gift card that he can use. Further, some transactions involve multiple cards, such as a purchase made at a merchant that offers a loyalty program. In such a case, the consumer may need to find two cards, such as a credit card to pay for the purchase and a loyalty card to obtain loyalty points for the purchase.

BRIEF DESCRIPTION OF THE DRAWINGS

Embodiments of the present invention will be described and explained through the use of the accompanying drawings in which.

DETAILED DESCRIPTION

Figure 1:
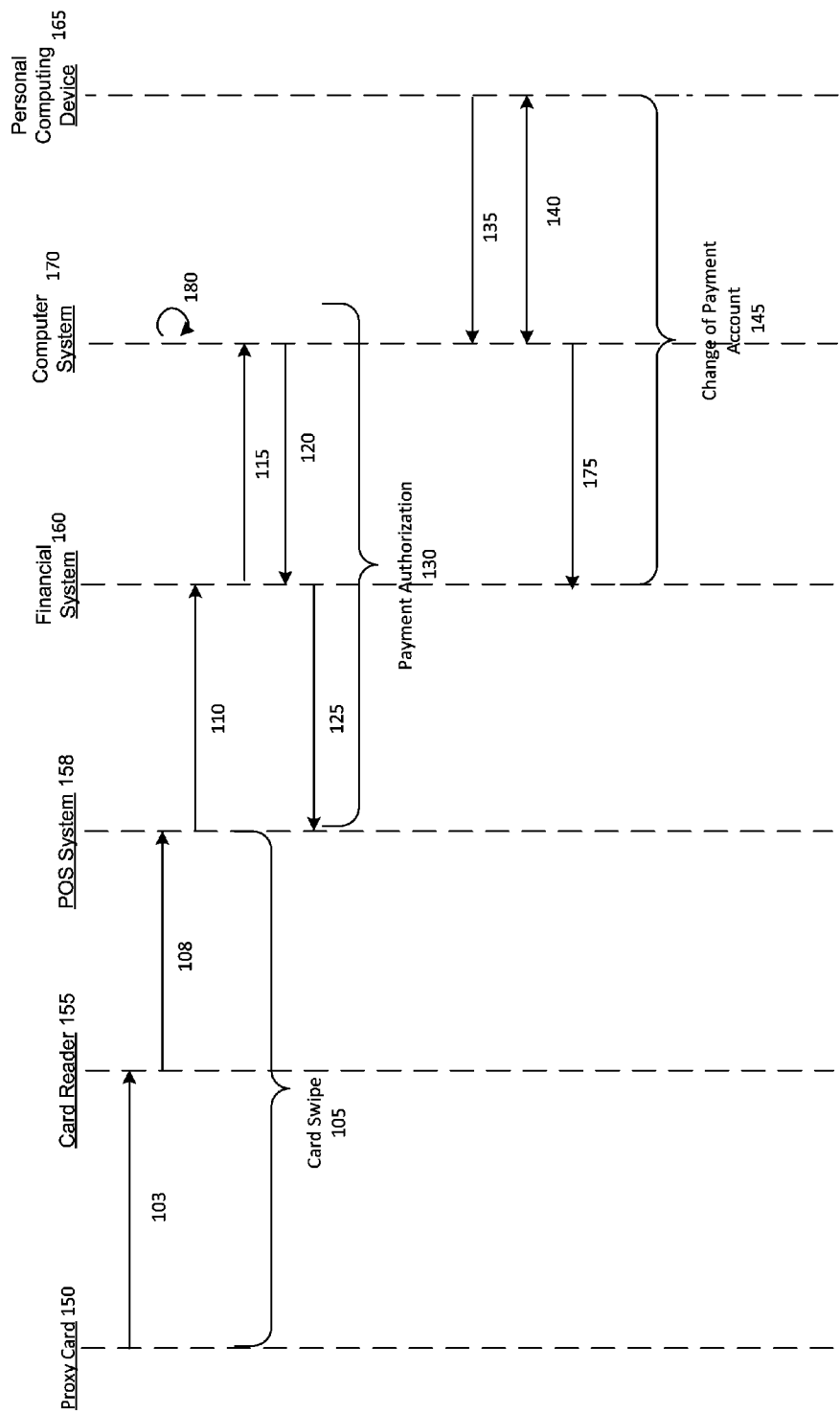
FIG. 1 is an illustration of a process for paying for a purchase using a proxy card.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

This application discloses technology related to a technique of encoding a magnetic stripe area of a magnetic stripe card with account data of multiple cards or accounts. The magnetic stripe card can be a proxy card, which is a card that can be associated with account data associated with various types of cards and accounts, such as a payment card or payment card account, an identification card, a library card, a membership card or account, etc. For example, a proxy card can be associated with account data from a driver's license, a credit account, a debit card, a pre-paid gift card, and a loyalty card, among others. The account data can be a record identifier, such as an identifier that identifies a driver's license, a passport, etc.

The consumer has access to account data of all of the multiple cards while carrying only the proxy card, and can use the proxy card for purchases and other transactions. As a result of having the proxy card, the consumer is relieved of the burden of having to carry all of his credit cards, debit cards, automated teller machine (ATM) cards, gift cards, etc. Further, the magnetic stripe area of the magnetic stripe card can be encoded such that the magnetic stripe area has account data of multiple cards at the same time. By having such an encoding, with just one swipe of the magnetic stripe card through a card reader, the card reader can read the account data of the multiple cards from the magnetic stripe area.

The cards selected for a given use can be selected based on any of various types of criteria. For example, the selection can be based a random selection, an indicated time, an indicated location, an indicated location of the magnetic stripe card, the last card selected, an indication of cards that are accepted by a merchant, an indication that a card is contextually relevant, an associated transaction, etc. Using location as an example of a criterion, when the consumer uses the magnetic stripe card, such as by swiping the magnetic stripe card through a card reader associated with a point of sale (POS) system, location information indicating the location of the magnetic stripe card can be obtained.

Account data of a first card is selected to use for the transaction based on the location information. The location can be, for example, a geographic location indicated by a global positioning satellite (GPS) coordinate. The GPS coordinate can be correlated with a merchant, and an account can be selected based on the magnetic stripe card being at the merchant. For example, an account associated with a gift card accepted by the merchant can be selected based on the geographic location being correlated with the merchant. As another example, the location can be a place of business of a merchant, as determined based on the name of the merchant involved in the transaction, and a gift card that is accepted by the merchant can be selected for the transaction based on being at the merchant.

As yet another example, the location can be a merchant that accepts a certain type of credit card, as determined based on near field communications with the POS system, in which case that certain type of credit card can be selected for the transaction. As still another example, the location can be a grocery store, as determined based on a merchant category code (MCC) that is transmitted by the POS system, in which case an account that provides for rewards points when used at a grocery store can be chosen. Examples such as these are discussed in further detail below. Other examples of identifiable locations or other criteria are also possible within the scope of this technique.

Further, account data of a second card is selected to use for the transaction based on a criterion. The criterion can be the same as that used for the selection of the first card, or it can be different. For example, the first card selected can be a payment card accepted by a merchant based on an indication that the magnetic stripe card is located at the merchant. The second card selected can be a loyalty card that earns points when used at the merchant, and the selection can be based on the indication that the magnetic stripe card is at the merchant.

The magnetic stripe area of the magnetic stripe card is encoded with account data for the payment card accepted by the merchant and with account data for the loyalty card that earns points when used at the merchant. With just a single swipe of the magnetic stripe card through a card reader of a POS system, the card reader can read the account data of both the payment card and the loyalty card from the magnetic stripe area of the magnetic stripe card. The POS system can then process the payment using the account data of the payment card, and can arrange for points for the loyalty card based on the account data of the loyalty card. This saves the consumer of the burden of having to dig through a wallet or purse to find the two particular cards that are used for the transaction. Further, the consumer does not have to go through two card swipes, and can provide the needed account data with a single swipe of the magnetic stripe card.

The term "swipe" here refers to any manner of triggering a card reader to read a card, such as passing a card through a magnetic stripe reader, smartcard reader, optical code reader, radio frequency identification (RFID) reader, etc. The terms "payment object" or "proxy object" here refer to any object that can be used to make an electronic payment, such as a mobile device via a digital wallet application. The term "card reader" here refers to any object that can be used to obtain information from an object used to make an electronic payment where the card reader must be in the general vicinity of the object, such as an optical scanner, a near field communications device, a Bluetooth communications device, etc. The term "cause" and variations thereof, as used herein, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed.

In a first illustrative use case, a consumer shops at a merchant and takes some items to a check stand. The merchant rings up the items using a POS system, and the consumer presents the magnetic stripe card to pay for the purchase. The magnetic stripe card of this example is a payment card that is similar in appearance to a credit card, but that includes a processor, non-volatile memory, a communications interface, and a magnetic stripe emulator. Accounts associated respectively with several credit cards, a debit card, a pre-paid gift card, and a loyalty card issued by Bluebonnet Bakery, are associated with the magnetic stripe card using the non-volatile memory. The magnetic stripe card obtains location information indicating the location of the magnetic stripe card by wirelessly communicating with the POS system via the communications interface. The magnetic stripe card receives, via wireless communication from the POS system, an indication that the POS system is associated with Bluebonnet Bakery, which further indicates that the magnetic stripe card, and also the consumer, are at Bluebonnet Bakery.

Because the location information indicates that the magnetic stripe card is at Bluebonnet Bakery, the magnetic stripe card selects the account data of both the pre-paid gift card and the loyalty card issued by Bluebonnet Bakery to use for the purchase. A processor in the magnetic stripe card sends at least one signal to the magnetic stripe emulator on the magnetic stripe card, in response to which the magnetic stripe emulator configures a magnetic stripe area of the magnetic stripe card to emulate a magnetic stripe encoded with the account information for the Bluebonnet Bakery pre-paid gift card, as well as the Bluebonnet Bakery loyalty card. With just a single swipe of the magnetic stripe card through the card reader of the POS system, the card reader reads the account data of both the Bluebonnet Bakery pre-paid gift card and the Bluebonnet Bakery loyalty card from the recently configured magnetic stripe area of the magnetic stripe card. The POS system processes the payment using the account associated with the Bluebonnet Bakery pre-paid gift card based on the account data, and provides for points for the Bluebonnet Bakery loyalty card based on the loyalty account data.

In a second illustrative use example, a consumer shops at a merchant and takes some items to a check stand. The merchant rings up the items using a POS system, and the consumer presents the magnetic stripe card of the first example to pay for the purchase. One of the credit cards associated with the magnetic stripe card provides for a discount when used at grocery stores and supermarkets. A second card associated with the magnetic stripe card is a loyalty card that earns points when used at a particular grocer. A mobile device of the consumer, which in this example uses Bluetooth low energy (BLE) to communicate with the magnetic stripe card, obtains location information by wirelessly communicating with the POS system via the communications interface. The mobile device receives a merchant category code (MCC) with a value of (in this example) "5411" from the POS system, and an identity of the merchant, which indicates that the merchant is the particular grocer. An MCC code of "5411" is assigned to grocery stores and supermarkets, so receipt of the MCC code of "5411" by the mobile device is an indication that the mobile device, and the magnetic stripe card using BLE to communicate with the mobile device, is located at a grocery store or a supermarket.

Based on the location information, which indicates that the magnetic stripe card is at a grocery store or a supermarket, the mobile device selects the account data of the credit card that provides for the discount when used for a purchase at a grocery store or supermarket. Based on the location information, which indicates that the identity of the merchant the particular grocer, the mobile device selects the account data of the loyalty card of the first grocer. The mobile device sends at least one message to the magnetic stripe card, in response to which the magnetic card emulator of the magnetic stripe card configures the magnetic stripe area of the magnetic stripe card to emulate a magnetic stripe encoded with the account data of the discount credit card, as well as the account data of the loyalty card. With a single swipe of the magnetic stripe card through the card reader of the POS system, the card reader reads the account data of the discount credit card, as well as the account data of the loyalty card, from the recently configured magnetic stripe area of the magnetic stripe card. The POS system processes the payment using the account data of the credit card that provides for the discount, and provides for loyalty points for the loyalty card of the particular grocer based on the loyalty account data.

In a third illustrative use example, a consumer shops at a merchant that only accepts VISA® credit cards, and that issued a loyalty card to the consumer, and takes some items to a check stand. The merchant rings up the items using a POS system, and the consumer presents a magnetic stripe card to pay for the purchase. The magnetic stripe card provides card data for the magnetic stripe card to the POS system, such as by being swiped to obtain the card data for the magnetic stripe card using a card reader associated with a POS system, or by wirelessly communicating with the POS system via the communications interface. The magnetic stripe card data and transaction information is sent to a computer system, which can be located remotely from the magnetic stripe card. The transaction information includes a merchant identification (ID) number associated with the merchant, and the computer system uses this ID number to perform a database lookup to determine the identity of the merchant, to determine that the merchant only accepts VISA credit cards, and to determine that the merchant issues loyalty cards.

The computer system determines the account data associated with the magnetic stripe card based on the magnetic stripe card data, and selects account data for a VISA credit card and for the loyalty card to use for the transaction. The VISA credit card is selected based on the location information, which indicates that the magnetic stripe card is at a merchant that only accepts VISA credit cards. The loyalty card is selected based on the location information, which indicates that the card is at the merchant that issued the loyalty card.

The computer system sends at least one message to the magnetic stripe card, such as via a cellular network, in response to which the magnetic card emulator configures the magnetic stripe area to emulate a magnetic stripe encoded with the account data of the VISA credit card, as well as the account data of the loyalty card. Consequently, with a single swipe of the magnetic stripe card through the card reader of the POS system, the card reader reads the account data of the VISA credit card and the account data of the loyalty card, from the recently configured magnetic stripe area. The POS system processes the payment using the account data of the VISA credit card and provides for loyalty points for the loyalty card of the merchant based on the loyalty account data.

In the following description, the example of a merchant selling goods to a customer is used, for illustrative purposes only, to explain various aspects of the technique. Note, however, that the technique introduced here is not limited in applicability to merchants and customers nor to the sales of goods. The technique can be utilized with essentially any transaction that traditionally would be initiated by or involve the use of a card reader. Hence, the term "sale", as in point-of-sale (POS) for example, refers to any type of payment-oriented transaction, including for example a lease, a rental, or services, and is not limited to an actual purchase. Note also that in this description the terms "customer" or "payer" generally refer to the person making the payment related to the transaction, while "merchant" or "payee" generally refer to the person receiving the payment related to the transaction.

FIG. 1 illustrates a process for paying for a purchase using a proxy card in accordance with various aspects of the disclosed technology. While the example of FIG. 1 involves paying for a purchase using a proxy card, the disclosed technology can be used to make any electronic payment, including payments for the purchase of goods, for rentals, for services, for financial transactions, etc. The example process illustrated in FIG. 1 has three phases. The first phase is card swipe 105. A consumer has proxy card 150, which in this example is a magnetic stripe card physically similar to a credit card. Multiple payment accounts are associated with proxy card 150 including several credit cards, a debit card, an automated teller machine (ATM) card, and a prepaid gift card. The payment accounts are associated with proxy card 150, such as by being linked to proxy card 150. The links can be implemented using a database that associates proxy card 150 with the payment accounts. For a discussion as to how these links may be implemented, refer to the discussion of object 250 of FIG. 2.

The consumer presents proxy card 150 to a seller to pay for a purchase. The seller executes card swipe 105, which includes step 103, in which the seller swipes proxy card 150 through card reader 155, and step 108, in which card reader 155 transmits information obtained from proxy card 150 to POS system 158, a point-of-sales (POS) system to which card reader 155 is coupled (either directly or indirectly). The term "swipe" here refers to any manner of triggering a card reader to read a card, such as passing a card through a magnetic stripe reader, smartcard reader, optical code reader, radio frequency identification (RFID) reader, etc. The term "card reader" here refers to any object that can be used to obtain information from an object used to make an electronic payment where the card reader must be in the general vicinity of the object, such as an optical scanner, a near field communications device, a Bluetooth communications device, etc.

POS system 158 then begins the second phase, which is payment authorization 130. Payment authorization 130 includes steps for obtaining an authorization for the payment and includes steps 110, 115, 120, 125, and 180. Payment authorization 130 starts with step 110. At step 110 POS system 158 initiates transmission of information associated with proxy card 150, referred to herein as the proxy card information, to financial system 160. In this example, the proxy card information includes identifying information for the proxy card and meta-data which is used to determine that proxy card 150 is a proxy card, among other purposes. POS system 158 is agnostic to what financial system 160 and proxy card 150 are. As far as POS system 158 can tell, proxy card 150 is no different than other payment cards, and sending information to financial system 160 for proxy card 150 is no different than sending information for other payment cards.

POS system 158 further transmits information associated with the purchase transaction, referred to herein as the transaction information, to financial system 160. The transaction information includes the amount of the transaction, and can further include information regarding the payee and individual line items from the transaction, among other information. At step 110, financial system 160 receives the proxy card information and the transaction information. At step 115, financial system 160 parses the meta-data and determines, based on the meta-data, to send a message to computer system 170. The message sent to computer system 170 at step 115 can include all or part of the proxy card information and the transaction information, among other information. The metadata can include data such as an IP address or a phone number that indicate where the message should be sent.

Computer system 170, upon receiving the proxy card information, accesses a database access to obtain payment account information associated with proxy card 150. At step 180, computer system 170 applies an algorithm, which in some embodiments is customized by the consumer, to select the payment account to use for the purchase transaction. At step 120, computer system 170 transmits the transaction information and the payment account information to financial system 160, and financial system 160 determines the results of payment authorization 130 using the selected payment account. If the payment account has access to adequate funds for the payment, and no other issue exists, financial system 160 determines that the result of payment authorization 130 is that the payment is authorized.

If some issue exists, such as the payment account does not have access to adequate funds for the payment or the payment account has a fraud alert, financial system 160 determines that the result of payment authorization 130 is that the payment is declined. Other results, such as declining the purchase transaction and instructing the seller to take possession of the proxy card, or additional information, such as an authorization number, can be transmitted to financial system 160 at step 120. At step 125, financial system 160 transmits the results of payment authorization 130 to POS system 158.

In some embodiments, instead of financial system 160 determining and sending the results of payment authorization 130, computer system 170 determines and sends the results of the payment authorization. Computer system 170 decides the payment authorization based on information such as the consumer's credit reports or scores and the history of past payments processed by computer system 170. Computer system 170 sends the payment authorization results to POS system 158, or to financial system 160, which relays the results to POS system 158.

At this point, assuming that the purchase transaction was authorized and the consumer accepted the purchase transaction, the purchase transaction is complete and the consumer is free to walk out of the store with the purchased items. At a later time, for example when the consumer arrives at home, the consumer can optionally start phase 3, change of payment account 145. If the consumer does not utilize this phase, financial system 160 will transfer funds for the payment from the selected payment account to an account associated with the seller. However, during this phase, the consumer can select a second different payment account from which funds to for the payment are to be obtained.

The consumer uses personal computing device 165, for example a smart phone or a laptop computer, to initiate change of payment account 145 which includes steps 135, 140, and 175. At step 135, personal computing device 165 communicates with computer system 170 to initiate change of payment account 145. At step 140, computer system 170 provides information regarding the purchase transaction to the consumer via personal computing device 165. Examples of the information provided include the date of the purchase, information regarding the seller, and the amount of the purchase. Computer system 170 further provides information regarding the payment accounts associated with proxy card 150 to the consumer via personal computing device 165. Computer system 170 has access to a database containing various information associated with proxy card 150, as well as information associated with the consumer and/or the payment accounts associated with proxy card 150.

When there are multiple payment accounts associated with proxy card 150, the consumer, using personal computing device 165, can select any payment account associated with proxy card 150 from which funds for the payment are to be obtained. At step 140, personal computing device 165 transmits information indicating the selection to computer system 170. After the selection is made, at step 175 computer system 170 transmits information related to the selection, such as identifying information for the selected payment account, to financial system 160, which causes financial system 160 to obtain funds for the purchase from the selected payment account. Computer system 170 additionally prevents the funds from being obtained from the initially selected payment account, such as by canceling the payment initially to be obtained from the initially selected payment account.

Figure 2:
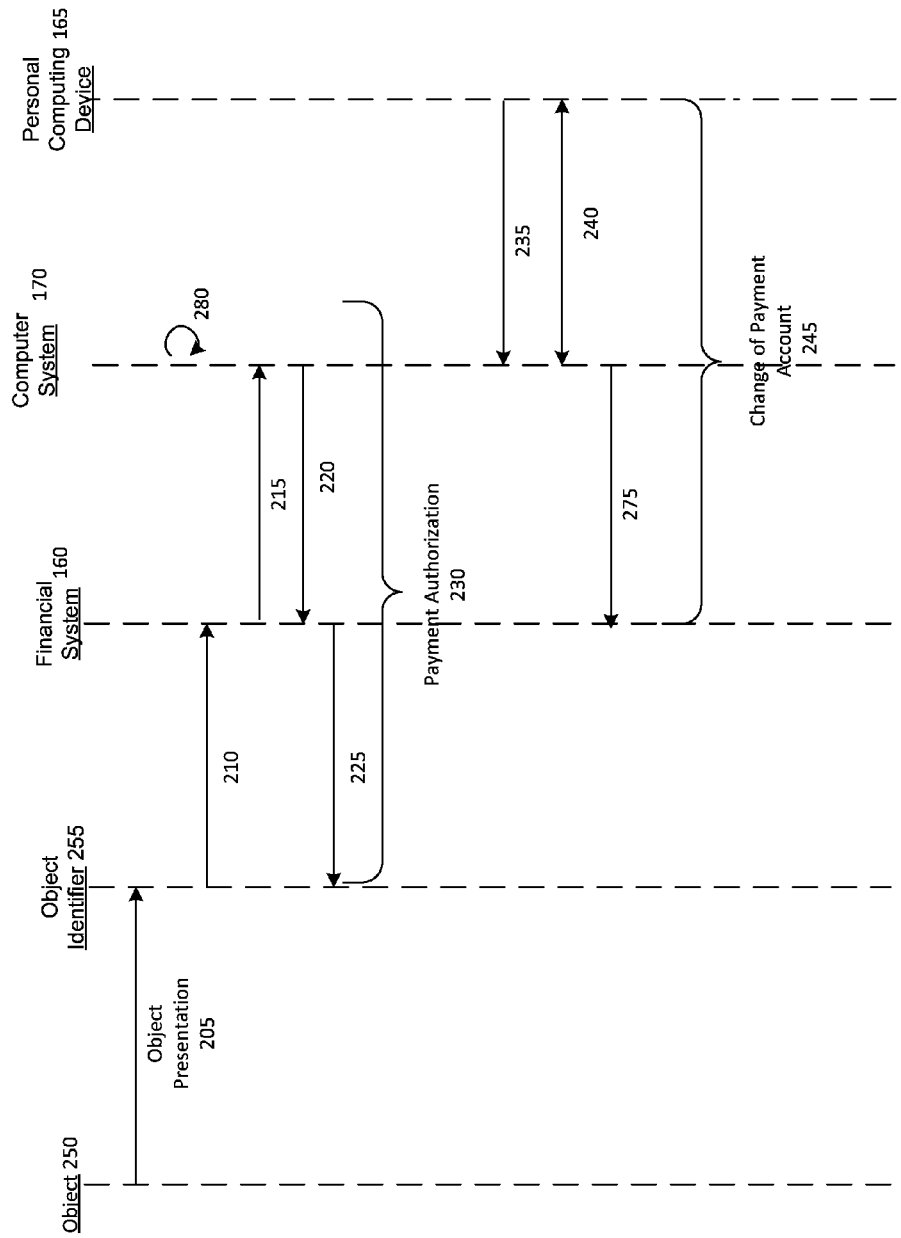
FIG. 2 is an illustration of a process for paying for a purchase using a payment object.

FIG. 2 is an illustration of a process for paying for a purchase using a payment object in accordance with various aspects of the disclosed technology. In the example illustrated in FIG. 2, the purchase process has three phases. The first phase is object presentation 205. A consumer has object 250, which is referred to herein interchangeably as a "proxy object" and a "payment object." Object 250 has associated payment accounts, and can be a proxy card with associated payment accounts. The consumer presents object 250 to the seller to pay for a purchase. Because object 250 is compatible with financial system 160, object 250 can be presented to the seller in a way that enables the seller to obtain information related to object 250 sufficient to enable initiation of payment authorization 230.

As a first example, object 250 can be proxy card 150 of FIG. 1. Object presentation 205 includes presenting the proxy card so that the proxy card can be read by object identifier 255. In this example, object identifier 255 is a POS system including a card reader in which the card reader is able to obtain information associated with object 250 (i.e., the proxy card) sufficient to initiate payment authorization 230. As a second example, object 250 can be a finger. Object presentation 205 includes presenting the finger so that the fingerprint of the finger can be read by object identifier 255. In this second example, object identifier is a biometric finger scanner capable of obtaining information related to object 250 (i.e., the finger) sufficient to enable initiation of payment authorization 230.

Object identifier 255 begins the second phase, which is payment authorization 230 and includes steps 210, 215, 220, 225, and 280. Payment authorization 230 includes the steps for obtaining authorization for the payment related to the purchase transaction. Payment authorization 230 starts with step 210. At step 210, object identifier 255 obtains object information associated with object 250. For example, a POS system can obtain proxy card information from the proxy card. Step 210 continues with the transmission of the object information to financial system 160. For example, the POS system can transmit the proxy card information to financial system 160. Information related to the purchase transaction (i.e., the transaction information), such as the amount of the purchase, is also transmitted to financial system 160.

Object identifier 255 can be, for example, a card reader which transmits the object information and the transaction information to financial system 160. Financial system 160 receives the transmitted information, and based on this information, decides to relay the transmitted information to computer system 170 for further processing. At step 215, financial system 160 relays the transmitted information, along with other information, to computer system 170.

For example, financial system 160 can receive the transmitted proxy card information, which includes meta-data, and the purchase amount. Upon receiving the proxy card information, and based on the proxy card information, financial system 160 decides to relay the transmitted information to computer system 170. At this point in time, financial system 160 does not have the information needed to complete or authorize the purchase transaction, as financial system 160 without computer system 170 is not able to determine a payment account associated with the proxy card to use for the purchase transaction.

Computer system 170, upon receiving the proxy card information, accesses a database access to obtain payment account information associated with the proxy card information. At step 280, computer system 170 applies an algorithm, which in some embodiments can be customized by the consumer, to select the payment account to use for the purchase transaction. The following are example algorithms which can additionally be used for step 180 of FIG. 1. 1) When there are multiple payment accounts associated with object 250 and until changed by the consumer or some other entity, the same one payment account is used for all payments made using object 250. 2) The payment account used can be different for each purchase transaction as well as for each line item of a purchase transaction based on a payment account selection algorithm.

For example, a consumer can use a proxy card to purchase gas and a snack item at a gas station as part of a single purchase transaction. For this purchase transaction, the payment account selection algorithm can select a gas credit card associated with the proxy card for the gas line item, and can select a VISA credit card associated with the proxy card for the snack line item. In some embodiments, the consumer can set, modify, or change the algorithm for selecting the payment account to use for a purchase transaction. In some embodiments, the algorithm is based on inputs received from the consumer.

At step 220, computer system 170 transmits the transaction information and the payment account information to financial system 160, and financial system 160 determines the results of payment authorization 230 using the selected payment account. If the payment account has access to adequate funds for the payment, and no other issue exists, financial system 160 determines that the result of payment authorization 230 is that the payment is authorized.

If some issue exists, such as the payment account does not have access to adequate funds for the payment or the payment account has a fraud alert, financial system 160 determines that the result of payment authorization 230 is that the payment is declined. Other results, such as declining the purchase transaction and instructing the seller to take possession of the proxy card, or additional information, such as an authorization number, can be transmitted to financial system 160 at step 220. At step 225, financial system 160 transmits the results of payment authorization 230 to object identifier 255.

In some embodiments, instead of financial system 160 determining and sending the results of payment authorization 230, computer system 170 determines and sends the results of the payment authorization. Computer system 170 decides the payment authorization based on information such as the consumer's credit reports or scores and the history of past payments processed by computer system 170. Computer system 170 can send the payment authorization results to object identifier 255, or can send the results to financial system 160, which can relay the results to object identifier 255.

At this point, assuming that the purchase transaction was authorized and the consumer accepted the purchase transaction, the purchase transaction is complete and the consumer is free to walk out of the store with the purchased items. At a later time, for example when the consumer arrives at home, the consumer can optionally start phase 3, change of payment account 245. If the consumer does not utilize this phase, financial system 160 will transfer funds for the payment from the selected payment account to an account associated with the seller. However, during this phase, the consumer can select a second different payment account from which funds for the payment are to be obtained.

The consumer uses personal computing device 165, for example a smart phone or a laptop computer, to initiate change of payment account 245, which includes steps 235, 240, and 275. At step 235, personal computing device 165 communicates with computer system 170 to initiate change of payment account 245. At step 240, computer system 170 provides information regarding the purchase transaction to the consumer via personal computing device 165. Examples of the information provided include the date of the purchase, information regarding the seller, and the amount of the purchase. Computer system 170 further provides information regarding the payment accounts associated with object 250 to the consumer via personal computing device 165. Computer system 170 has access to a database containing various information associated with object 250 as well as associated with the consumer and the payment accounts associated with object 250.

When there are multiple payment accounts associated with object 250, the consumer, using personal computing device 165, can select any payment account associated with object 250 from which funds for the payment are to be obtained. At step 240, personal computing device 165 transmits information indicating the selection to computer system 170. After the selection is made, at step 275 computer system 170 transmits information related to the selection, such as payment account information, to financial system 160. This causes financial system 160 to obtain funds for the payment from the selected payment account. Computer system 170 additionally prevents the funds from being obtained from the initially selected payment account, such as by canceling the payment from the initially selected payment account. The funds can correspond to the amount of the purchase, the amount of a line item, the amount of multiple line items, or some other amount corresponding to the purchase, and can be transferred to an account associated with the seller. The funds transferred can correspond to an amount by being for the amount less a transaction fee. Further, purchase transactions can be batched, and the funds can be for an amount corresponding to the amount of the batch of purchase transactions.

Object 250 is compatible with financial system 160. In various embodiments, object 250 can be a magnetic stripe card, a smart card, a proximity card, a re-programmable magnetic stripe card, an card containing an optical code such as a quick response (QR) code or a bar code, or a biometrically identifiable object, such as a finger, a hand, an iris, a retina, or a face, among others. Object 250 can be associated with various payment objects and payment object accounts, including accounts associated with credit cards, charge cards, ATM cards, debit cards, pre-paid credit cards, pre-paid debit cards, gift cards, pre-paid gift cards, stored value cards, and fleet cards, among others. The payment accounts can be associated with object 250 by, for example, being linked to object 250. The link can be implemented, for example, using a database which links object 250 with the payment accounts.

In an embodiment, object 250 is a proxy card implemented as a magnetic stripe card similar to a credit card. The proxy card has an account number similar to a credit card, but, unlike a credit card or debit card, the account number is not linked to a particular bank or credit union. Instead, swiping the proxy card, as one would swipe a credit card, triggers the sending of transaction information and proxy card information to a secondary payment processor. The secondary payment processor creates and maintains a database that links the proxy card with the payment accounts. A customer can link various payment card accounts with the proxy card by logging in to a website associated with the secondary payment processor, and entering information into the website that enables the link. For example, the account number of the proxy card and the account number of a payment card can be entered, and the secondary payment processor can link the two.

Linking can be done by taking photos of the proxy card and the payment card and sending the photos to the secondary payment processor, which can obtain the information needed to link the cards from the photos. The photos can be taken by a mobile device, and an application running on the mobile device can send the photos to the secondary payment processor. Linking can be done by swiping the two cards through a card reader connected to the customer's mobile device, and sending the data obtained by the card reader to the secondary payment processor. An application running on the mobile device can obtain the information for the two card from the card reader, and can send the data obtained by the card reader to the secondary payment processor.

In some embodiments, the proxy card has a visible number on its face, similar to a credit card. In some embodiments, the proxy card has no visible number. In an embodiment with no visible number, information for the proxy card is obtained from the magnetic stripe of the proxy card. In some embodiments, information for the proxy card is obtained via Bluetooth Low Energy (BLE), near field communications (NFC), or other contactless payment mechanism embedded in the proxy card that triggers payment using a POS system.

Further, object 250 can be associated with loyalty programs, wherein the loyalty programs are another type of payment account which can be used to make the purchase. In some embodiments, object 250 can be a mobile device. Examples of mobile devices include smart phones, tablets, portable media devices, wearable devices, laptops, and other portable computers. In some embodiments, when object 250 is a mobile device, the mobile device includes a digital wallet application that triggers payment using a POS system.

Object identifier 255 can obtain information associated with object 250, where the information is part of the object information. In embodiments where object 250 is a magnetic stripe card or a re-programmable magnetic stripe card, object identifier 255 can read the magnetic stripe. In embodiments where object 250 is a smart card, object identifier 255 can communicate with the smart card to obtain information related to object 250. In embodiments where object 250 is a proximity card, object identifier 255 can cause the proximity card to transmit information associated with the proximity card, such as a radio frequency identification (RFID), which object identifier 255 can receive. In embodiments where object 250 is a card with an optical code such as a QR code or bar code, object identifier 255 can obtain the optical code, for example, by scanning the optical code. In embodiments where object 250 is a mobile device, object identifier 250 can communicate with the mobile device to obtain information related to object 250, such as via 3G, 4G, WiFi, Bluetooth, or BLE. Object identifier 255 can further transmit the object information to financial system 160.

Object identifier 255 can further include a sales system, such as POS system 158 of FIG. 1. Examples of sales systems include point-of-sale (POS) systems, cash registers, computer systems running sales applications including mobile devices running sales applications, cloud based POS systems, checkout registers, computer systems running internet based applications such as a web browser, and the like.

In embodiments where object 250 is a biometrically identifiable object, such as a finger, a hand, an iris, a retina, or a face, object identifier 255 can identify the biometrically identifiable object or can obtain information from the biometrically identifiable object and can transmit that information to a computer system that can use the information to identify the biometrically identifiable object. For example, when the biometrically identifiable object is a finger, object identifier 255 can obtain data related to the fingerprint of the finger. In some embodiments, object identifier 255 can recognize the fingerprint to identify the finger (e.g., this is the finger of Jane Doe). For example, object identifier 255 can include a biometric scanner coupled to a computer system such as a POS system, wherein the biometric scanner can scan the consumer's fingerprint, can transmit the biometric scan results to the computer system to which the biometric scanner is coupled, and the computer system can use the consumer's fingerprint to identify the finger. In other embodiments, object identifier 255 can transmit the data related to the fingerprint to a second computer system, for example, to a compute server associated with the seller, to financial system 160, to computer system 170, or to another computer system, and the second computer system can use the transmitted fingerprint data to identify the finger. The second computer system can transmit identifying information associated with the finger to object identifier 255, where the identifying information is part of the object information. Object identifier 255 can further transmit the object information to financial system 160.

In embodiments where object 250 is a mobile device, object identifier 255 can obtain identifying information associated with the mobile device. In one example where object 250 is a smart phone, object identifier 255 can communicate with the smart phone via 3G to obtain identifying information related to a digital wallet associated with the smart phone, where the identifying information is part of the object information. Object identifier 255 in various embodiments can communicate with the mobile device via WiFi, 3G, 4G, Near Field Communication (NFC), or Bluetooth, or can obtain an optical code such as a QR code or a bar code or any machine readable code from the mobile device, for example, by scanning an optical code displayed by the mobile device. Object identifier 255 can further transmit the object information to financial system 160.

Personal computing device 165 can be a mobile device. Examples of mobile devices include smart phones, tablets, portable media devices, wearable devices, laptops, and other portable computers. Personal computing device 165 can further be a non-portable computer, such as a desktop computer.

Object 250 can be associated with multiple payment accounts, and a loyalty program can be a payment account. A seller may be motivated to encourage certain behaviors in consumers. For example, the seller may want the consumer to return to the seller's store, or to purchase a certain item, or to return to the store at a certain time or during a certain time window and make a purchase. To encourage behaviors such as these, a seller can participate in or offer a loyalty program. The seller can provide loyalty points or some equivalent for each purchase made by a consumer. By coming back to the seller's store and making additional purchases, the consumer can grow his loyalty points. The loyalty points can be redeemed for purchases made at the seller's store or another of the seller's stores or with other businesses that participate in the loyalty program.

In addition to encouraging loyalty to a store or a brand by providing loyalty points for purchases made at the store or for brand products, a seller can use the loyalty program to encourage other behaviors. For example, if the store has a slow period, such as a coffee shop is slow between 3 pm and 4 pm, the store owner can, in order to give consumers incentive to make purchases at the store during this slow time, offer increased loyalty points for purchases made between 3 pm and 4 pm at the store. The store owner can also offer increased redemption value for a consumer's loyalty points, or can lower the cost of products or services in terms of loyalty points, during this time window. For example, the store owner could offer to redeem 100 loyalty points and provide 150 points of value, or could reduce an item that normally costs 150 loyalty points to 100 loyalty points, for purchases made between 3 pm and 4 pm. As another example, if a business owner wants to encourage consumers to purchase a new item that the business owner is introducing, the business owner can offer increased loyalty points to consumers for purchasing this new item. The business owner can also offer increased loyalty point redemption value or reduced loyalty point costs to a consumer for purchasing this new item using loyalty program points. For example, if the new item can be normally purchased with 150 loyalty points, the business owner can offer 150 points of loyalty program value for 100 redeemed loyalty points to a consumer for purchasing this new item, or the business owner can reduce the cost of the new item to 100 loyalty points.

Figure 3A:
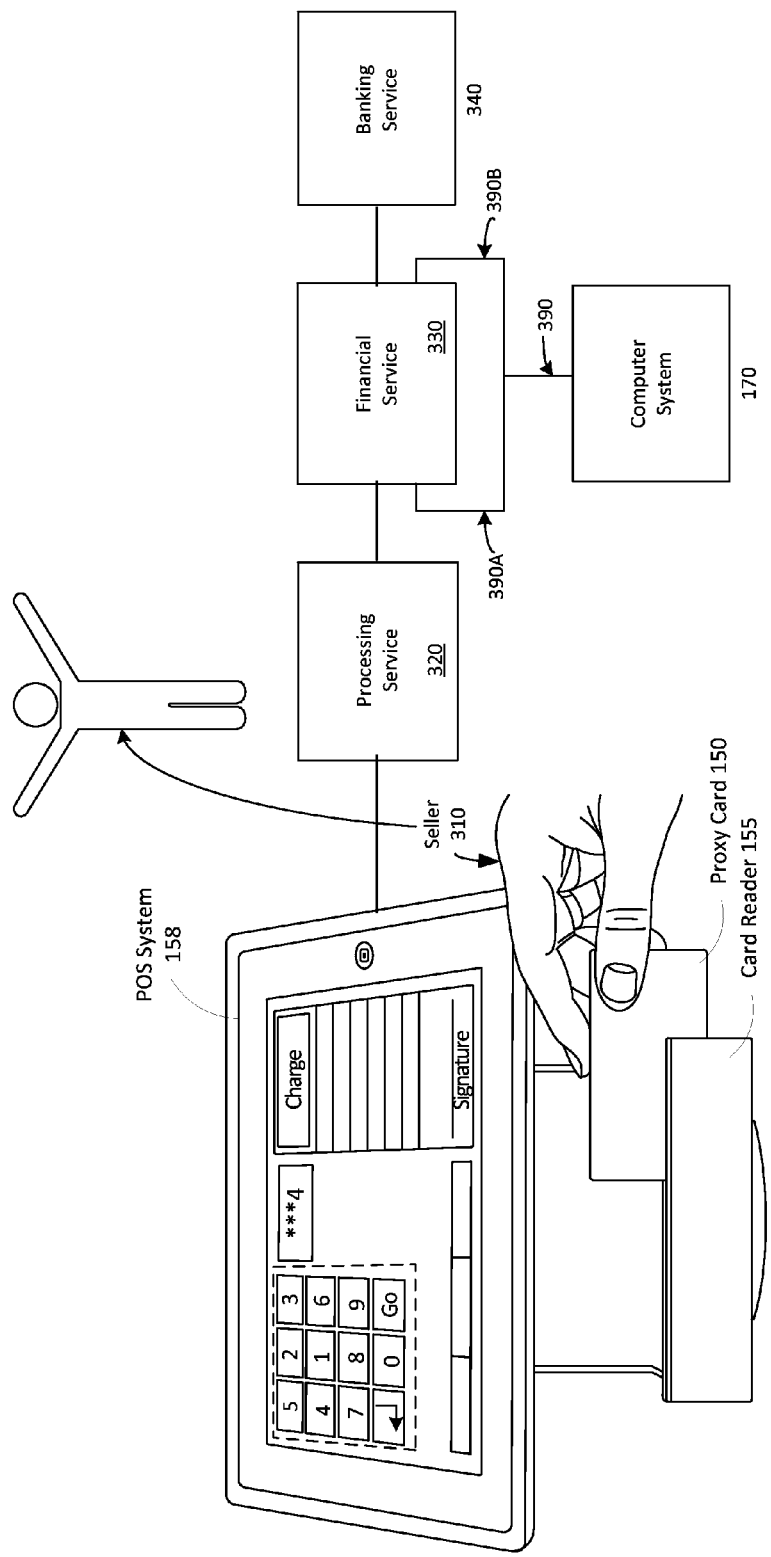
FIG. 3A is an illustration of a subset of components of or associated with a first embodiment of a financial system for processing financial transactions and associated fund transfers.
Figure 5A:
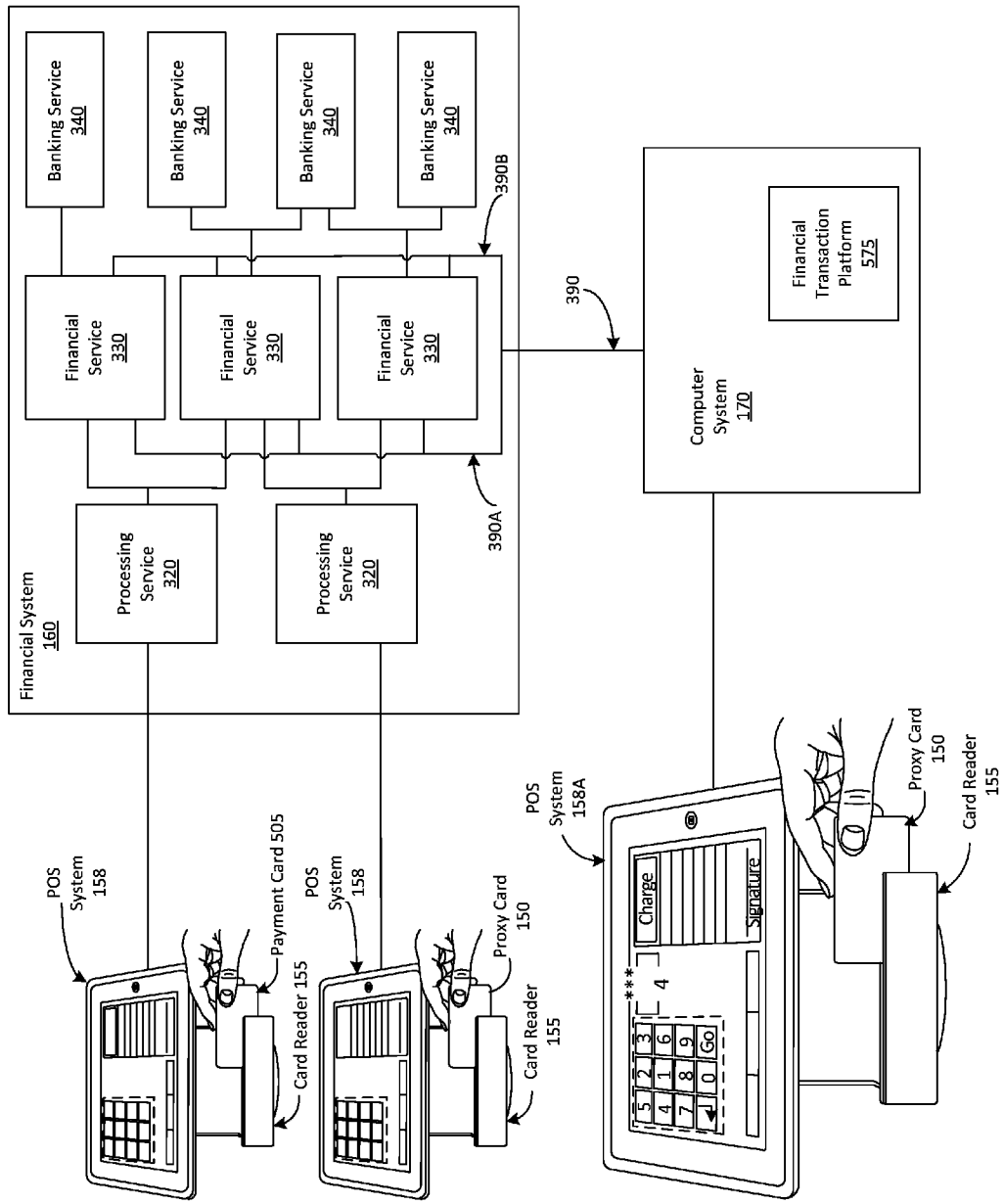
FIG. 5A is an illustration of components of or associated with a first embodiment of a financial system for processing financial transactions and associated fund transfers.
Figure 5B:
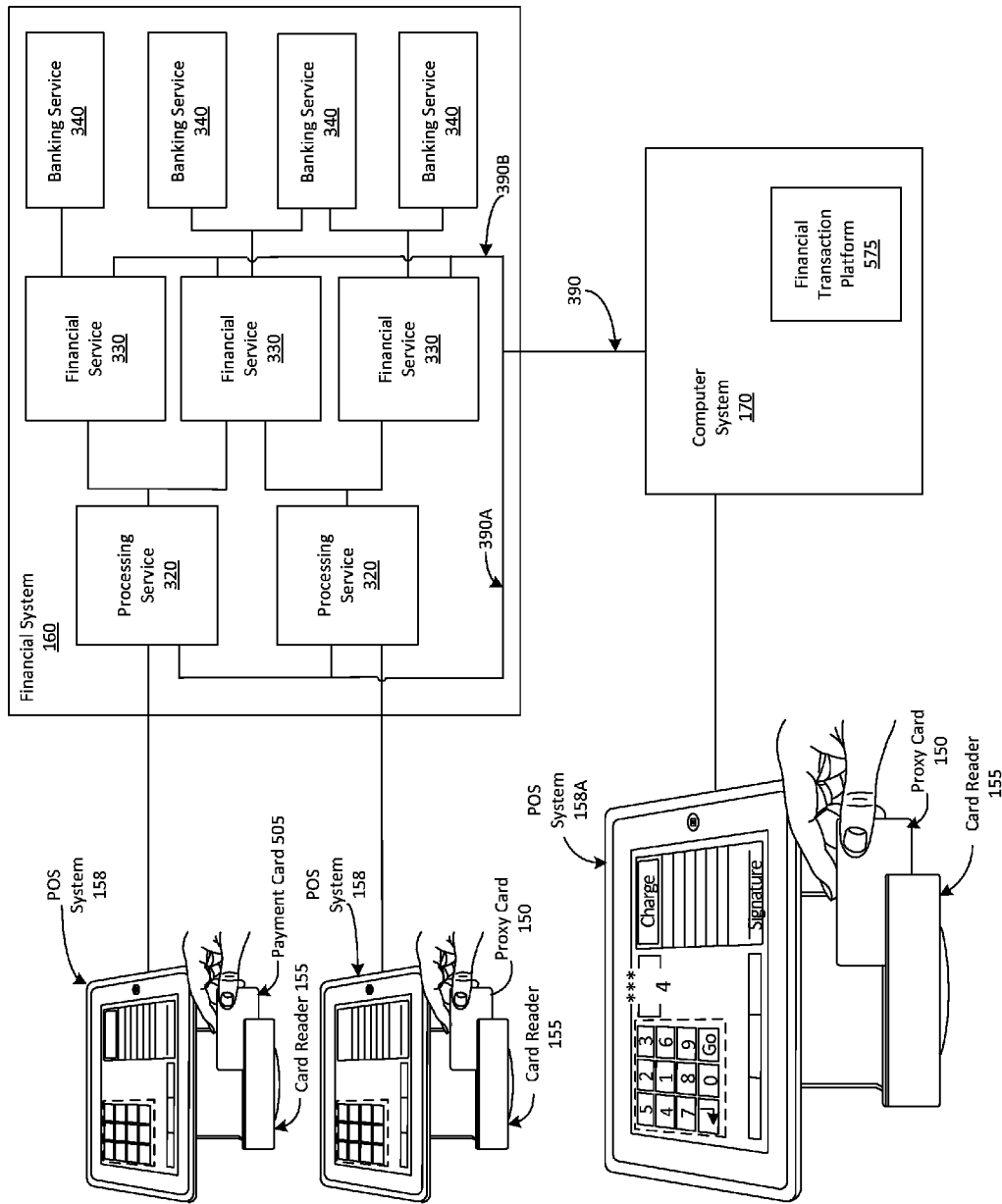
FIG. 5B is an illustration of components of or associated with a second embodiment of a financial system for processing financial transactions and associated fund transfers.

FIG. 3A is an illustration of a subset of components of or associated with a first embodiment of a financial system for processing purchase transactions and associated fund transfers. The following description of FIG. 3A will be described using the transaction illustrated in FIG. 1, and will refer to labels of that figure. FIG. 5A illustrates the first embodiment, and FIG. 3A contains the subset of the components of FIG. 5A that are relevant to explaining the transaction illustrated in FIG. 1. The following description of FIG. 3A also applies to FIG. 3B, except where differences are noted. All actions, decisions, determinations, and the like which are taken or received by computer system 170 can also be taken or received by financial transaction platform 575 when computer system 170 includes an implementation of financial transaction platform 575, as is represented in FIGS. 5A and 5B.

The transaction of this example starts with a consumer presenting proxy card 150 to seller 310. Seller 310 initiates card swipe 105 at step 103 by swiping proxy card 150 through card reader 155. Card reader 155 at step 108 then sends the information obtained from proxy card 150, the proxy card information, to POS system 158. Card reader 155 is coupled to POS system 158. Payment authorization 130 starts at step 110 with POS system 158 transmitting the proxy card information to financial system 160. In the example of FIG. 1, proxy card 150 is encoded as a VISA branded payment card.

Figure 4A:
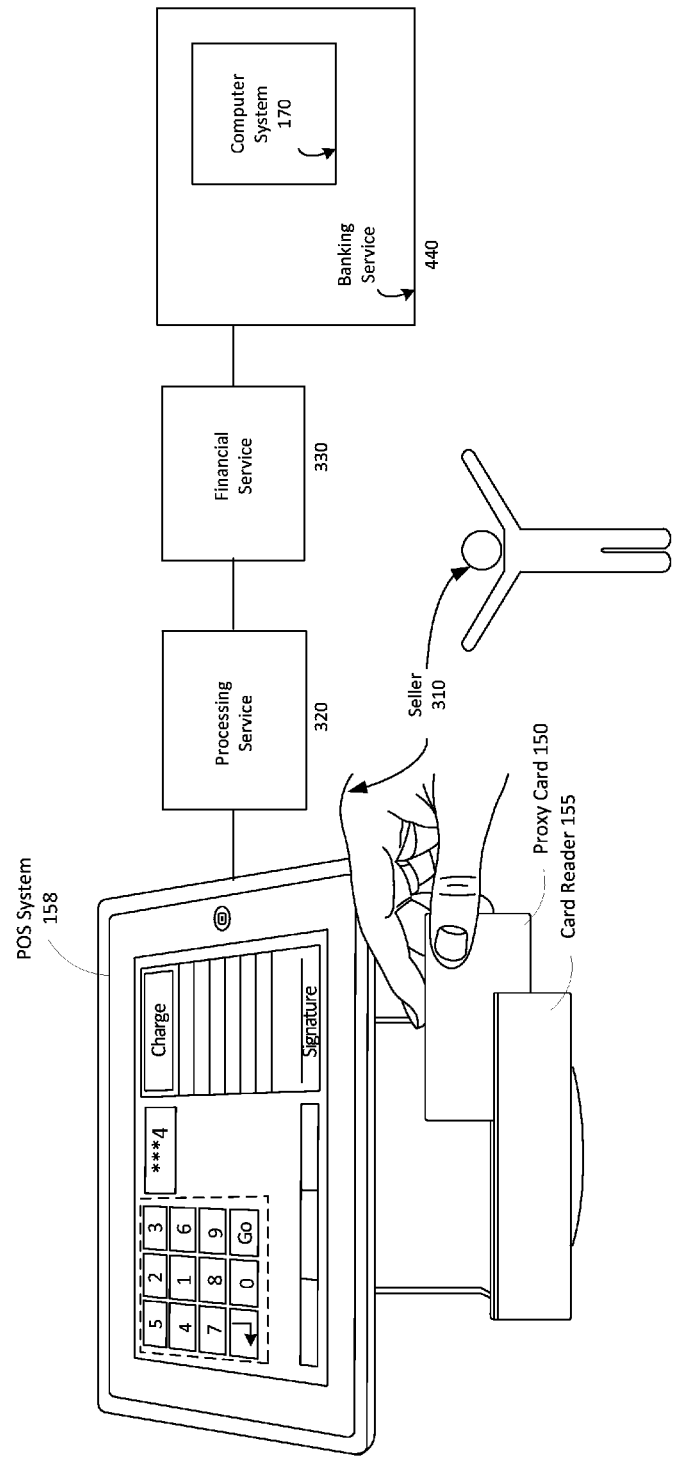
FIG. 4A is an illustration of components of or associated with a third embodiment of a financial system for processing financial transactions and associated fund transfers.
Figure 4B:
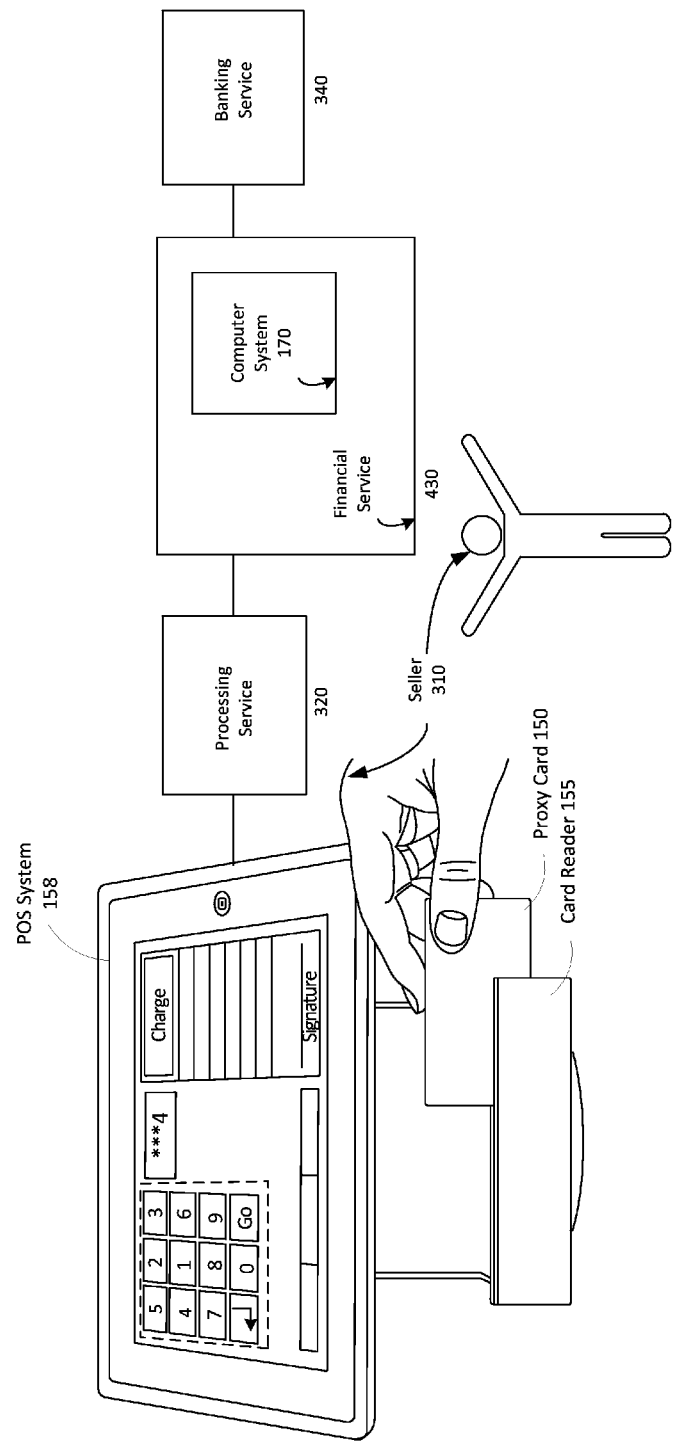
FIG. 4B is an illustration of components of or associated with a fourth embodiment of a financial system for processing financial transactions and associated fund transfers.
Figure 4C:
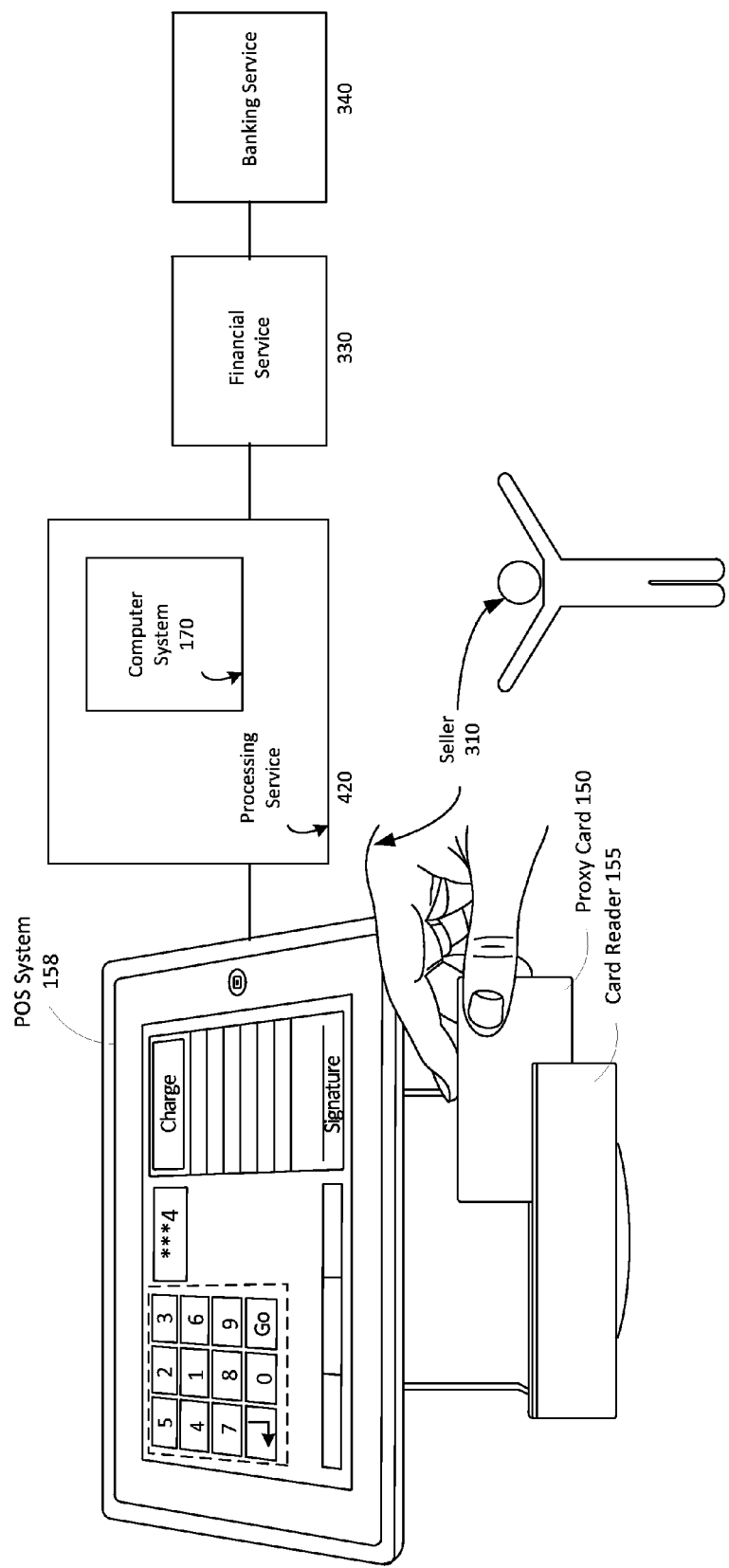
FIG. 4C is an illustration of components of or associated with a fifth embodiment of a financial system for processing financial transactions and associated fund transfers.

In the embodiment of FIG. 3A, financial system 160 includes processing service 320, financial service 330, and banking service 340. In some embodiments, financial system 160 can include computer system 170, such as in the embodiments of FIGS. 4A-4C. FIGS. 4A-4C are illustrations of components of or associated respectively with a third, fourth, and fifth embodiment of a financial system. In the embodiment of FIG. 4A, computer system 170 is under the control of banking service 440. In the embodiment of FIG. 4B, computer system 170 is under the control of financial service 430. In the embodiment of FIG. 4C, computer system 170 is under the control of processing service 420.

POS system 158 at step 110 transmits the proxy card information to financial system 160, where the proxy card information is received by processing service 320. An example of processing service 320 is Bank of America Merchant Services. Processing service 320, based on the received proxy card information, determines that proxy card 150 is encoded as a VISA branded payment card. Based on this determination, processing service 320 relays the received information to the financial service that processes VISA branded payment cards. In this example, financial service 330 is VISA's Visa-Net Payment System, which processes payments made using VISA branded payment cards.

The proxy card information includes meta-data which financial service 330 uses to determine to transmit the proxy card and transaction information to computer system 170. As illustrated in FIGS. 4A-4C, in various embodiments computer system 170 can be under the control of a processing service, a financial service, or a banking service. Financial service 330, upon determining to transmit information associated with proxy card 150 to computer system 170, performs step 115 in which financial service 330 transmits information associated with proxy card 150 to computer system 170.

Connector 390 shows two connections to financial service 330 in order to facilitate explaining the example of FIG. 3A. This is not intended to represent two connections, or any specific number of connections. Connector 390 represents an information flow made via any type of communications medium, such as a network (wired or wireless). Label 390B represents a flow of information that is generally from financial system 160 to computer system 170, such as occurs at step 115. In the embodiments of FIGS. 5A and 5B, the information flow of step 115 is generally from financial service 330 to computer system 170. Label 390A represents a flow of information that is generally from computer system 170 to financial system 160, such as occurs at steps 120 and 175. In the embodiment of FIG. 5A, the information flow of steps 120 and 175 is generally from computer system 170 to financial service 330. In the embodiment of FIG. 5B, the information flow of steps 120 and 175 is generally from computer system 170 to processing service 320.

Computer system 170 at step 180 selects the payment account to use for the purchase transaction, which in this example is also a VISA branded payment card account. Computer system 170 performs step 120 which includes sending the transaction information and the payment account information to financial system 160. In the financial system embodiment of FIG. 3A, this includes sending the transaction and payment account information to financial service 330, as is represented by the branch of connector 390 that is labeled 390A. Computer system 170 sends the transaction and payment account information to financial service 330 based on a determination that the selected payment account is a VISA branded payment account, and based on a determination that financial service 330 is the financial service that processes payments made using VISA branded payment cards.

As is represented by label 390A of FIG. 5A, computer system 170 can send the transaction and payment account information to different financial services when payments from the selected payment account are processed by other financial services. Financial service 330 determines that the payment account is managed by banking service 340, and sends the transaction and payment account information to banking service 340. An example of a banking service is Chase Bank. Banking service 340 determines the result of payment authorization 130, and in step 125 sends the results of the authorization to POS system 158.

Figure 3B:
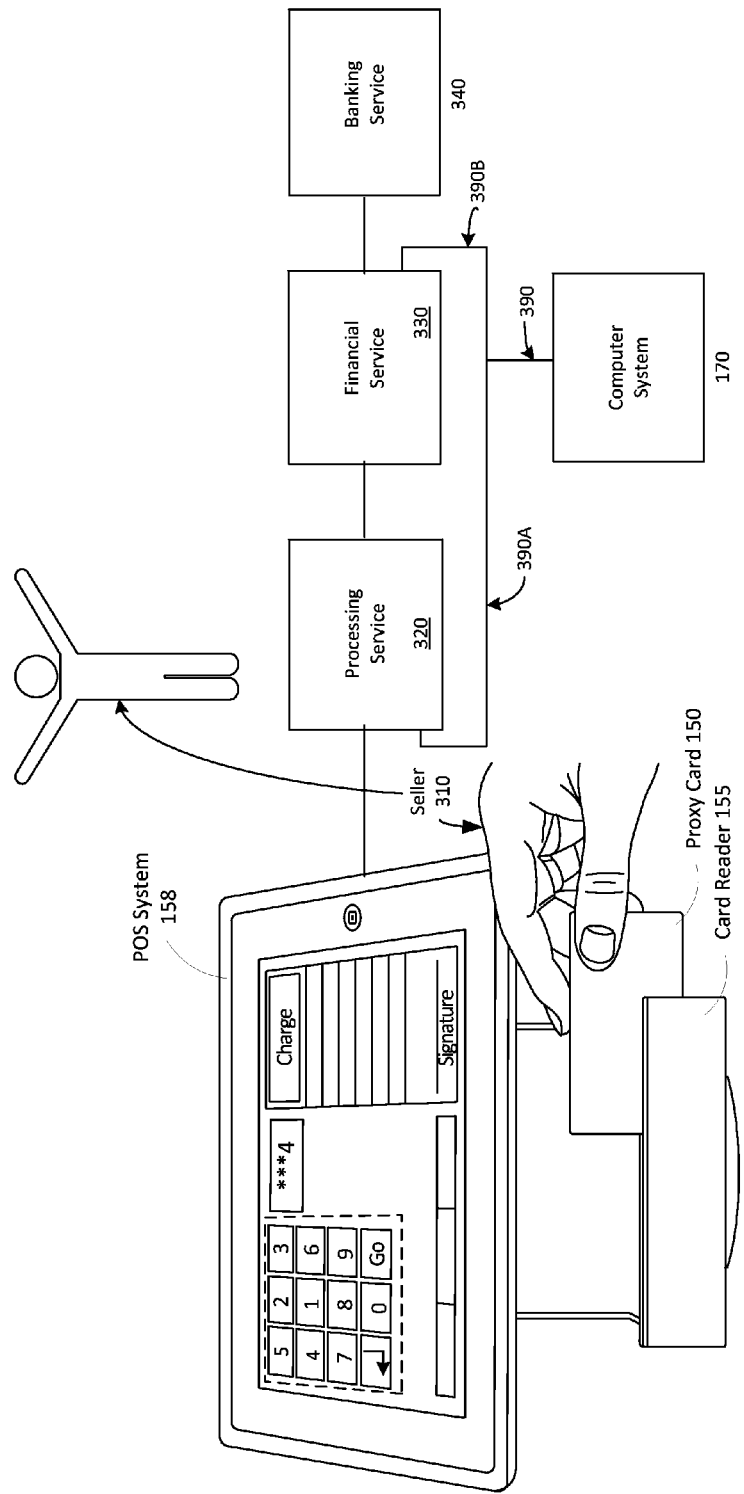
FIG. 3B is an illustration of a subset of components of or associated with a second embodiment of a financial system for processing financial transactions and associated fund transfers.

FIG. 3B is an illustration of a subset of components of or associated with a second embodiment of a financial system for processing purchase transactions and associated fund transfers. FIG. 5B illustrates the second embodiment, and FIG. 3B contains the subset of the components of FIG. 5B that are relevant to explaining the transaction illustrated in FIG. 1. In the embodiment of FIG. 3B, when computer system 170 performs step 120, computer system 170 sends the transaction information and the payment account information to processing service 320 instead of financial service 330. In this embodiment, rather than computer system 170 making the determination to send the transaction and payment account information to financial service 330 for processing, processing service 320 makes this determination. Processing service 320 sends the transaction and payment account information to financial service 330 based on a determination that the selected payment account is a VISA branded payment account, and based on a determination that financial service 330 is the financial service that processes payments made using VISA branded payment cards. In this embodiment, label 390A represents a flow of information that is generally from computer system 170 to processing service 320, such as occurs at steps 120 and 175.

Returning to the description of FIG. 3A, at this point, assuming that the purchase transaction was authorized and the consumer accepted the purchase transaction, the purchase transaction is complete. At a later time, for example when the consumer arrives at home, the consumer can optionally start phase 3, change of payment account 145. If the consumer utilizes change of payment account 145, at step 175 computer system 170 sends the second payment account information and the transaction information to financial system 160.

For the embodiment represented in FIG. 3A, and similar to the above FIG. 3A discussion related to step 120, sending the transaction and payment account information to financial system 160 includes sending the transaction and payment account information to financial service 330, as is represented by 390A of FIG. 3A. For the embodiment represented in FIG. 3B, and similar to the above FIG. 3B discussion related to step 120, sending the transaction and payment account information to financial system 160 includes sending the transaction and payment account information to processing service 320, as is represented by 390A of FIG. 3B. Processing service 320 makes a determination to send the transaction and payment account information to financial service 330.

Returning to the description of FIG. 3A, financial service 330 determines that the payment account of this example is managed by banking service 340, and sends the transaction and payment account information to banking service 340. For other payment accounts, financial service 330 may determine that a different bank manages that payment account. Financial service 330 can send the transaction and payment account information to another banking service, as is represented in FIG. 5A, which shows information flowing from multiple financial services to multiple banking services. Banking service 340 determines the result of payment authorization 130, and sends the result to computer system 170. Upon receipt of the authorization, computer system 170 ensures that funds for the payment will not be taken from the payment account initially selected for the payment. This can be done, for example, by canceling the previously authorized payment. As a result of change of payment account 145, funds for the payment will be transferred from the second payment account to the account associated with the seller, and funds for the payment will not be taken from the initial payment account.

In the financial system embodiment of FIG. 3B, causing the transfer includes computer system 170 sending the transaction and payment account information to processing service 320, as is represented by 390A of FIG. 3B. As discussed previously, processing service 320 determines to send the transaction and payment account information to financial service 330. Financial service 330 performs from this point as previously described.

FIG. 5A is an illustration of components of or associated with a first embodiment of a financial system for processing financial transactions and associated fund transfers. Computer system 170 includes financial transaction platform 575. A financial transaction platform enables multiple consumers to engage in financial transactions with multiple payees. As an example of one such financial transaction, a consumer can purchase a coffee from a merchant using payment card 505. POS system 158A can obtain payment card information from payment card 505 and can send the payment card information and the transaction information to financial transaction platform 575. Financial transaction platform 575 can process the payment made using the payment card, where the processing includes sending information to financial system 160 to causes a transfer of funds from the account associated with payment card 505 to an account associated with the merchant. All other components of FIG. 5A are discussed in the descriptions of FIGS. 1-4.

FIG. 5B is an illustration of components of or associated with a second embodiment of a financial system for processing financial transactions and associated fund transfers. All components of FIG. 5B are discussed in the descriptions of FIGS. 1-5A.

Figure 6A:
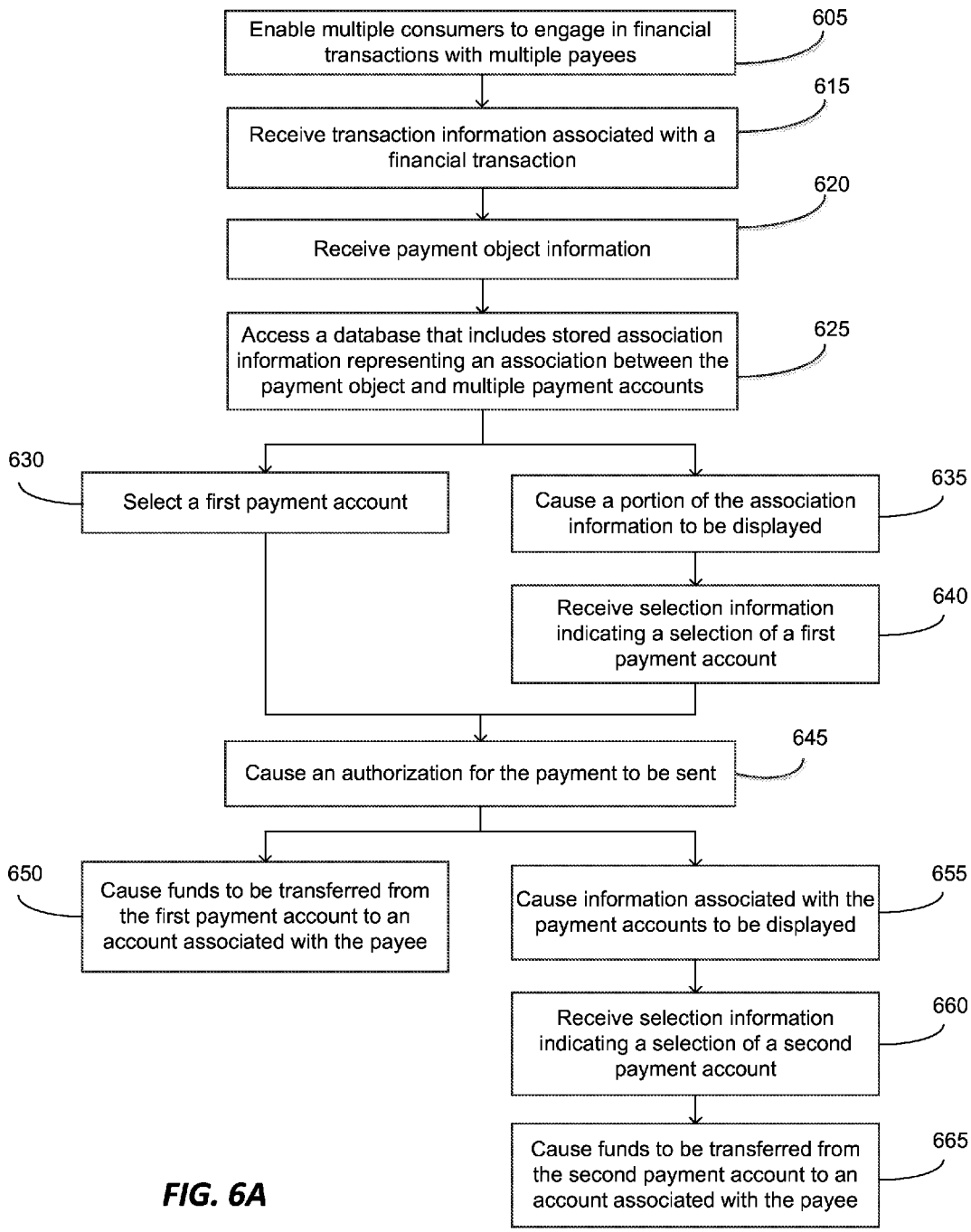
FIGS. 6A and 6B are a flow charts illustrating a method for processing a payment made using a payment object.

FIG. 6A is a flow chart illustrating operations of an example of a method for processing a payment made using a payment object. At step 605, computer system 170, by running financial transaction platform 575, enables multiple customers to engage in financial transactions with multiple payees. Step 605 can be performed by financial transaction platform 575, as well as by computer system 170. Using the example of FIG. 5A as an example of one such financial transaction, a consumer can purchase a coffee from a merchant using payment card 505. POS system 158A can obtain payment card information from payment card 505 and can send the payment card information and the transaction information to financial transaction platform 575. Computer system 170, as well as financial transaction platform 575, can process the payment made using the payment card, where the processing includes sending information to financial system 160 to cause a transfer of funds from the account associated with payment card 505 to an account associated with the merchant.

A consumer makes or initiates a payment using a payment object. The payment object can be, for example, a proxy card. A consumer can present the proxy card to make a payment associated with a financial transaction. For example, the consumer can purchase a coffee from a merchant. To pay for the coffee, the consumer can present the proxy card to the merchant, as is done in step 205 of FIG. 2. An object identifier, such as one associated with POS system 158, can obtain proxy card information from the proxy card, as is done in step 210 of FIG. 2. The proxy card information can be sent to financial system 160, as is done in step 210 of FIG. 2. The proxy card information can alternatively be sent to computer system 170 and/or financial transaction platform 575, for example, from POS system 158A to computer system 170 and/or financial transaction platform 575. The consumer can make or initiate a payment using the proxy card by presenting the proxy card to the merchant so that the merchant's POS system can obtain proxy card information from the proxy card.

At step 615, computer system 170 and/or financial transaction platform 575 receives transaction information associated with a financial transaction. As per step 215, financial system 160 can send the transaction information received at step 210 to computer system 170, with computer system 170 accordingly receiving the transaction information. In some embodiments, financial transaction platform 575 is implemented on computer system 170, and financial transaction platform 575 also receives the transaction information.

At step 620, computer system 170 and/or financial transaction platform 575 receives the payment object information. Step 620 can occur after step 605, and before or after step 615. The payment object can be a proxy card, and computer system 170 and/or financial transaction platform 575 can receive the proxy card information. As per step 215, financial system 160 can send the proxy card information received at step 210 to computer system 170, with computer system 170 resultantly receiving the proxy card information. In some embodiments, financial transaction platform 575 is implemented on computer system 170, and financial transaction platform 575 can also receive the proxy card information.

At step 625, computer system 170 and/or financial transaction platform 575 accesses a database that includes stored association information representing an association between the proxy card and multiple payment accounts. Step 625 can occur after steps 615-620. The association information can be, for example, links between the proxy card and the multiple payment accounts. When the payment object is a proxy card, the consumer can, for example, enter the card number of the proxy card using a web site associated with computer system 170 and/or financial transaction platform 575. The consumer can then enter the card number of a first payment card using the website. Computer system 170 and/or financial transaction platform 575 can link the first payment card with the proxy card, such as by using a database. As a second example, the consumer installs an application on his mobile device, and swipes his proxy card and a payment card through a card reader that is coupled to the mobile device. The application communicates with a computer system, and provides proxy card information and payment card information to a computer system. The computer system associates the proxy card and the payment card.

The consumer can similarly link additional payment cards, and the multiple payment cards can all be associated with the proxy card. The linkages in the database between the proxy card and the multiple payment accounts are association information, where the association information is stored in the database. The database can contain further association information, such as the name of the consumer, the consumer's address, credit report information regarding the consumer, and the like.

When accessing the database, this association information can be retrieved from the database. For example, computer system 170 and/or financial transaction platform 575 can use the proxy card information received during step 620 as an index into the database. One of the entries in the database can be a list of payment accounts associated with the proxy card. Computer system 170 and/or financial transaction platform 575 can retrieve this list of payment accounts, and can further retrieve payment account information from the database.

After step 625, one or more of the payment accounts associated with the proxy card can be chosen to use to obtain authorization for the payment. The payment account can be selected by computer system 170 and/or financial transaction platform 575, as happens at step 630, or can be selected by the consumer, as happens during steps 635-640.

At step 630, computer system 170 and/or financial transaction platform 575 select a first payment account. Step 630 can be after step 625. Computer system 170 and/or financial transaction platform 575 can select the first payment account based on an algorithm. For example, the algorithm can select the same one payment account for all payments made using the proxy card. The consumer in some embodiments can change the payment account that is chosen. As a second example, the algorithm can select a different payment account for each purchase transaction, as well as for each line item of the purchase transaction. For example, the algorithm can select an Exxon credit card for gas purchases, and a VISA credit card for items purchased at a grocer. If the consumer purchases gas and snacks at one store, the algorithm can select the Exxon card to pay for the gas purchase and can select the VISA card to pay for the snack purchase.

At step 635, computer system 170 and/or financial transaction platform 575 causes a portion of the association information to be displayed. Step 635 can be after step 625. In this scenario, for example, the consumer just provided the proxy card to the merchant to pay for the coffee. The proxy card was swiped and the transaction is going through the authorization process. During the authorization process, a listing of the payment accounts associated with the proxy card can be displayed on the consumer's mobile device, as is illustrated in display 800 of FIG. 8A. The consumer can use his mobile device to select the payment account to use for the payment, such as by touching the screen to indicate a selection of one of the displayed payment accounts.

In this example, computer system 170 and/or financial transaction platform 575 obtained the listing of the payment accounts associated with the proxy card while accessing the database at step 625, where the listing of the payment accounts is a portion of the association information. Computer system 170 and/or financial transaction platform 575 sends or causes to be sent this listing of payment account to the consumer's mobile device, and the consumer used his mobile device to select the payment card to use for the payment.

At step 640, computer system 170 and/or financial transaction platform 575 receives selection information indicating a selection of a first payment account. Step 640 can occur after step 625 or 635. After the consumer uses his mobile device to select the payment account to use for the payment, the mobile device can send selection information to computer system 170 and/or financial transaction platform 575, where the selection information indicates a selection of a first payment account to use for the payment.

At step 645, computer system 170 and/or financial transaction platform 575 causes an authorization for the payment to be sent to, for example, an object identifier such as a POS system 158. Step 645 can occur after any of steps 625-640. As a first example, computer system 170 and/or financial transaction platform 575 causes the authorization to be sent by sending the transaction information and the selected payment account information to financial system 160. The financial system determines whether the payment account has access to adequate funds to make the payment, and authorizes the payment when adequate funds are available. The payment account can be deemed to have sufficient funds available for use for the payment in several ways. For example, when the payment account is a deposit account, it can be deemed to have sufficient funds available for use when the amount of funds in the account is equal to or greater than the amount of the payment.

The deposit account can also be deemed to have sufficient funds available for use even when the amount of funds in the account is less than the amount of the purchase. For example, if the account has overdraft protection, the account can be deemed to have sufficient funds available for use when the amount of funds in the account plus the amount of funds available via overdraft protection is equal to or greater than the amount of the payment. When the payment account is a credit account, the payment account can be deemed to have sufficient funds available for use when the amount of credit funds available via the credit account is equal to or greater than the amount of the payment. When financial system 160 deems that the payment account has sufficient funds available for use, financial system 160 sends the authorization for the purchase to the object identifier, such as POS system 158.

As a second example, computer system 170 and/or financial transaction platform 575 can send the authorization to an object identifier, such as POS system 158. Computer system 170 and/or financial transaction platform 575 can determine if the payment account is deemed to have sufficient funds available for use, and can decide to authorize the payment transaction. Computer system 170 and/or financial transaction platform 575 can decide to authorize the payment transaction based on other information, such as the consumer's credit report or based on past usage of the proxy card or the payment account. When computer system 170 and/or financial transaction platform 575 decide to authorize the payment transaction, computer system 170 and/or financial transaction platform 575 can send the authorization to the object identifier, or can alternately send the authorization to financial system 160, which can relay the authorization to the object identifier.

After step 645, the consumer can choose to change the payment account used to obtain funds for the payment, as is discussed further below.

At step 650, computer system 170 and/or financial transaction platform 575 causes funds to be transferred from the first payment account to an account associated with the payee. When the consumer does not change the payment account, step 650 occurs. Computer system 170 and/or financial transaction platform 575 at step 645 sent transaction information and payment account information to financial system 160, and financial system 160 authorized the payment. The action of causing the payment authorization, unless prevented from taking effect, such as by canceling the payment, causes funds to be transferred from the first payment account to an account associated with the payee. The transaction information includes an amount corresponding to the amount to be transferred as well as information regarding the payee sufficient to allow identification of the account associated with the payee into which the funds are to be transferred. The payment account information includes information regarding the payment account sufficient to allow identification of the account to facilitate the transfer of funds from the account.

At step 655, computer system 170 and/or financial transaction platform 575 causes information associated with the payment accounts to be displayed. Step 655 can occur after steps 620-630, 645, or after POS system 158 receives the authorization for the purchase. In a first example scenario, the consumer completed the purchase and left the merchant's place of business with the purchased goods. Upon arriving home, the consumer decides to change the payment account to use for the payment. The consumer initiates communications with computer system 170 and/or financial transaction platform 575 using a computing device, such as the consumer's smartphone, tablet computer, or desktop computer. Computer system 170 and/or financial transaction platform 575 obtains the listing of payment accounts associated with the proxy card by accessing the database, as in step 625.

Figure 8A:
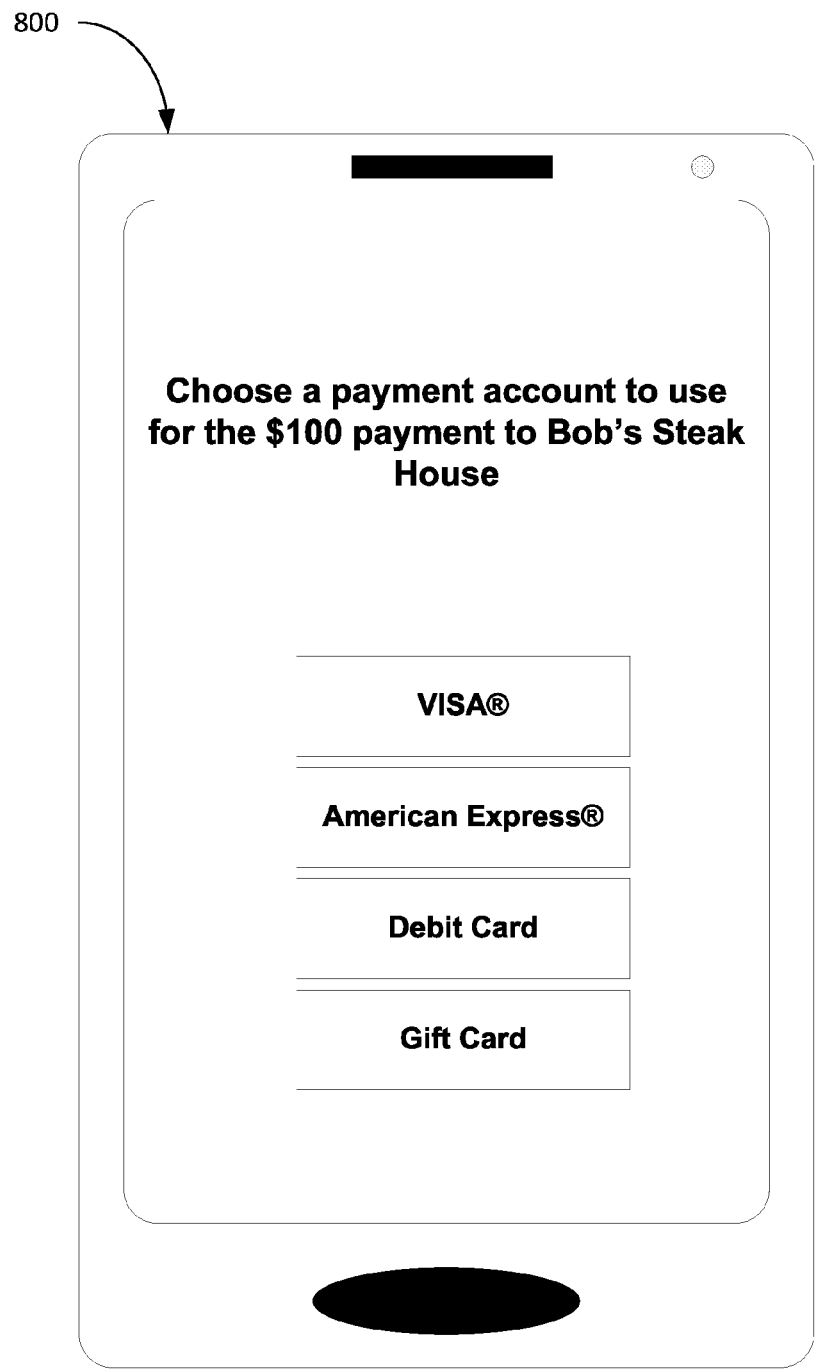
FIGS. 8A, 8B, and 8C are illustrations of a listing of payment accounts associated with a proxy card being displayed on a smartphone.
Figure 8B:
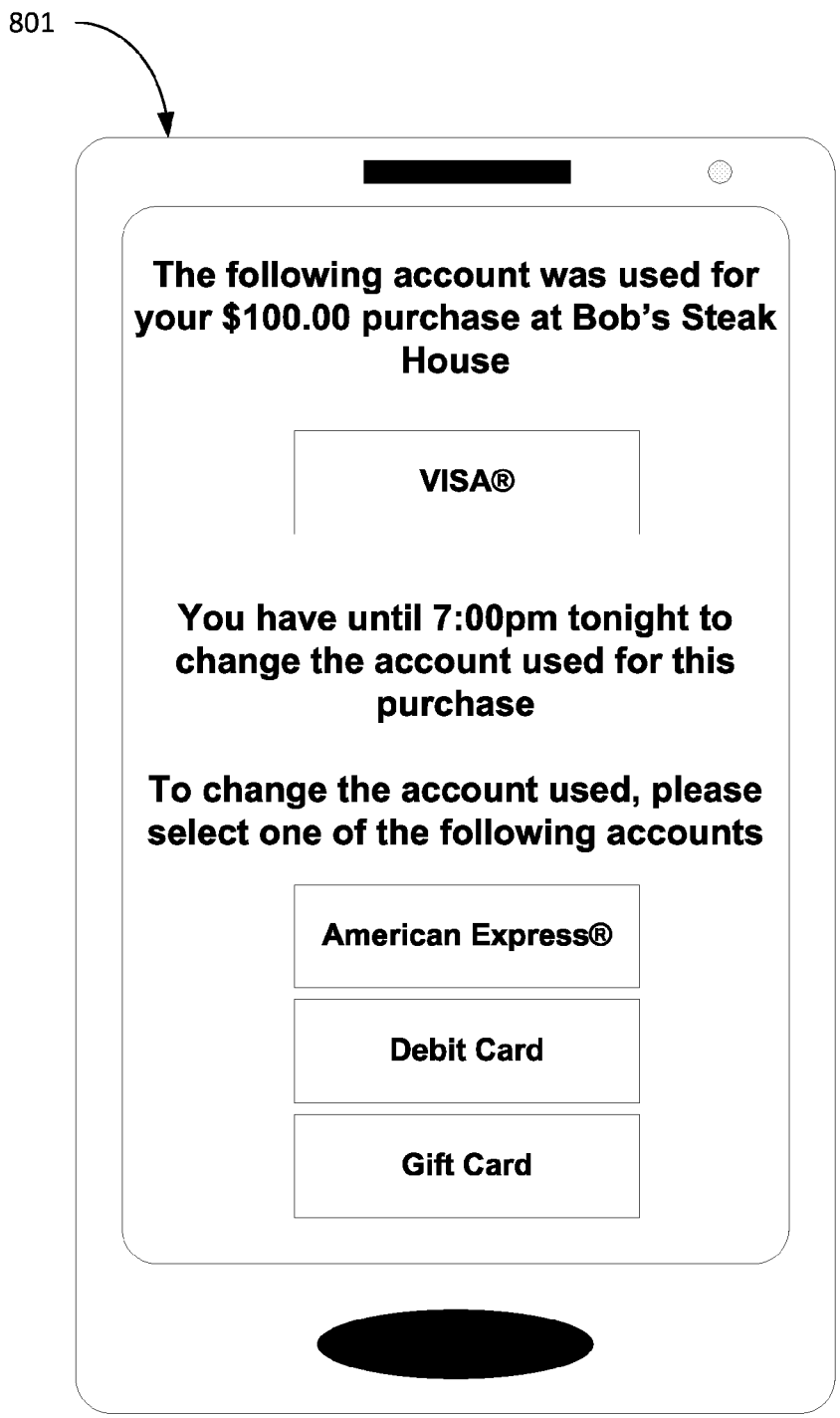

Computer system 170 and/or financial transaction platform 575 sends or causes to be sent the listing of payment accounts to the consumer's computing device, as is illustrated at display 800 of FIG. 8A and display 801 of FIG. 8B. Display 800 illustrates an example of a display in a scenario where computer system 170 and/or financial transaction platform 575 initially selected the payment account (step 630) in the background and the consumer may be unaware of this background processing. Display 801 illustrates an example of a display where the results of step 630 (e.g., the initial selection of the VISA account to use for the $100.00 purchase at Bob's Steak House) are brought to the consumer's attention via display 801, or where the consumer made the initial selection of the payment account (steps 635-640).

The information displayed or otherwise output by the computing device can further include information related to the transaction, such as the amount of the transaction and information related to the payee, such as the name of the merchant with whom the consumer did the transaction. The information can also include a notification of a time limit for changing the payment account associated with the proxy card to use for the transaction. For example, the time limit can be a predefined amount of time or time period (e.g., "You have until 7:00 pm tonight to change the account used for this purchase" or "You have 60 minutes left to change the account used for this purchase"). The predefined time limit can be based on knowledge or estimates of delays inherent in the financial system that processes the payment. For example, when the financial system batches payment transactions for processing, the time limit can be based on when the financial system begins to batch process the payment transactions. The time limit can be other predefined amounts of time or time periods, one example being a time limit that the company that offers the proxy card sets based on what the company deems to be a reasonable time limit.

In addition to being a predefined amount of time or time period, the time limit can be variable based on, for example, when the payment is actually processed. The financial system may take some time, such as several hours, to batch process all the payment transactions. In this example, even after the batch processing starts, the consumer can change the payment account used for the transaction as long as computer system 170 and/or financial transaction platform 575 can prevent that particular payment transaction from being batch processed, such as by canceling the payment and having the cancellation take effect before the payment is processed (i.e., the transfer of funds has occurred). The consumer uses the computing device to select a second payment account to use for the payment, and from which funds for the payment are to be taken. The change will be accepted by computer system 170 and/or financial transaction platform 575 as long as computer system 170 and/or financial transaction platform 575 can prevent obtaining the funds from the first payment account.

In a second example scenario, the consumer takes the goods to a checkout stand where the merchant reads his proxy card using a card reader to initiate a payment for the goods (step 620). Shortly after his proxy card is read, the consumer's mobile device displays an indication to select a payment account associated with the proxy card to use for the transaction (step 655, display 800 of FIG. 8A). The consumer taps the screen of his mobile device to indicate a selection of a payment account, and the payment is processed using the selected payment account (step 660-665). However, while this is going on, steps 615. 620, 625, 630, and 645 all happen, in some embodiments transparently to the consumer. Right after the consumer's proxy card was read (step 620), computer system 170 and/or financial transaction platform 575 selected a payment account associated with the proxy card (steps 625-630), and obtained an authorization for the purchase using the selected payment card (step 645). The consumer does not need to be aware, or even possibly is not aware, that these steps (i.e., steps 625, 630, and 645) are happening using the payment account selected in step 630.

Figure 8C:
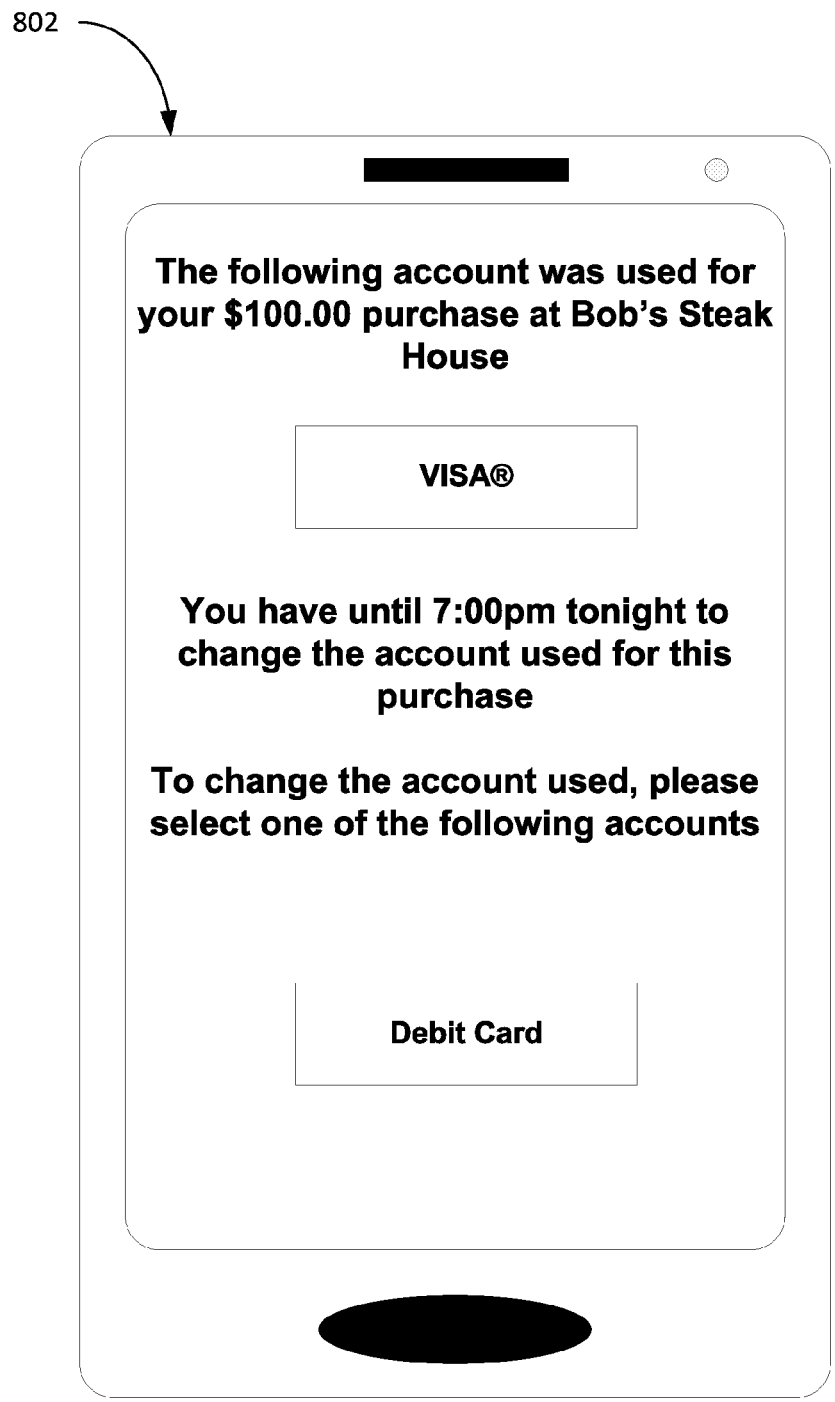

In some embodiments, at step 655 computer system 170 and/or financial transaction platform 575 cause a portion of the association information that is relevant to the transaction to be displayed. Some of the items associated with the proxy card may not be relevant to the transaction. In a first example a proxy card is associated with payment accounts associated with a VISA card, an American Express card, a debit card, and a gift card. At step 655, the consumer's mobile device displays these four accounts to enable the consumer to indicate which account to use for the transaction (label 800, FIG. 8A). In a second example, the proxy card is associated with the same four payment accounts. However, in this example, the proxy card is being used at a merchant that does not accept American Express cards, and the gift card is not valid at the merchant. At step 655, the consumer's mobile device does not display any information related to the American Express account, due to the merchant not accepting this card, and also does not display any information related to the gift card, due to the gift card not being valid at the merchant (label 802, FIG. 8C).

As another example, identification such as a driver's license can be associated with the proxy card, and the identification may not be relevant when the proxy card is being used to pay for a purchase, as driver's licenses may not be usable to make a payment. In this example, the portion of the association information displayed does not include any information regarding the driver's license.

In another example, some payment accounts associated with the proxy card may not have sufficient funds available for use for the transaction. The transaction may involve a payment of $100, and one of the payment accounts may only have $50 of funds available for use. In this example, the portion of the association information displayed does not include any information regarding the payment accounts that do not have sufficient funds available for use for the payment (e.g., the payment account with only $50 of funds available will not be displayed when the proxy card is being used for a transaction involving a payment of $100).

In another example, some payment accounts associated with the proxy card may not be accepted for a transaction. For example, a pre-paid public transportation fee card may only be accepted by the public transportation agency that issued the card. When the consumer is using the proxy card to purchase goods at a merchant, the portion of the association information displayed does not include any information regarding the payment account associated with the pre-paid public transportation fee card, as this account cannot be used at the merchant.

In another example, some brand or types of payment accounts associated with the proxy card may not be accepted for a transaction. For example, a merchant may not accept credit cards at all, or may not accept debit cards at all, or may not accept a certain brand of credit card (e.g., American Express® credit cards). When the consumer is using the proxy card to purchase goods at the merchant, the portion of the association information displayed does not include any information regarding payment accounts associated with credit cards when the merchant does not accept credit cards. The displayed information similarly does not include any information regarding payment accounts associated with debit cards when the merchant does not accept debit cards, and does not include any information associated with a certain brand of credit card when the merchant does not accept that brand of credit card.

In another example, a stored value card associated with the proxy card may not be valid at certain merchants. For example, a pre-paid gift card purchased for Bob's Steak House may only be valid at Bob's Steak House. When the consumer goes to any business other than Bob's Steak House, the portion of the association information displayed does not include any information regarding the payment account associated with the pre-paid gift card for Bob's Steak House.

Step 660 includes receiving selection information indicating a selection of a second payment account. Step 660 can occur after step 645 or 655. After the consumer uses his computing device to select the payment account to use for the payment, the computing device can send selection information to computer system 170 and/or financial transaction platform 575, where the selection information indicates a selection of a first payment account to use for the payment.

At step 665 computer system 170 and/or financial transaction platform 575 causes funds to be transferred from the second payment account to an account associated with the payee. Computer system 170 and/or financial transaction platform 575 sends the transaction information and the second payment account information to financial system 160. This is done to cause the funds for the payment to come from the second payment account rather than the first payment account. Financial system 160 can authorize the payment using the second payment account, and can send a payment authorization to computer system 170 and/or financial transaction platform 575. Computer system 170 and/or financial transaction platform 575 can also prevent funds for the payment from being obtained from the first payment account. For example, computer system 170 and/or financial transaction platform 575 can send information to financial system 160 that causes the payment and/or the payment authorization to be canceled.

Figure 6B:
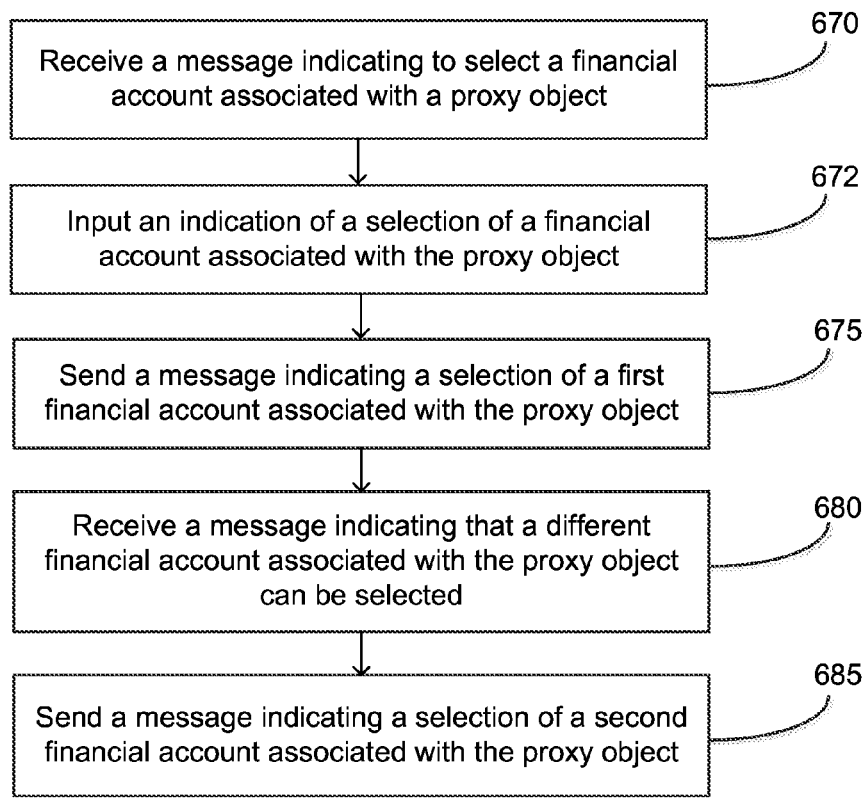

FIG. 6B is a flow chart illustrating an example of a method for processing a payment made using a proxy card. At step 670, a mobile device receives a message indicating to select a financial account associated with a proxy object, such as a proxy card. At step 635, computer system 170 and/or financial transaction platform 575 sends a message to the consumer's mobile device that causes a portion of the association information to be displayed. In some embodiments, at step 670, the consumer's mobile device receives the message. The message includes a listing of a portion of the payment accounts associated with the proxy card. The description of step 655 discusses other portions of the association information that can be displayed. In response to the message, the mobile device displays a portion of the payment accounts and prompts the consumer to select a payment account to use for the payment, as is illustrated at display 800 of FIG. 8A.

At step 655, computer system 170 and/or financial transaction platform 575 can send a message to the consumer's mobile device that causes a portion of the association information to be displayed. In some embodiments, at step 670, the consumer's mobile device receives the message. The message includes a listing of a portion of the payment accounts associated with the proxy card. The portion of the payment accounts that can be listed can be all of the payment accounts associated with the proxy card. The description of step 655 discusses other portions of the association information that can be displayed. In response to the message, the mobile device displays a portion of the payment accounts and indicates to the consumer to select a payment account to use for the payment, as is illustrated at display 800 of FIG. 8A.

At step 672, the consumer's mobile device inputs an indication of a selection of a financial account associated with the proxy object. The consumer can indicate a selection, such as by touching the VISA box of display 800 to indicate a selection of the VISA account. The mobile device can input this indication.

At step 675, a mobile device sends a message indicating a selection of a first financial account associated with the proxy card. After the mobile device inputs the indication of the consumer's selection, the mobile device sends a message to computer system 170 and/or financial transaction platform 575 indicating the selection. In some embodiments, the method continues at step 640, where computer system 170 and/or financial transaction platform 575 receives the message. In some embodiments, the method continues at step 660, where computer system 170 and/or financial transaction platform 575 receive the message.

At step 680, the consumer's mobile device receives a message indicating that a different financial account associated with the proxy card can be selected. At step 655, computer system 170 and/or financial transaction platform 575 sends a message to the consumer's mobile device that causes the mobile device to display information associated with the payment accounts. At step 680, the consumer's mobile device receives the message. Earlier at step 645, an authorization for the payment was obtained using the first payment account. However no funds have yet been transferred. Because the funds have not yet been transferred, the payment using the first payment account can still be stopped, and a different financial account associated with the proxy card can be used for the payment.

The message that is received at step 680 can include a list of accounts associated with the proxy card that can be used for the payment in place of the first payment account. The message can further contain information such as a description of the transaction (e.g., "The following account was used for your $100.00 purchase at Bob's Steak House"), and information regarding a time limit or time window for changing the payment account to be used for the payment (e.g., "You have until 7:00 pm tonight to change the account used for this purchase"). The mobile device can display this information, as is illustrated by display 801 of FIG. 8B.

At step 685, the consumer's mobile device sends a message indicating a selection of a second financial account associated with the proxy card. While step 685 provides an opportunity for the consumer to select a different payment account to use for the payment, the consumer need not select a different payment account. If the consumer does not select a different payment account, the method continues at step 650, where the payment is processed using funds from the first payment account. If the consumer selects a different payment account, the mobile device sends a message to computer system 170 and/or financial transaction platform 575 indicating the consumer's selection. The method continues at step 660, where computer system 170 and/or financial transaction platform 575 receives the message.

Figure 7:
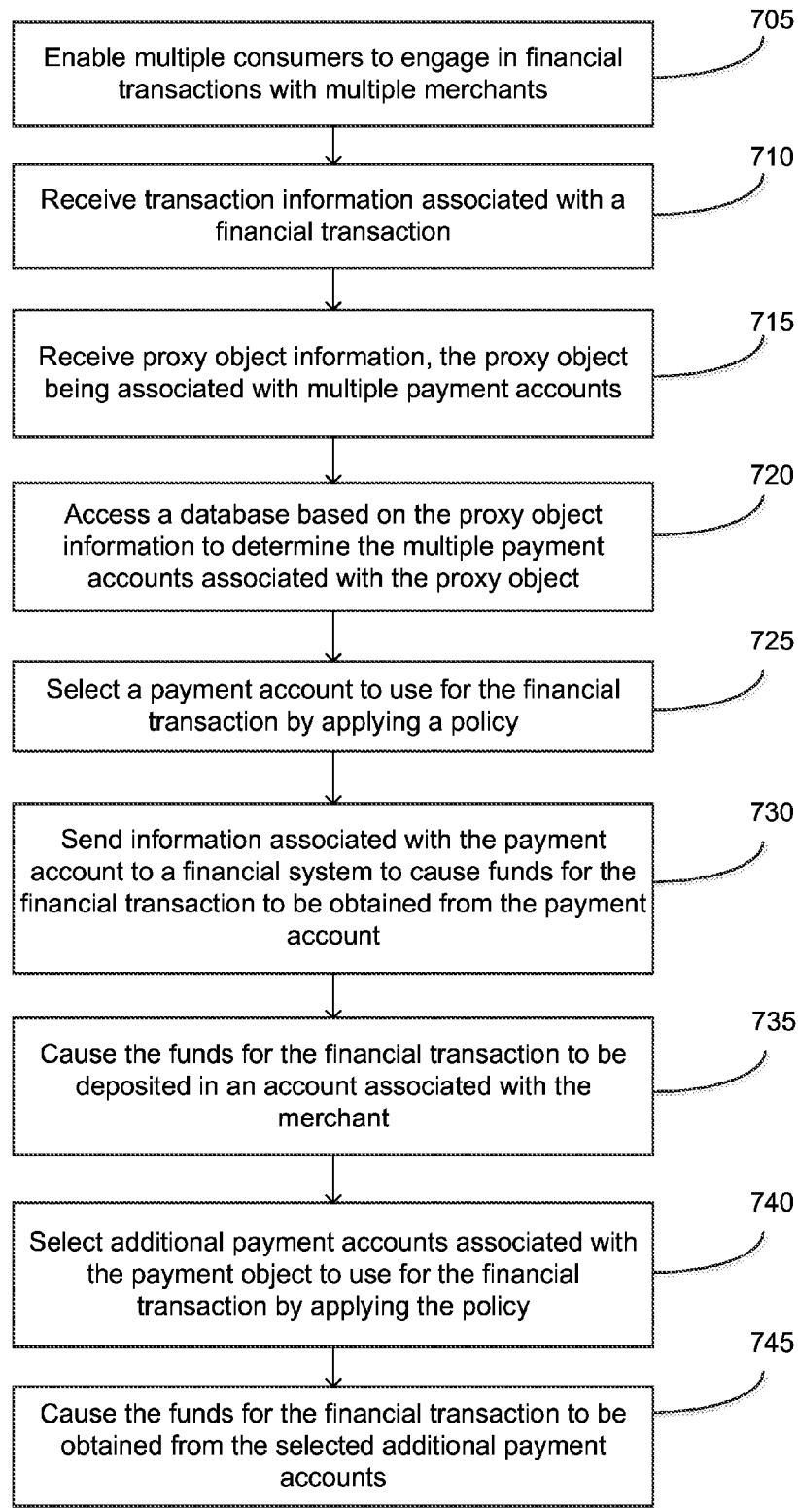
FIG. 7 is a flow chart illustrating an example of a method for selecting a payment account to use to pay for a financial transaction.

FIG. 7 is a flow chart illustrating an example of a method for selecting a payment account to use to pay for a financial transaction. All actions, decisions, determinations, and the like which are taken or received by financial transaction platform 575 in the example method of FIG. 7 can also be taken or received by computer system 170.

At step 705, a financial transaction platform enables multiple merchants (also sellers and payees) to engage in financial transactions with customers (also buyers and payers). Referring to the embodiment of FIG. 5A, a financial transaction platform, such as financial transaction platform 575, can process electronic payments made by the customers to the merchants, thereby enabling the merchants to engage in financial transactions with the customers. For example, financial transaction platform 575 can process electronic payments made by a customer using a payment card, such as payment card 505. The customer or the merchant swipe payment card 505 through card reader 155 of POS system 158A, and POS system 158A sends payment card and transaction information to financial transaction platform 575. Financial transaction platform 575 causes funds for the financial transaction (i.e., to pay for or make a payment associated with the financial transaction) to be transferred from an account associated with payment card 505 to an account associated with the merchant.

At step 710, financial transaction platform 575 receives transaction information associated with a financial transaction. A customer engages in a financial transaction with a merchant. The financial transaction is associated with a transaction, such as the sale of goods, the providing of services, and/or the providing of rentals, as well as for other purposes or associated with other occurrences. POS system 158 of FIG. 5A is used for the transaction and obtains the transaction information. The transaction information can include, among other information, the amount of the sale, the amount charged for providing the services, the amount charged for providing the rentals, a tip amount associated with the transaction, and/or a listing of items associated with the transaction, such as a listing of items sold or rented, or a listing of services provided. POS system 158 sends the transaction information associated with the financial transaction to financial system 160, and financial system 160 sends the transaction information to financial transaction platform 575, which receives the transaction information. In another example, POS system 158A sends the transaction information associated with the financial transaction to financial transaction platform 575, which receives the transaction information.

At step 715, financial transaction platform 575 receives proxy object information, the proxy object being associated with multiple payment accounts. Step 715 can occur after step 705 and before or after step 710. Referring to the embodiment of FIG. 5A, the proxy object of the example method of FIG. 7 is proxy card 150. Financial transaction platform 575 receives the proxy card information associated with proxy card 150. A customer provides proxy card 150, which is associated with multiple payment accounts, to the merchant. The merchant swipes proxy card 150 through card reader 155, and card reader 155 obtains proxy card information from the magnetic strip of proxy card 150. Card reader 158 sends the proxy card information to POS system 158 and POS system 158 sends the proxy card information to financial system 160. Financial system 160 sends the proxy card information to financial transaction platform 575, which receives the proxy card information. In another example, POS system 158A sends the proxy card information to financial transaction platform 575, which receives the proxy card information. The proxy card information and the transaction information can be sent as part of one message.

At step 720, financial transaction platform 575 accesses a database based on the proxy card information to determine the multiple payment accounts associated with the proxy card. Step 720 can occur after step 715 and before or after step 710. The database contains an association of proxy card information with the payment accounts that are associated with the proxy card. The customer can have linked or associated the proxy card with multiple payment accounts using the database.

For example, the database can associate proxy card information with the multiple payment accounts that are associated with proxy card 150, and this association was previously created by the customer. Financial transaction platform 575 accesses the database. The proxy card information, in this example the account number which is part of the proxy card information, is used as an index into the database. In some embodiments, the proxy card information goes through a transformation before it is used as an index into the database. In such a case, the database access is based on the proxy card information in that it is based on a transformation of the proxy card information. The database returns the payment accounts associated with the proxy card, and financial transaction platform 575 receives information associated with the multiple payment accounts.

At step 725, financial transaction platform 575 selects a payment account to use for the financial transaction by applying a policy. Step 725 can occur after steps 715 or 720. Financial transaction platform 575 applies a policy to select the payment account to use for the financial transaction, for example selecting the payment account to use to make a payment associated with the financial transaction.

In some embodiments, the policy can be customized by the customer. In a first example, the customer logs in to a website of the entity that provides the proxy card and customizes the policy. The customer customizes the policy by setting a first payment account as the top priority account to use, setting a second payment account as the second priority payment account to use, etc. In a second example, the customer installs an application on his mobile device, and uses the application to customize the policy. The customer uses the application to customize the policy by setting the first payment account as the top priority account, setting the second payment account as the second priority payment account to use, etc. In a third example, the customer sends a text message or email to customize the policy. The customer customizes the policy by sending a text message to a particular phone number or an email to a particular email address that indicates to set a first payment account as the top priority account, to set a second payment account as the second priority payment account, etc.

In some embodiments, the policy is customized for the customer, such as by financial transaction platform 575 or computer system 170. The customization of the policy can be based on input of the customer, such as preferences of the customer. For example: the customer may prefer to use a particular payment account at all times; the customer may prefer to use a payment account that is associated with an incentive program, such as a credit card associated with an American Airline's frequent flyer program; the customer may prefer to use pre-paid gift cards; the customer may prefer to use the account into which the customer's employer direct deposits the customer's paychecks, such as the customer's primary checking account; the customer may prefer to select the payment account to use for each transaction.

The customization can include multiple levels of customization and customization that includes conditionals, among other types. For example, the customer may prefer to use pre-paid gift cards as the highest priority, and may use debit cards as the second priority. In this case, the debit cards will not be used until pre-paid gift card funds are exhausted. As a second example, the customer may customize the policy such that: if the payee is a grocer, use a first payment account; if the payee is a gas station, use a second payment account, unless the payee is Exxon, in which case use a third payment account. As a third example, the customer may customize the policy such that: American Airlines miles are optimized until 20,000 miles are reached; once 20,000 miles are reached, select pre-paid gift cards as the highest priority. In some embodiments, the policy is implemented via an algorithm.

In some embodiments, the policy can be based on the funds available for use from the payment account. For example, a customer can decide to purchase a television for $1,000, and can use proxy card 150 to pay for the financial transaction associated with the purchase. Proxy card 150 can have three associated credit cards, with the first card having $100 remaining until the first card's credit limit is reached, the second card having $500 remaining until the second card's credit limit is reached, and the third card having $1,500 remaining until the third card's credit limit is reached. The $100, $500, and $1,500 represent the funds that are available to use respectively from the first, second, and third credit cards.

Financial transaction platform 575 has access to data representing these remaining credit limits and available fund amounts. For example, financial transaction platform 575 can communicate with financial system 160, and financial system 160 provides information regarding the credit limit, the available credit, and/or the funds available for each credit card. Financial transaction platform 575 uses the credit limit, available credit, and/or funds available information in selecting the payment account to use for the financial transaction.

In another example, the customer provides information regarding the credit limit of each credit card associated with proxy card 150, and financial transaction platform 575 maintains a calculation of the funds available for use. When proxy card 150 is used, per step 710, financial transaction platform 575 receives transaction information associated with financial transaction involving proxy card 150. By summing the amount paid for each financial transaction by each payment card associated with proxy card 150, financial transaction platform 575 can determine the outstanding balance for each card. Based on the credit limit of each payment account provided by the customer, financial transaction platform 575 determines the credit remaining until the credit limit is reached by subtracting the outstanding balance for a given card from the credit limit, thereby determining the funds available for use from the given card.

Financial transaction platform 575, having access to data representing the funds available for use from each of the three associated credit cards, determines that only the third card, has enough funds available to pay the $1,000 cost of the television. By applying such a policy, financial transaction platform 575 selects the third card to pay for the financial transaction associated with the purchase of the television, based on the third card having sufficient funds available to pay the purchase price of the television.

In some embodiments, the policy can be based on the type of the payment account. For example, the policy can select a first type of card, such as gift cards, before selecting any other type of card. The policy can further select a second type of card, for example ATM cards, before selecting a third type of card, for example credit cards. Examples of types of payment accounts include: a payment account associated with a particular brand, for example an account associated with a VISA branded credit card; a payment account associated with a particular issuer, for example an account associated with a Chase Bank issued credit card; a payment account accepted by a particular merchant, for example an account associated with an Exxon credit card accepted by Exxon; a payment account associated with any of a credit card, an automated teller machine (ATM) card, a debit card, a pre-paid gift card, or a fleet card, for example a payment account associated with a credit card.

In some embodiments, the policy can be based on an incentive program associated with the payment account. The policy can select a payment account based on, for example, obtaining points for a frequent flyer program. The policy may be customized in this way because a customer wants to use frequent flyer program points for travel for an upcoming vacation. Examples of an incentive program include a rewards program, a points program, a mileage program, a frequent flyer program, a travel rewards program, an experiential rewards program, a hotel rewards program, a cash back reward program, a restaurant rewards program, and a loyalty program, among others. In an example, the policy can be based on optimizing or maximizing incentive program points, such as reward points for a rewards program. Financial transaction platform 575 determines which cards can be used to obtain reward points for the reward program. When multiple cards can be used, financial transaction platform 575 determines which card would obtain the maximum reward points if used. The selection of the payment card is based on optimizing or maximizing the reward points for the purchase, such as by selecting the payment account associated with the payment card that would obtain the maximum reward points if used.

The following description expands on the above example, for an embodiment where the customer can customize the policy. The customer customizes the policy with the goal of obtaining American Airlines miles. Proxy card 150 has in this example an associated credit card that provides one mile of American Airlines mileage credit for each dollar spent with the associated credit card. The credit card may also have a program running where the mileage credits are doubled (i.e., two miles credit for each dollar spent) if the card is used to purchase $200 in groceries at a certain store, for example, Safeway. Financial transaction platform 575 sends a message to the customer making the customer aware of this double mileage program, and the customer decides to shop at Safeway for the next several weeks. Financial transaction platform 575 selects the American Airlines credit card to use when the customer uses proxy card 150 at Safeway until $200 in groceries are purchased, thereby triggering the double mileage program. In this case, the selection of the payment account is based on both an incentive program (i.e., selecting a card based on an associated American Airlines mileage program), as well as on a merchant (i.e., selecting a card based on the merchant being Safeway in order to cause the triggering of the double mileage program).

In some embodiments, the policy or application of the policy is based on a merchant category code, or a combination of an incentive program and a merchant category code (MCC). A MCC is a four digit number assigned to a business by credit card companies. The MCC is used to classify the business by the type of goods or services that it provides. For example, "5411" is the MCC for Grocery Stores and Supermarkets. The preceding example might be changed such that double miles are provided for purchasing $200 of groceries, not at Safeway, but at merchants with a MCC of "5411" (i.e., at Grocery Stores and Supermarkets). In this case, financial transaction platform 575 selects the American Airlines credit card to use when proxy card 150 is used at a merchant with a MCC of "5411" until $200 in groceries are purchased, thereby triggering the double mileage program.

In this example, the selection of the payment account is based on both an incentive program (i.e., selecting a card based on an associated American Airlines mileage program), as well as on a MCC (i.e., selecting a card based on the MCC being "5411", indicating that the merchant is a Grocery Store or Supermarket). The selection of the payment account can similarly be based on just the MCC. For example, a customer can customize the policy such that a gasoline credit card is chosen for purchases made at a merchant with an MCC indicating that the merchant sells gasoline.

In some embodiments, the selection of the payment account is based on a timing parameter. Example timing parameters include the time, date, day of the week, week, month, and year. For example: a customer can customize the policy such that a certain credit card is selected for purchases made on a date (i.e., Jan. 10, 2014); on a day of the week (i.e., on Tuesdays); during a week (i.e., during the first week of February or the sixth week of the year); during a month (i.e., during February); or during a year (i.e., during 2014).

In some embodiments, the selection of the payment account is based on an indication of the customer. For example, the customer can indicate a preference to indicate the payment account to use for each transaction, and the policy is customized based on this indication. The database of step 720 can include contact information for a mobile device of the customer that is associated with the proxy card, such as in internet protocol (IP) address or phone number of the mobile device. Financial transaction platform 575, based on the contact information, causes information associated with at least one of the payment account associated with the proxy card to be displayed on the mobile device, as is illustrated at display 800 of FIG. 8A. The customer indicates which payment account to use, such as by touching the VISA selector of display 800. The mobile device sends this indication to financial transaction platform 575, and financial transaction platform 575 selects the VISA account based on the customer indicating to use the VISA account.

In some embodiments, the selection of the payment account is based on past payment account selections and/or usage. For example, a customer may indicate to use whatever was the last payment card used, or whatever was the last payment card used at that merchant, or whatever was the last payment card used at the type of merchant. The type of the merchant can be indicated by the MCC code of the merchant, with merchants having the same MCC being of the same type.

At step 730, financial transaction platform 575 sends information associated with the payment account to a financial system to cause funds for the financial transaction to be obtained from the payment account. Step 730 can occur after any of steps 715-725 or step 740. Referring to the embodiment of FIG. 5A, financial transaction platform 575 sends information associated with the payment account to financial system 160. The information associated with the payment account includes information obtained from the database during step 720, and includes payment account information and transaction information. The sending of the payment account information and the transaction information to financial system 160 causes financial system 160 to obtain funds from the payment account for the financial transaction.

At step 735, financial transaction platform 575 causes the funds for the financial transaction to be deposited in an account associated with the merchant. Step 735 can occur after any of steps 715-730. The account can be, for example, the merchant's bank account at a bank or a credit union or another financial institution. Alternatively, the account can be a financial account associated with financial transaction platform 575, where the funds can be held in trust for the benefit of the merchant. For example, the financial account associated with financial transaction platform 575 can be a bank account at a bank or a credit union or another financial institution where the merchant's funds are held in trust for the benefit of the merchant.

At step 740, financial transaction platform 575 selects additional payment accounts associated with the proxy card to use for the financial transaction by applying the policy. Step 740 can occur after any of steps 725-735. A customer decides to purchase a television for $1,000, and uses proxy card 150 to pay for the financial transaction associated with the purchase. Proxy card 150, in this example, has three associated payment accounts, with the first account having $100 remaining until its credit limit is reached, the second account having $500 remaining until its credit limit is reached, and the third account having $400 remaining until its credit limit is reached. Financial transaction platform 575 determines that no payment account has sufficient funds available to pay the purchase price of the television.

Financial transaction platform 575 determines that sufficient funds can be obtained from the combination of the three payment accounts to cover the cost of the television purchase. Financial transaction platform 575 determines that the $100 of funds available from the first payment account, along with the $500 of funds available from the second payment account and the $400 of funds available from the third payment account, can be used to pay the $1,000 cost to purchase the television. In this example, an initial payment account of the three credit payment accounts can be selected during step 725. For example, the first payment account can be selected during step 725, and step 730 can include causing the $100 in funds from the first payment account to be obtained from an account associated with the first payment account.

At step 740, financial transaction platform 575 selects the second and third payment accounts to use for the financial transaction by applying the policy. The policy, in this example, being to use multiple payment accounts when funds/credit limit available in any single account are insufficient to pay for the financial transaction, and the credit limit/ funds available from the multiple accounts associated with the proxy card are sufficient to pay for the financial transaction. The policy can select additional payment accounts for other reasons as well. For example, to obtain rewards points from the multiple payment accounts, or to spend just enough with a first payment account to trigger a reward, such as adequate frequent flyer miles to obtain travel for a vacation, and selecting a second payment account to pay for the remainder of the financial transaction.

At step 745, financial transaction platform 575 causes the funds to pay for the financial transaction to be obtained from the selected additional payment accounts. Causing the funds to be obtained from the additional payment accounts can be done in a manner similar to step 730, but done for each of the additional payment accounts. The sum of the funds obtained from the selected initial payment account and the selected additional payment accounts can correspond to the amount of the payment associated with the financial transaction.

Figure 9:
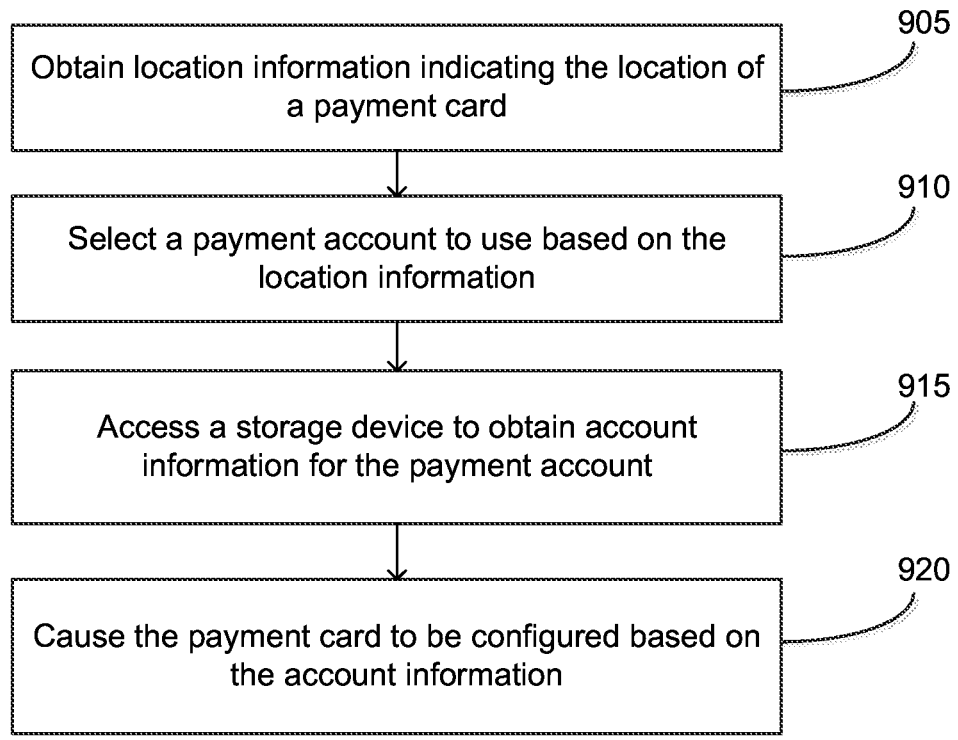
FIG. 9 is a flow chart illustrating operations of a method for selecting a payment account based on location information.
Figure 11:
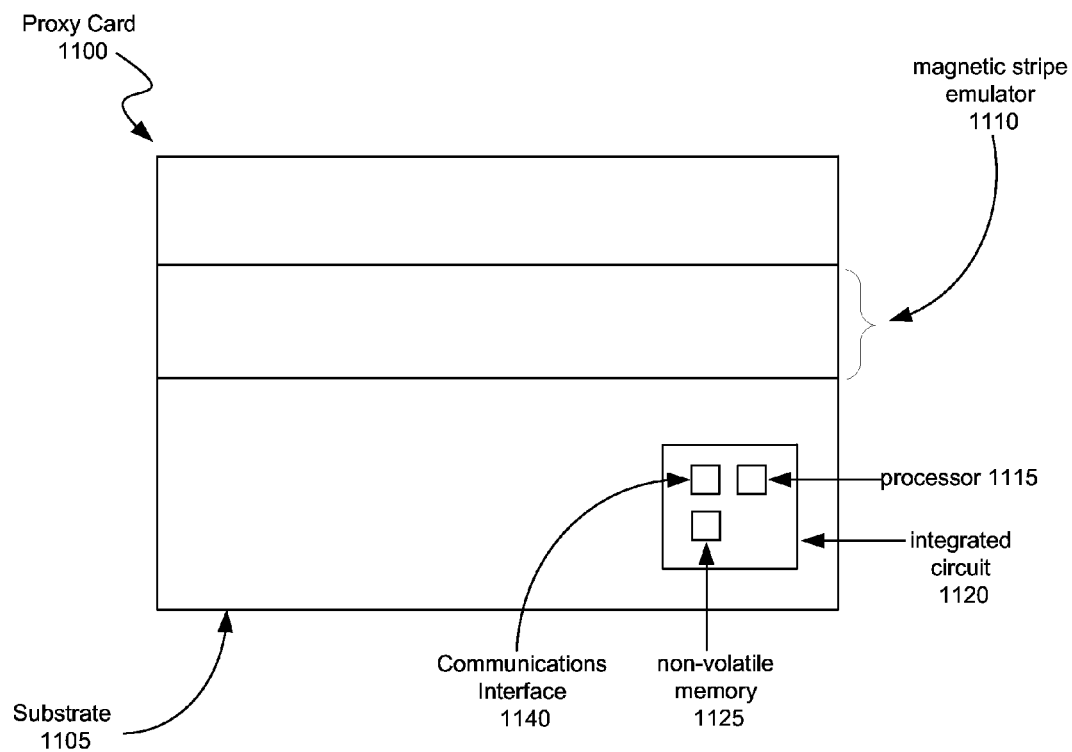
FIG. 11 is an illustration of one type of proxy card.

FIG. 9 is a flow chart illustrating operations of an example of a method for selecting a payment account based on location information. The method can involve a proxy card, such as proxy card 1100 of FIG. 11. Proxy card 1100 is a proxy card that includes a substantially flat substrate 1105, on which are affixed or embedded magnetic stripe emulator 1110 and integrated circuit 1120 containing processor 1115, non-volatile memory 1125, and communication interface 1140. Substrate 1105 can be made of the same or similar material as any ordinary credit card, such as plastic. A proxy card can also have other configurations. In various embodiments, communication interface 1140 can communicate via any of various technologies, such as a cellular network, a short-range wireless network, a wireless local area network (WLAN), etc. The cellular network can be any of various types, such as code division multiple access (CDMA), time division multiple access (TDMA), global system for mobile communications (GSM), long term evolution (LTE), 3G, 4G, etc. The short-range wireless network can also be any of various types, such as Bluetooth low energy (BLE), near field communication (NFC), etc. The WLAN can similarly be any of various types, such as the various types of IEEE 802.11 networks, among others.

As an overview of an example of the method, the example starts with the proxy card, or a computer system such as a mobile device, obtaining location information indicating the location of the proxy card. A location can take various forms, as indicated by the location information. For example, the location information can indicate a specific geographic location, or a merchant, or a merchant that accepts only VISA® credit cards. The location information can come in various forms, such as GPS coordinates indicating a specific geographic location, or a message sent by a POS system identifying the merchant, indicating that the location is at a place of business of the identified merchant. The proxy card or the computer system can select a payment account to use based on the location information, such as selecting a gift card that is accepted by the merchant when the location information indicates a place of business of the merchant. The proxy card, or the computer system, access memory or another type of storage to obtain account information to use to process the payment based on the selected payment account. When the proxy card includes a magnetic stripe emulator, the processor of the proxy card or the computer system cause the magnetic stripe emulator to emulate a magnetic stripe encoded with the account information. The proxy card is then swiped though a card reader to initiate a payment using the selected payment account.

Three examples will be discussed to facilitate explanation. The operations of the first example are performed by a payment card, which in this first example is a proxy card, such as proxy card 1100. The operations of the second example are performed by a computer system, and more specifically, by a mobile device. The operations of the third example are performed by a remote computer system (i.e., a computer system remote to the location of the proxy card).

The first example of the method of FIG. 9 begins at step 905 with the proxy card obtaining location information, such as location information indicating the location of the proxy card. The proxy card is associated with data including a credit card, a debit card, a gift card, and a driver's license. While location information can indicate a specific geographic location, such as global positioning system (GPS) coordinates received by communications interface 1140, the location information can also convey other types of location related information. For example, the location information can indicate: a specific merchant, such as Walmart®; a type of a merchant, such as a gas station or a coffee shop; a merchant having a merchant category code (MCC) with a certain value; a merchant with a certain characteristic, such as one that only accepts VISA credit cards; a location of a transmitter such as a cellular network transceiver or a WLAN transceiver; a zip code; a city; a county; a state; or a country, among other possibilities.

The circuitry embedded in or affixed to the proxy card, for example a processor embedded in the proxy card, can obtain location information indicating the location of the proxy card in any of various ways. Other devices, such as the mobile device of the second example, can similarly obtain location information. As a first example, the location information can be obtained by wirelessly receiving an MCC code from a POS system, or via a card swipe with a card reader associated with the POS system. The MCC code value indicates the category of merchant at which the proxy card is located (e.g., an MCC code of "5411" indicates that the proxy card is located at a grocery store or a supermarket). As another example, the location information can be a code sent by the POS system that identifies the merchant, such as a merchant identification number or alpha-numeric character string that can include symbols and/or other types of characters. The code indicates that the proxy card is at the merchant (i.e., at a place of business of the merchant). As another example, the location information can be any message or data received via short-range wireless transmission from a POS system of a merchant. Receiving the data sent in this manner, such as via BLE or NFC, indicates that the proxy card is at the merchant. As another example, the location information can be data received via wireless transmission that indicates crossing a geo-fence into an area associated with a merchant, which indicates that the proxy card is at the merchant. A geo-fence is a virtual perimeter of a geographic area and can be dynamically generated, such as a radius around a store or point location, a predefined set of boundaries, such as a boundary that follows the external walls of a business, etc.

As another example, the location information can be any data that indicates that the proxy card (and accordingly the customer) is traveling, such as by indicating that the proxy card is more than a predefined distance from his place of residence. For example, the location information can include a zip code, an indication of a city, county, state, or country; a signal from a cellular network transceiver, etc. that indicates that the proxy card is with a customer who is traveling. A signal from a cellular network transceiver can indicate that the proxy card is with a customer who is traveling. For example, a message from the transceiver can indicate an identity of the transceiver. The location of the transceiver can be determined be performing a database lookup based on the identity, and the location an indicate that the proxy card is with a customer that is traveling.

As another example, several pieces of location information can be combined to determine the location of the proxy card. A message received from a POS system during a purchase transaction can indicate that the proxy card is at a merchant, such as Walmart. A transmission received from a cellular network transceiver can indicate that the proxy card is near the geographic location of the transceiver, as discussed above. A processor in the proxy card can determine which Walmart store the proxy card is at based on the location of the transceiver, or the proxy card can communicate with a computer system that can make this determination.

Another way to obtain the location relating to the proxy card is from a mobile device. For example, a customer has a proxy card and a mobile device that he carries most of the time, such that the mobile device is typically located at essentially the same location as the proxy card (e.g., both are carried on the person of the customer). In this scenario, the mobile device can determine its location, such as by using any of the multiple techniques discussed above related to step 905. For example, the mobile device can determine its location using GPS, and can determine that it is within a geo-fence associated with a merchant indicating that the mobile device, as well as the proxy card, is at the merchant. Alternatively, the mobile device can determine its location using GPS and can correlate that location with a merchant's place of business, such as by correlating the GPS location with the merchant's location using a mapping service such as Google Maps®. As another alternative, the mobile device can communicate using a wireless local area network (WLAN) of a merchant, and can determine based on the WLAN that the mobile device, as well as the proxy card, is at a place of business of the merchant. For example, the mobile device can determine that a Wi-Fi network, one example of a WLAN, operated by Starbucks® is available, and can thereby determine that the mobile device, as well as the proxy card, are at Starbucks. Examples of WLANs include the various types of IEEE 802.11 networks.

In each of the above examples, once the mobile device determines its location, it can wirelessly communicate the location information to the proxy card, such as via BLE, NFC, or cellular wireless communication. As the above discussions indicate, there are a multitude of ways for a proxy card, a mobile device, or a computer system to obtain location information.

Next, at step 910, the circuitry embedded in the proxy card selects a payment card to use based on the location information. As a first example, the circuitry can select a VISA credit card payment account when the location information indicates that the proxy card is at a merchant that only accepts VISA credit cards. As another example, the circuitry can select a gift card payment account when the location information indicates that the proxy card is at a merchant that accepts the gift card. As another example, the circuitry can select a payment card that provides for a discount when used at a grocery store when the location information indicates that the proxy card is at a merchant having an MCC code value that indicates that the merchant is a grocer. As another example, the circuitry can select a payment card that the customer prefers to use when traveling, such as a payment card provided by the customer's employer, or a card that the customer indicated to use while traveling.

Alternately, a computer system, such as a mobile device, can select a payment account for the proxy card to use based on the location information. Prior to the selection, the mobile device can be used to associate the payment account information with the proxy card. The description of FIG. 10 discusses how the proxy card can be associated with payment cards. Using techniques similar to those described above related to step 910, the mobile device can select the payment account for the proxy card to use based on the location information. The mobile device can wirelessly send account information for the payment account to the proxy card, and the proxy card can select the payment account based on the mobile device's selection of the payment account, which was based on the location information.

Next, at step 915, the circuitry in the proxy card can access a storage device, such as the non-volatile memory in the proxy card, to obtain account information for the payment account. When the payment account is selected by a computer system such as the mobile device, the computer system may alternately send the account information for the payment account to the proxy card. Next, at step 920 the circuitry causes the proxy card to be configured based on the account information. In some embodiments, the proxy card includes a magnetic stripe emulator, and the circuitry causes the magnetic stripe emulator to emulate a magnetic stripe encoded with the account information by sending a signal to the magnetic stripe emulator. The magnetic stripe emulator, in response to the signal, emulates a magnetic stripe encoded with the account information.

One type of magnetic stripe emulator uses small coils of an electrical conductor encapsulated within the card body. When a current is passed through a coil in a certain direction, a magnetic field of a certain polarity is created. Changing the direction of the current flow changes the polarity of the magnetic field. The circuitry sends signals that control the current flow through each coil, including the direction of the current flow. By setting the current flow direction for each coil to a value that corresponds to the magnetic field at a corresponding location on a reference magnetic stripe, the collection of magnetic fields from each of the small coils can emulate the reference magnetic stripe. Once the magnetic stripe is encoded in this way, swiping the proxy card through a card reader enables the card reader to read the account information from the magnetic stripe area of the proxy card.

In the second example of FIG. 9, the operations are performed by a computer system, such as a mobile device. The second example of the method of FIG. 9 begins at step 905 with the mobile device obtaining location information, such as information indicating the location of the proxy card. The mobile device can obtain the location information using techniques similar to those described above related to step 905. Next, at step 910 the mobile device selects a payment account to use based on the location information. The mobile device can select the payment account to use by using techniques similar to those described above related to step 910, with the mobile device rather than the circuitry on the proxy card performing the technique. Next, at step 915, the mobile device can access a storage device to obtain account information for the payment account. The mobile device can access storage in the mobile device, such as non-volatile memory of the mobile device, or can accesses remote storage, such as via a cellular network or WLAN. Alternately, the mobile device can send a message to the proxy card indicating the selected payment account, and the proxy card can access non-volatile memory of the proxy card to obtain the account information for the payment account.

In embodiments where the proxy card includes magnetic stripe emulator 1110, the mobile device can perform step 910. At step 920, the mobile device causes the proxy card to be configured based on the account information. The proxy card includes a magnetic stripe emulator, and the mobile device sends a message to the proxy card, in response to which the circuitry in the proxy card causes the magnetic stripe emulator to emulate a magnetic stripe encoded with the account information. Once the magnetic stripe is encoded in this way, swiping the proxy card through a card reader enables the card reader to read the account information from the magnetic stripe area of the proxy card.

In the third example of FIG. 9, the operations are performed by a computer system remote to the location of the proxy card. The third example of the method of FIG. 9 begins at step 905 with the computer system obtaining location information, such as information indicating the location of the proxy card. The computer system can obtain the location information using techniques similar to those described above related to step 905. As a first example, the location information can be obtained by receiving an MCC code from a POS system sent as part of processing a purchase transaction initiated using the proxy card. As another example, the location information can be a code sent by the POS system, as part of processing a purchase transaction initiated using the proxy card, that identifies the merchant. As another example, the proxy card or the mobile device of the above two examples of FIG. 9 can obtain location information in any of the ways discussed above, and can relay the location information to the computer system.

Further, when the computer system processes payment transactions initiated using the proxy card, the computer system can obtain location information in association with processing the transactions. For example, the computer system can receive purchase transaction information for a round trip flight to a destination that leaves on a certain date and returns on a later date. The computer system can later, during the dates of the trip, receive a message from a POS system associated with a purchase transaction initiated using the proxy card. The transaction information can indicate that the proxy card is being used a Walmart, and the computer system, based on the flight information, can determine which Walmart store the proxy card is at based on the destination of the flight.

Next, at step 910 the computer system selects a payment account to use based on the location information. The computer system can select the payment account to use by using techniques similar to those described above related to step 910, with the computer system rather than the circuitry on the proxy card performing the technique. Next, at step 915, the computer system accesses a storage device to obtain account information for the payment account. The computer system accesses storage in the computer system, such as non-volatile memory of the storage device, or accesses remote storage, such as via a cellular network or WLAN. Alternately, the computer system can send a message to the proxy card indicating the selected payment account, and the proxy card can access non-volatile memory of the proxy card to obtain the account information for the payment account.

In embodiments where the proxy card includes magnetic stripe emulator 1110, the computer system can perform step 920. At step 920, the computer system causes the proxy card to be configured based on the account information. The computer system sends a message to the proxy card, in response to which the circuitry in the proxy card causes magnetic stripe emulator 1110 to emulate a magnetic stripe encoded with the account information. Once the magnetic stripe is encoded in this way, swiping the proxy card through a card reader enables the card reader to read the account information from the magnetic stripe area of the proxy card.

Figure 10:
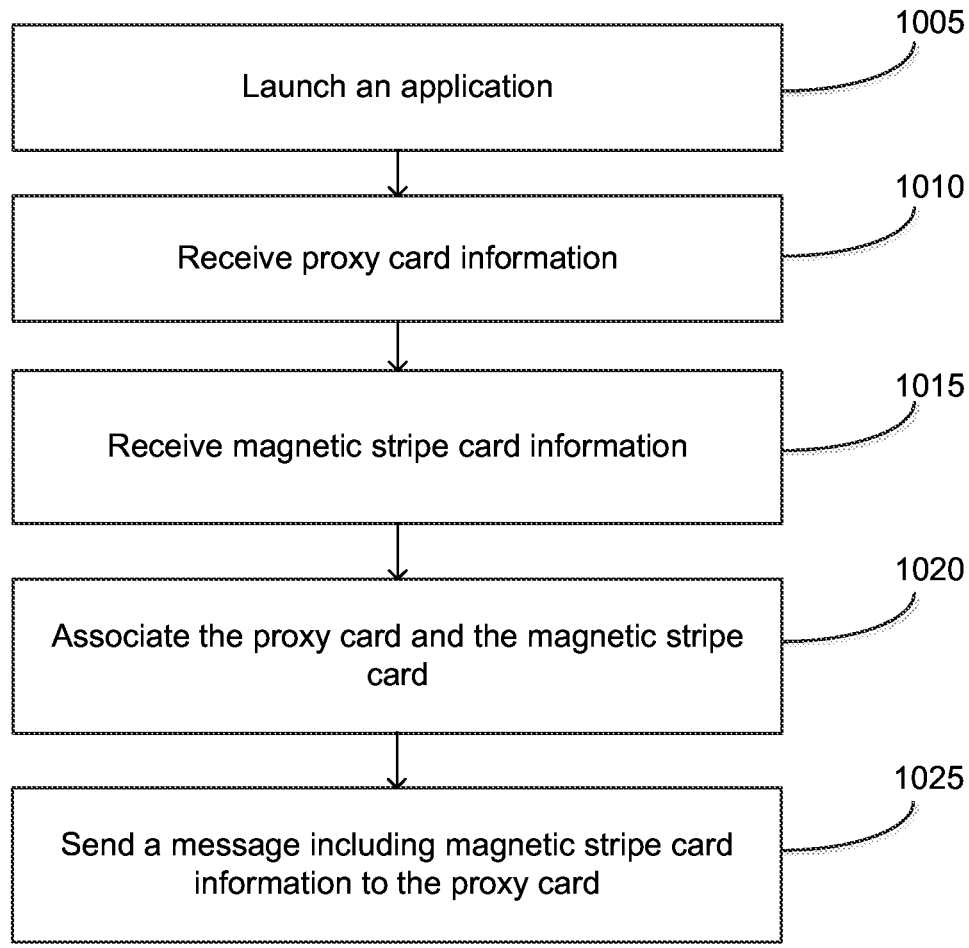
FIG. 10 is a flow chart illustrating operations of a process for associating a magnetic stripe card with a proxy card.

FIG. 10 is a flow chart illustrating operations of a method for associating a magnetic stripe card with a proxy card, such as proxy card 1100. This example method starts with a consumer's mobile device launching an application (step 1005) associated with the proxy card in response to the customer tapping the application icon on the screen of the mobile device. The consumer attaches a card reader to the mobile device and swipes proxy card 1100 through the card reader. The application receives the proxy card information (step 1010) obtained from proxy card 1100 during the card swipe. The consumer then swipes the magnetic stripe card, such as a credit card or a debit card, and the application receives the magnetic stripe card information (step 1015). In some embodiments, the application associates the proxy card and the magnetic strip card (step 1020) via a database located either in the mobile device or in a remote device. In some embodiments, the application associates the proxy card and the magnetic stripe card (step 1020) by sending the magnetic stripe card information to proxy card 1100, where the information is written to non-volatile memory 1125. Following this same procedure, multiple payment cards and other types of magnetic stripe cards, such as a driver's license or a public transportation pre-paid fee card, can be associated with the proxy card via the application.

Figure 12:
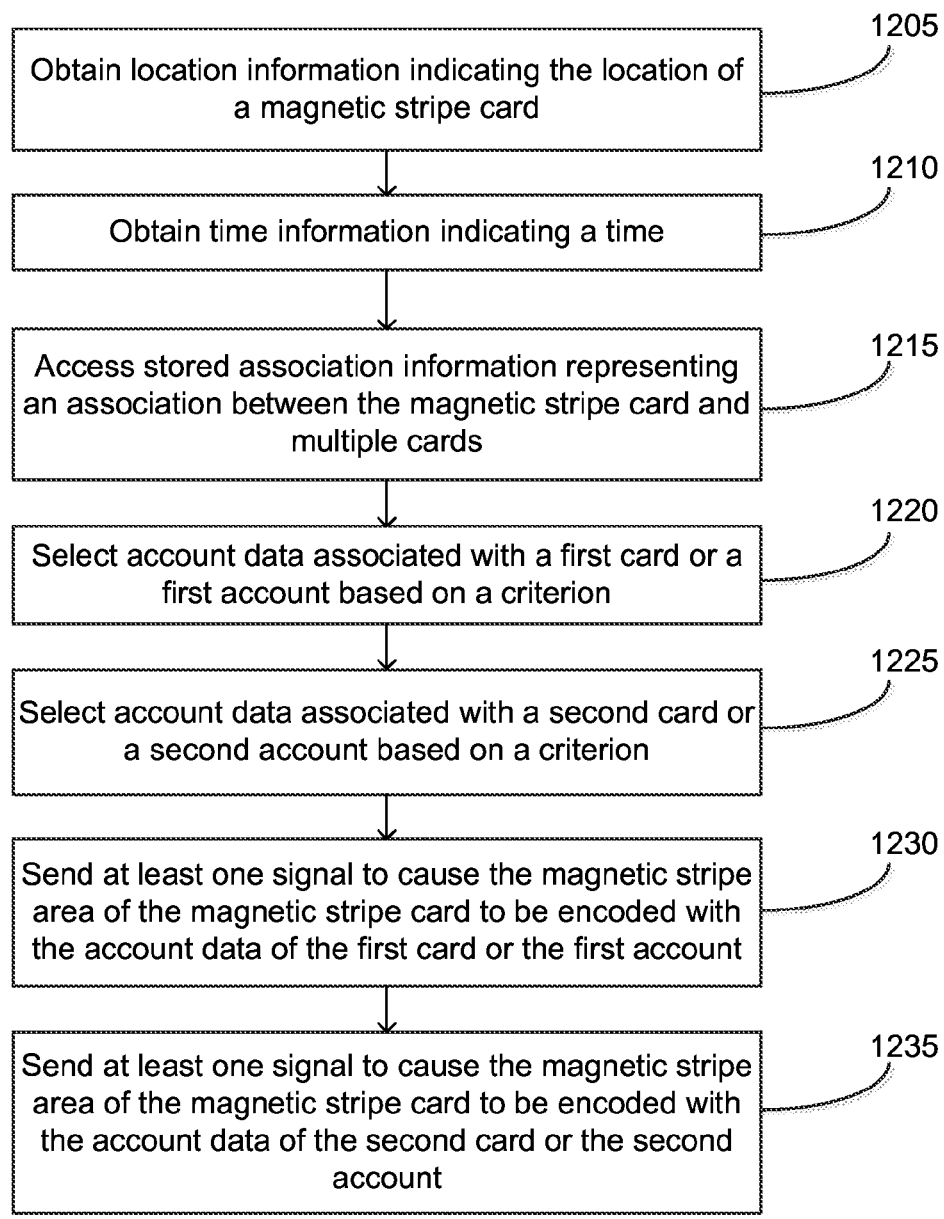
FIG. 12 is a flow chart illustrating a process for encoding a magnetic stripe area of a magnetic stripe card with data from multiple cards.

FIG. 12 is a flow chart illustrating a process for encoding a magnetic stripe of a magnetic stripe card with data from multiple cards. The method involves a magnetic stripe card, such as magnetic stripe card 1300 of FIG. 13, which can be a proxy card. An example of the method starts with the magnetic stripe card, which in this example is a payment card, being used by a consumer to make a payment at a merchant. The payment card, or a computer system such as a mobile device, obtains location information indicating the location of the payment card. A location can take any of various forms, as indicated by the location information. For example, the location information can indicate a specific geographic location, or a specific merchant, or a merchant that accepts only VISA® credit cards. The location information can be in any of various forms, such as GPS coordinates indicating a specific geographic location, a message sent by a POS system identifying the merchant and indicating that the location is a place of business of the identified merchant, etc.

The payment card or the computer system can select account data of a first card based on the location information, such as selecting a gift card that is accepted by the merchant when the location information indicates that the payment card is located at a place of business of the merchant. The account data can be data from the magnetic stripe of the first card, can be data visible on the front or back of the first card, can be stored association information that represents an association between the first card and the account data, etc. The payment card or the computer system can further select account data of a second card, and the selection can similarly be based on the location information, such as selecting a loyalty card that provides points when used at the merchant when the location information indicates the payment card is located at a place of business of the merchant. The payment card or the computer system accesses memory or another type of storage to obtain account data for both the first card and the second card.

The payment card includes a magnetic stripe emulator, and the processor of the payment card or the computer system can cause the magnetic stripe emulator to be encoded with the card information of both the first card and the second card, such that once this encoding process is complete, the magnetic stripe emulator is in a state of being encoded with the account data of both the first card and the second card. Consequently, the payment card can be swiped through a card reader, and the card reader can read in a single swipe the account data of both the first card and the second card from the magnetic stripe of the payment card.

Three examples will be discussed to facilitate explanation. The operations of the first example are performed by a magnetic stripe card, such as magnetic stripe card 1300 in FIG. 13, which is a payment card in this example. The operations of the second example are performed by a computer system, and more specifically, by a mobile device such as a smartphone. The operations of the third example are performed by a computer system, which can be a remote computer system (i.e., a computer system that is remote with respect to the location of the magnetic stripe card).

The first example of the process of FIG. 12 begins at step 1205 with the magnetic stripe card obtaining location information, such as location information indicating the location of the magnetic stripe card. The magnetic stripe card of this example is a payment card that is associated with data including a credit card, a debit card, a gift card, and a driver's license. While location information can indicate a specific geographic location, such as global positioning system (GPS) coordinates received by communications interface 1340, the location information can also convey other types of location related information. For example, the location information can indicate: a specific merchant, such as Walmart®; a type of a merchant, such as a gas station or a coffee shop; a merchant having a merchant category code (MCC) with a certain value; a merchant with a certain characteristic, such as one that only accepts VISA credit cards; a location of a transmitter such as a cellular network transceiver or a WLAN transceiver; a zip code; a city; a county; a state; or a country, among other possibilities.

Circuitry in the magnetic stripe card, such as processor 1315 or integrated circuit 1320, as well as circuitry of other devices, such as the processor of the mobile device of the second example, can obtain location information indicating the location of the magnetic stripe card in various ways. As a first example, the location information can be obtained by wirelessly receiving an MCC code from a nearby POS system, or via a card swipe with a card reader associated with the POS system. The MCC code value indicates the category of merchant at which the magnetic stripe card is located (e.g., an MCC code of "5411" indicates that the magnetic stripe card is located at a grocery store or a supermarket).

As another example, the location information can be a code sent by a POS system that identifies the merchant, such as a merchant identification number or alpha-numeric character string that can include symbols and/or other types of characters. The code indicates that the magnetic stripe card is at the merchant (i.e., at a place of business of the merchant). As another example, the location information can be any message or data received via short-range wireless transmission from a POS system of a merchant. Receiving data sent in this manner, such as via BLE, WiFi, or NFC, indicates that the magnetic stripe card is at the merchant.

As another example, the location information can be data received via wireless transmission that indicates the act of crossing a geo-fence into an area associated with a merchant, which indicates that the magnetic stripe card is at the merchant. A geo-fence is a virtual perimeter of a geographic area and can be dynamically generated, such as a radius around a store or point location, a predefined set of boundaries, such as a boundary that follows the external walls of a business, etc. The geo-fence can be generated by, for example, a merchant or a mapping service such as Google Maps. The merchant can define a perimeter of a geo-fence that identifies a location of his business. For example, the merchant can define a perimeter that follows the external walls of a building that is used by his business via a series of GPS coordinates, or that follows a circle by defining a location, such as the center of the building via a GPS coordinate, and a radius. The geo-fence can be made available to customers in any of various ways, such as by providing the geo-fence perimeter information to a mapping service that makes the geo-fence available to users, or by providing it directly via wireless transmission by a wireless transmitter of the business, among others.

As another example, the location information can be any data that indicates that the magnetic stripe card (and accordingly the customer) is traveling, such as by indicating that the magnetic stripe card is more than a predefined distance from the customer's place of residence. For example, the location information can include a zip code, an indication of a city, county, state, or country; a signal from a cellular network transceiver, etc. that indicates that the magnetic stripe card is with a customer who is traveling. A signal from a cellular network transceiver can indicate that the magnetic stripe card is with a customer who is traveling. For example, a message from the transceiver can indicate an identity of the transceiver. The location of the transceiver can be determined by performing a database lookup based on the identity, and the location can indicate that the magnetic stripe card is with a customer that is traveling. For example, if the transceiver is located 1000 miles from the customer's home, and the transceiver has a range of 20 miles, this indicates that the customer is over 980 miles from home and thereby indicates that the customer is traveling.

As another example, several pieces of location information can be combined to determine the location of the magnetic stripe card. A message received from a POS system during a purchase transaction can indicate that the magnetic stripe card is at a merchant, such as Walmart. A transmission received from a cellular network transceiver can indicate that the magnetic stripe card is near the geographic location of the transceiver, as discussed above. Circuitry in the magnetic stripe card can determine which Walmart store the magnetic stripe card is at based on the location of the transceiver, or the magnetic stripe card can communicate with a computer system that can make this determination.

Another way to obtain the location relating to the magnetic stripe card is from a mobile device. For example, a customer has a magnetic stripe card and a mobile device that he carries most of the time, such that the mobile device is typically located at essentially the same location as the magnetic stripe card (e.g., both are carried on the person of the customer). In this scenario, the mobile device can determine its location, such as by using any of the multiple techniques discussed above related to step 1205. For example, the mobile device can determine its location using GPS, and can determine that it is within a geo-fence associated with a merchant indicating that the mobile device, as well as the magnetic stripe card, is at the merchant.

Alternatively, the mobile device can determine its location using GPS and can correlate that location with a merchant's place of business, such as by correlating the GPS location with the merchant's location using a mapping service such as Google Maps®. As another alternative, the mobile device can communicate using a wireless local area network (WLAN) of a merchant, and can determine based on the WLAN that the mobile device, as well as the magnetic stripe card, is at a place of business of the merchant. For example, the mobile device can determine that a Wi-Fi network, one example of a WLAN, operated by Starbucks® is available, and can thereby determine that the mobile device, as well as the magnetic stripe card, are at Starbucks. Examples of WLANs include the various types of IEEE 802.11 networks.

In each of the above examples, once the mobile device determines its location, it can wirelessly communicate the location information to the magnetic stripe card, such as via BLE, NFC, WiFi or cellular wireless communication. As the above discussions indicate, there are a multitude of ways for a magnetic stripe card, a mobile device, or a computer system to obtain location information that indicates the location of the magnetic stripe card.

Next, at step 1210, the circuitry obtains time information indicating a time. The time information can be from any of various sources, such as a clock circuit of an integrated circuit, such as integrated circuit 1320, a transmission from a POS system, a transmission from a GPS transmitter, a transmission from a WLAN, etc. The time information can take any of various forms. For example, the time information can be a number of seconds or minutes elapsed from a reference time, and the indicated time can be calculated by adding the elapsed number of seconds or minutes to the reference time. The time can be the current time of day, and the time can include a calendar date, among others. For example, the time can be 2:30 pm, or the time can be 2:30 pm on Jan. 1, 2014.

Next, at step 1215, the circuitry accesses stored association information representing an association between the magnetic stripe card and multiple cards. Prior to step 1215, a computer system such as a mobile device can have been used to associate the account data for the multiple cards with the magnetic stripe card. The description of FIG. 10 discusses how the magnetic stripe card can be associated with multiple cards. The circuitry, for example, accesses association information stored in a memory, such as non-volatile memory 1325 or some other storage device, and determines that the magnetic stripe card is associated with the credit card, the debit card, the gift card, and the driver's license discussed in the description of step 1205.

Next, at step 1220, the circuitry selects account data associated with a first card or a first account based on a criterion. The selection of the account data associated with the first card/account can be based on, for example, a policy, as is discussed related to step 725 of FIG. 7, a random selection, an indicated time, an indicated location, an indicated location of the magnetic stripe card, the last card selected, an indication of cards that are accepted by a merchant, an indication that a card is contextually relevant, etc. The selection of the first card can be based on contextually relevant data, such as an indication of the location of the magnetic stripe card and/or an indication of the time (e.g., the time determined step 1210), which can be an indication of a time of use of the magnetic stripe card. The selection of the first card can be based on a transaction associated with the magnetic stripe card, such as being based on data that is contextually relevant to the transaction. Examples of selecting the first card based on data that is contextually relevant to the transaction include selecting the first card based on an indication of the location of the magnetic stripe card in association with the transaction, based on an indication of the time in association with the transaction, based on an indication of an item associated with the transaction, etc.

As a first example of selecting the first card based in the indicated location of the magnetic stripe card, the circuitry can select a VISA credit card payment account when the location information indicates that the magnetic stripe card is at a merchant that only accepts VISA credit cards. As another example, the circuitry can select a gift card payment account when the location information indicates that the magnetic stripe card is at a merchant that accepts the gift card. As yet another example, the circuitry can select a payment card that provides for a discount when used at a grocery store when the location information indicates that the magnetic stripe card is at a merchant having an MCC code value that indicates that the merchant is a grocer. As still another example, the circuitry can select a payment card that the customer prefers to use when traveling, such as a payment card provided by the customer's employer, or a card that the customer indicated to use while traveling.

As an example of selecting the first card based on the indicated time, when the indicated time is between 2:00 pm and 4:00 pm, the magnetic stripe card selects account data for a particular card that provides for a discount when used for a purchase between 2:00 pm and 4:00 pm. As another example, a consumer purchases airline tickets and makes a hotel reservation indicating that the consumer will be traveling between 7:00 am on Jan. 1, 2014 and 8:00 pm on Jan. 3, 2014. When the indicated time is 2:00 pm on Jan. 2, 2014, the magnetic stripe card selects account data for a particular card that the consumer uses when traveling. As an example of selecting the first card based on both the indicated location of the magnetic stripe card and the indicated time, a consumer purchases airline tickets and makes a hotel reservation indicating that he will be checking into a particular hotel between 11:00 am and 2:00 pm on Jan. 1, 2014. When the indicated time is noon on Jan. 1, 2014, and the indicated location of the magnetic stripe card is the particular hotel, the magnetic stripe card selects card/account data for the driver's license to use to check in to the hotel. Alternately, circuitry in a computer system, such as a mobile device, can select card/account data of the first card to use based on the location information.

As examples of selecting the first card based on an item associated with the transaction, when the transaction involves purchasing an airline ticket or gasoline, a first card that provides for a discount when used for airline ticket purchases or for gasoline purchases can be selected. As another set of examples, when the transaction involves purchasing an airline ticket from an airline or a coffee from a particular merchant, a loyalty program account that provides loyalty program credits/points when used to purchase the airline ticket from the airline, or the coffee from the particular merchant, can be selected.

Next, at step 1225, the circuitry selects account data associated with a second card or a second account based on a criterion. The criterion can be any of the criteria discussed above or a different criterion. Further, the criterion can be the same as the criterion of step 1220 or can be different. Alternately, circuitry in a computer system, such as a mobile device, select the account data of the second card. Using techniques similar to those described above, the circuitry can select the account data for both the first and the second cards to use. When the circuitry is in, for example, the mobile device, the mobile device can wirelessly send account data for both the first and the second cards to the magnetic stripe card. The magnetic stripe card can select the account data for the first and second cards based on the mobile device's selection of the account data for the first and the second cards, which was based on criteria, such as the location information indicating the location of the magnetic stripe card, or the time.

Next, at step 1230, the circuitry sends at least one signal to cause the magnetic stripe area of the magnetic stripe card to be encoded with the account data of the first card. The magnetic stripe card of this example includes a magnetic stripe emulator, and the circuitry causes the magnetic stripe emulator to be encoded with the account data of the first card.

In some embodiments, magnetic stripe area 1310 includes three tracks, designated as "track 1" 1330, "track 2" 1335, and "track 3" 1340. Many payment cards, such as credit cards or debit cards, have a magnetic stripe that includes two tracks, such as a magnetic stripe that includes track 1 1330 and track 2 1335. Other cards have a magnetic stripe that includes three tracks, as does magnetic stripe card 1300 illustrated in FIG. 13. Many card readers are able to read a magnetic stripe that includes three tracks, and in cases where the payment card includes a magnetic stripe with only two tracks, the card reader's ability to read a third track is unused. When magnetic stripe card 1300 is encoded with account data of a payment card that uses two tracks, the account data of the payment card can be encoded in track 1 1330 and track 2 1335. Track 3 1340 of magnetic stripe card 1300 may be unused and devoid of valid data in such a situation.

Next, at step 1235, the circuitry sends at least one signal to cause the magnetic stripe area of the magnetic stripe card to be encoded with the account data of the second card. The circuitry causes the magnetic stripe emulator to be encoded with the account data of the second card, such that the magnetic stripe emulator has encoded account data of both the first and the second cards at the same time. For example, the account data of the first card can be encoded in track 1 1330 and track 2 1335, and the account data of the second card can be encoded in track 3 1340, With the magnetic stripe card encoded with account data from both the first card and the second card, the card reader can read the account data of both the first and second cards from the magnetic stripe of the magnetic stripe card with a single swipe of the magnetic stripe card through the card reader.

In one illustrative use case, a consumer purchases groceries at a local grocer that issues loyalty cards to customers. In the past, when the customer made a purchase, the customer first swiped the loyalty card through the card reader, and then swiped a credit or debit card through the reader. Using the magnetic stripe card of this example, the magnetic stripe card first selects a payment card based on a criterion, such as selecting a credit or debit card having access to sufficient funds to use for the purchase. Based on the magnetic stripe card being at the grocer, the magnetic stripe card selects the loyalty card issued by the grocer and encodes the magnetic stripe emulator with account data of both the payment card and the loyalty card. With just one swipe of the magnetic stripe card through the grocer's card reader, therefore, the card reader is able to read account data for both the payment card and the loyalty card to use for the grocery purchase.

In the second example of FIG. 12, the operations are performed by a computer system, such as a mobile device. The operations can be performed by a processor, an integrated circuit, or other circuitry of the mobile device. The second example of the method of FIG. 12 begins at step 1205 with the mobile device obtaining location information, such as information indicating the location of the magnetic stripe card. The mobile device can obtain the location information using techniques similar to those described above related to step 1205. Next, at step 1210 the mobile device obtains time information indicating a time. The mobile device can obtain the time information using techniques similar to those discussed above related to step 1210. Next, at step 1215, the mobile device accesses stored association information representing an association between the magnetic stripe card and multiple cards. The association information can be stored in a memory of the mobile device, or on some other storage device accessible to the mobile device, and can server the same purposes as described above related to step 1215.

Next. at step 1220 the mobile device selects account data associated with a first card or a first account based on a criterion. The mobile device can select the account data of the first card using techniques similar to those described above related to step 1220, with the mobile device rather than the circuitry of the magnetic stripe card performing the techniques. Next. at step 1225 the mobile device selects account data associated with a second card or a second account based on a criterion. The mobile device can select the account data of the second card using techniques similar to those described above related to step 1225, with the mobile device rather than the circuitry of the magnetic stripe card performing the technique.

Next, at step 1230, the mobile device sends at least one signal or message to cause the magnetic stripe area of the magnetic stripe card to be encoded with the account data of the first card. For example, the circuitry sends a message via BLE, WiFi, NFC or a cellular network that is received by communications interface 1340, and that causes magnetic stripe emulator 1310 to be encoded with the account data of the first card. The mobile device can send the at least one signal using techniques similar to those described above related to step 1230, with the mobile device rather than the circuitry of the magnetic stripe card performing the techniques. Next, at step 1235, the mobile device sends at least one signal or message to cause the magnetic stripe area of the magnetic stripe card to be encoded with the account data of the second card. The mobile device can send the at least one signal using techniques similar to those described above related to step 1230, with the mobile device rather than the circuitry of the magnetic stripe card performing the techniques.

In the third example of FIG. 12, the operations are performed by a computer system other than a mobile device, such as via a processor, an integrated circuit, or other circuitry of the computer system. The computer system can be located remotely from the magnetic stripe card at the time when the steps of the process of FIG. 12 are being performed. The third example of the process of FIG. 12 begins at step 1205 with the computer system obtaining location information, such as information indicating the location of the magnetic stripe card. The computer system can obtain the location information using techniques similar to those described above related to step 1205. As a first example, the location information can be obtained by receiving an MCC code from a POS system sent as part of processing a purchase transaction initiated using the magnetic stripe card. As another example, the location information can be a code sent by the POS system, as part of processing a purchase transaction initiated using the magnetic stripe card, that identifies the merchant. As another example, the magnetic stripe card or the mobile device of the above two examples of FIG. 12 can obtain location information in any of the ways discussed above, and can relay the location information to the computer system.

Further, when the computer system processes payment transactions initiated using the magnetic stripe card, the computer system can obtain location information in association with processing the transactions. For example, the computer system can receive purchase transaction information for a round trip flight to a destination that leaves on a certain date and returns on a later date. The computer system can later, during the dates of the trip, receive a message from a POS system associated with a purchase transaction initiated using the magnetic stripe card. The transaction information can indicate that the magnetic stripe card is being used a Walmart, and the computer system, based on the flight information, can determine which Walmart store the magnetic stripe card is at based on the destination of the flight.

Next, at step 1210, the computer system obtains time information indicating a time. The computer system can obtain the time information using techniques similar to those described above related to step 1210. Next, at step 1215, the computer system accesses stored association information representing an association between the magnetic stripe cards and multiple cards. For example, the computer system access association information stored in a memory or some other accessible storage device containing a database that links card data of the magnetic stripe card with account data of the multiple cards. Next, at step 1220, the computer system selects account data associated with a first card or a first account based on a criterion. The computer system can select the account data of the first card using techniques similar to those described above related to step 1220, with the computer system rather than the circuitry of the magnetic stripe card performing the technique. Next, at step 1225 the computer system selects account data associated with a second card or a second account based on a criterion. The computer system can select the account data of the second card using techniques similar to those described above related to step 1225, with the computer system rather than the circuitry of the magnetic stripe card performing the technique.

Next, at step 1230, the computer system sends at least one signal or message to cause the magnetic stripe area of the magnetic stripe card to be encoded with the account data of the first card. For example, the computer system sends a message via a cellular network that is received by communications interface 1340, and that causes magnetic stripe emulator 1310 to be encoded with the account data of the first card. As a second example, the computer system sends a message via a cellular network to the mobile device, and the mobile device sends the message via short range wireless communication to the magnetic stripe card. As a third example, the computer system sends a message via a network to a POS system of the merchant, and the POS system sends the message via short range wireless communication to the magnetic stripe card.

Next, at step 1235, the mobile device sends at least one signal or message to cause the magnetic stripe area of the magnetic stripe card to be encoded with the account data of the second card. The mobile device can send the at least one signal or message using techniques similar to those described above related to step 1230 of this example.

Figure 13:
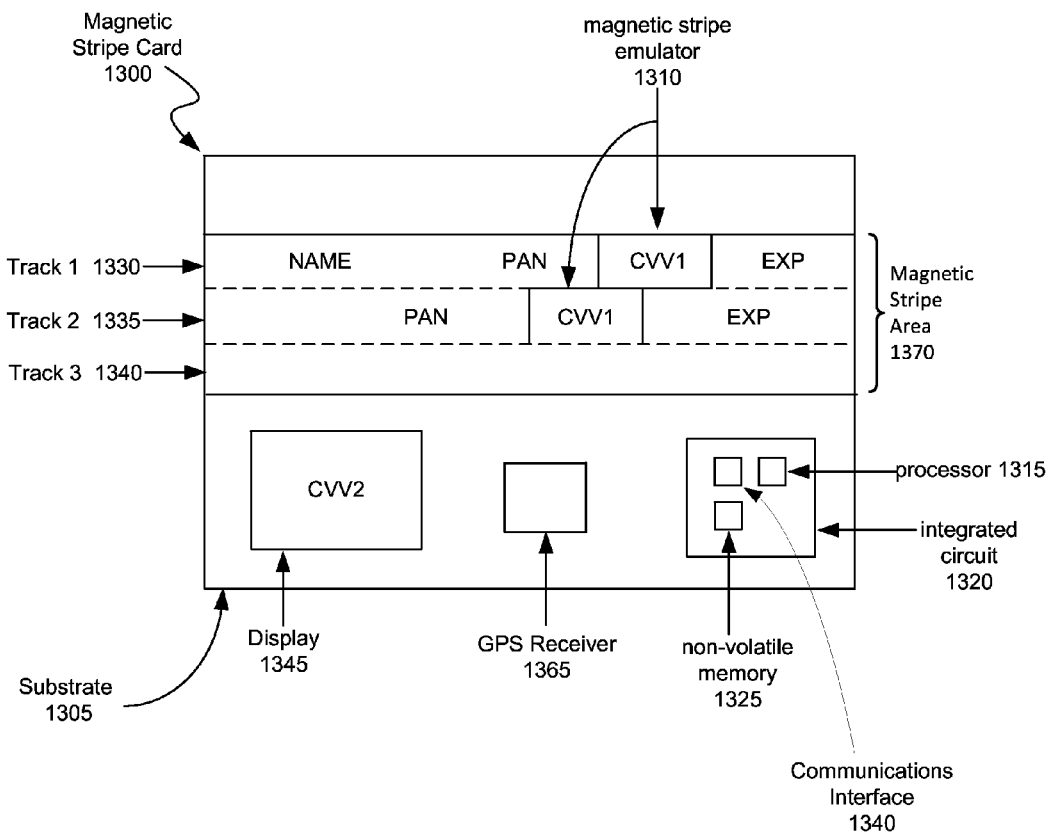
FIG. 13 is an illustration of a magnetic stripe card including a magnetic stripe emulator.

FIG. 13 is an illustration of a magnetic stripe card that includes a magnetic stripe emulator. Magnetic stripe card 1300 of this example is a payment card, and can be a proxy card. Magnetic stripe card 1300 includes substantially flat substrate 1305, on which is affixed or in which is embedded magnetic stripe emulator 1310, integrated circuit 1320 containing processor 1315, non-volatile memory 1325, and communication interface 1340. In some embodiments, any of processor 1315, non-volatile memory 1325, and/or communications interface 1340 are discrete components. In some embodiments, magnetic stripe card 1300 includes GPS receiver 1365 and/or display 1345. GPS receiver 1365 can be a discrete component or can be integrated in integrated circuit 1320. Substrate 1305 can be made of the same or similar material as any ordinary credit card, such as plastic. Integrated circuit 1320, processor 1315, non-volatile memory 1325, and communications interface 1340 are respectively similar to integrated circuit 1120, processor 1115, non-volatile memory 1125, and communications interface 1140 of FIG. 11. In some embodiments, magnetic stripe area 1370 includes three data tracks, track 1 1330, track 2 1335, and track 3 1340.

In some embodiments, magnetic stripe emulator 1310 emulates the magnetic stripe of a payment card, such as a credit card. When emulating some payment cards, track 1 1330 includes the name (e.g. "NAME" in FIG. 13) of the card holder, the PAN (Primary Account Number) of the credit account of the card holder, the CVV1 (Card Verification Value 1, also referred to as CVC1 or Card Verification Code 1) of the card, and the Expiration date (EXP) of the card. For some payment cards, the PAN, CVV1, and EXP are repeated on track 2 1335. Display 1345 can be used to display various items, such as CVV2 (Card Verification Value 2, also referred to as CVC2 or Card Verification Code 2), the name of the currently selected card (e.g. the name as indicated by the card holder), etc. A payment card that includes a magnetic stripe emulator can have various other configurations.

Figure 14:
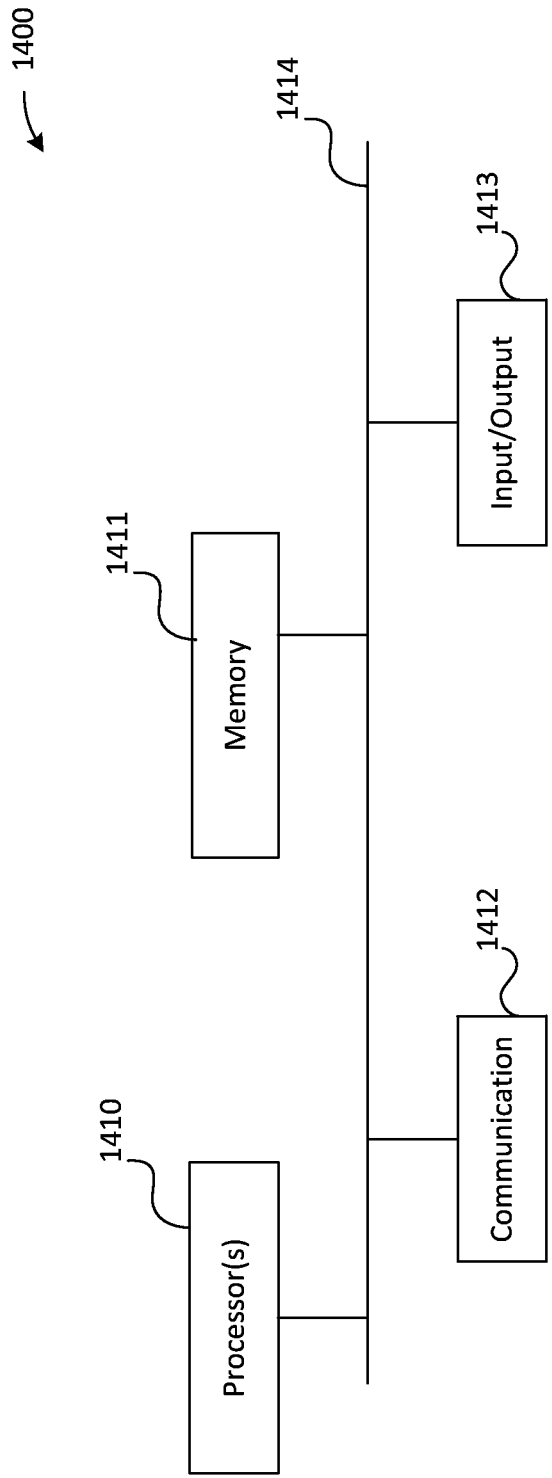
FIG. 14 is a high-level block diagram showing an example of processing system in which at least some operations related to a selecting a preferred payment mechanism can be implemented.

FIG. 14 is a high-level block diagram showing an example of a processing device 1400 that can represent any of the devices described above, such as POS system 158, computer system 170, proxy card 1100, magnetic stripe card 1300, or the mobile devices referred to in the descriptions of FIGS. 9 and 12. Any of these systems may include two or more processing devices such as represented in FIG. 14, which may be coupled to each other via a network or multiple networks.

In the illustrated embodiment, the processing system 1400 includes one or more processors 1410, memory 1411, a communication device 1412, and one or more input/output (I/O) devices 1413, all coupled to each other through an interconnect 1414. In some embodiments, the processing system 1400 may not have any I/O devices 1413. The interconnect 1414 may be or include one or more conductive traces, buses, point-to-point connections, controllers, adapters and/or other conventional connection devices. The processor(s) 1410 may be or include, for example, one or more general-purpose programmable microprocessors, microcontrollers, application specific integrated circuits (ASICs), programmable gate arrays, or the like, or a combination of such devices. The processor(s) 1410 control the overall operation of the processing device 1400. Memory 1411 may be or include one or more physical storage devices, which may be in the form of random access memory (RAM), read-only memory (ROM) (which may be erasable and programmable), non-volatile memory such as flash memory, miniature hard disk drive, or other suitable type of storage device, or a combination of such devices. Memory 1411 may store data and instructions that configure the processor(s) 1410 to execute operations in accordance with the techniques described above. The communication device 1412 may be or include, for example, an Ethernet adapter, cable modem, Wi-Fi adapter, cellular transceiver, Bluetooth transceiver, or the like, or a combination thereof. Depending on the specific nature and purpose of the processing device 1400, the I/O devices 1413 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method comprising:
  receiving, by a payment card, a wireless transmission that includes an indication of a location of the payment card relative to a geo-fence,
    the payment card being associated with account data associated with a plurality of cards including any two or more of a credit card, a debit card, an automated teller machine (ATM) card, a stored value card, a loyalty program card, a library card, or an identification card,
    the payment card including a magnetic stripe area that can be read by a magnetic stripe card reader associated with a point-of-sale (POS) system of a merchant,
    the magnetic stripe area having three parallel data tracks including a first data track, a second data track, and a third data track, the first data track being adjacent to the second data track, and the second data track being adjacent to the third data track;
  sending, by the payment card, at least one signal, to cause the account data associated with a first card of the plurality of cards to be applied to the first data track and the second data track, and to enable the payment card to initiate a payment based on an account associated with the first card;
  selecting, by the payment card and based on the indication of the location of the payment card relative to the geo-fence, account data of a second account to use in association with the financial transaction; and
  sending, by the payment card, at least one signal to cause information associated with the second account to be applied to the third data track of the magnetic stripe area, the magnetic stripe area having the account data associated with the first card and the information associated with the second account at a same time.

2. The method of claim 1,
  wherein the indication of the location of the payment card relative to the geo-fence further indicates that the payment card is at a place of business of the merchant,
  wherein the loyalty program card is associated with a loyalty program that provides rewards points when the loyalty program card is used in association with a transaction involving the merchant,
  wherein selecting the account data of the second account includes selecting, based on the indication that the payment card is at the place of business of the merchant, the account data of the loyalty program card, and
  wherein sending the at least one signal to cause the information associated with the second account to be applied to the third data track includes sending the at least one signal to cause the information associated with the loyalty program card to be applied to the magnetic stripe area.

3. The method of claim 2, wherein the payment card is associated with account data of a first credit card that is accepted by the merchant and further is associated with account data of a second credit card that is not accepted by the merchant, the method further comprising:
  selecting, by the payment card, the account data of the first credit card based on the indication that the payment card is at the place of business of the merchant,
  wherein sending the at least one signal to cause the account data associated with the first card of the plurality of cards to be applied to the first data track and the second data track includes sending the at least one signal to cause the account data associated with the first credit card to be applied to the first data track and the second data track.

4. A method comprising:
  selecting, by circuitry, account data associated with a first account, to be applied to a magnetic stripe area of a magnetic stripe card;
  selecting, by the circuitry, account data associated with a second account, based on an indicated location of the magnetic stripe card relative to a geo-fence, to be applied to the magnetic stripe area of the magnetic stripe card; and
  sending at least one signal to cause the account data associated with the first account and the account data associated with the second account to be applied to the magnetic stripe area of the magnetic stripe card, such that after being so applied the magnetic stripe area of the magnetic stripe card has the account data associated with the first account and the account data associated with the second account.

5. The method of claim 4, wherein the causing the account data associated with the first account and the account data associated with the second account to be applied to the magnetic stripe area of the magnetic stripe card includes causing the account data associated with the first account and the account data associated with the second account to be applied to the magnetic stripe area of the magnetic stripe card such that the account data associated with the first account and the account data associated with the second account both can be read from the magnetic stripe area of the magnetic stripe card by a card reader in a single card read event.

6. The method of claim 4,
wherein the first account is associated with a payment card of a payer,
wherein the selection of the account data associated with the first account includes selecting the account data associated with the first account to use for a financial transaction involving the payer,
wherein the circuitry is in a mobile device of the payer, and
wherein the sending of the at least one signal includes the mobile device sending the at least one signal.

7. The method of claim 4,
wherein the first account is associated with a payment card of a payer,
wherein the selection of the account data associated with the first account includes selecting the account data associated with the first account to use for a financial transaction involving the payer,
wherein the circuitry is affixed to or embedded in the magnetic stripe card, and
wherein the sending of the signal includes the magnetic stripe card sending the signal.

8. The method of claim 4, wherein the circuitry is in a computer system, and the sending of the signal includes the computer system sending the signal, the method further comprising:
accessing, by the computer system, stored association information representing an association between the magnetic stripe card and a plurality of accounts, the plurality of accounts including the first account, wherein the selection of the account data associated with the first account is based on the association information.

9. The method of claim 4, wherein the second account is associated with a payment card of a payer and the magnetic stripe card is a payment card of the payer, wherein the selection of the account data of the second account includes selecting the account data of the second account to use for a financial transaction involving the payer, the method further comprising:
obtaining an indication that the magnetic stripe card is at a place of business of a merchant, whereby the magnetic stripe card being at the place of business of the merchant indicates that the magnetic stripe card may be used for the financial transaction,
wherein the selection of the account data of the second account includes selecting the account data of the second account based on the indication that the magnetic stripe card is at the place of business of the merchant.

10. The method of claim 4, further comprising:
obtaining an indication of a time of use of the magnetic stripe card, wherein the selection of the account data associated with the second account includes selecting the account data associated with the second account based on the indicated time of use of the magnetic stripe card.

11. The method of claim 4, wherein the circuitry is in a remote computer system that is located remotely from the magnetic stripe card when the at least one signal is sent, and the sending of the signal includes the computer system sending the signal, the method further comprising:
receiving, by the computer system, card data of the magnetic stripe card prior to the selection of either the account data associated with the first account or the account data associated with the second account; and
accessing, based on the card data, stored association information representing an association between the magnetic stripe card and a plurality of accounts, the plurality of accounts including the first account, wherein the selection of the account data associated with the first account is based on the association information.

12. The method of claim 4, wherein the selection of the account data associated with the first account includes selecting the account data associated with the first account based on any of a location of the magnetic stripe card, a time at the location of the magnetic stripe card, an identity of the first account, or an item associated with a financial transaction involving a payment based on the magnetic stripe card.

13. The method of claim 4, further comprising:
obtaining an indication of a time of use of the magnetic stripe card, wherein the selection of the account data associated with the second account includes selecting the account data associated with the second account based on the indicated time of use of the magnetic stripe card.

14. The method of claim 4, wherein selecting the account data associated with the second account includes selecting the account data associated with the second account based on a context of the transaction.

15. The method of claim 14, wherein selecting the account data associated with the second account includes selecting the account data associated with the second account based on any of an indicated time, or an identity of the first account, or an item associated with a financial transaction involving a payment based on the magnetic stripe card.

16. A system comprising:
a processor;
a communication interface coupled to the processor, through which to communicate over a network with remote devices; and
a memory coupled to the processor, the memory storing instructions which when executed by the processor cause the system to perform operations including:
receiving card data of a magnetic stripe card;
accessing, based on the card data, stored association information representing an association between the magnetic stripe card and a plurality of cards, the plurality of cards including a first card;
based on the association information, selecting account data associated with the first card, to be applied to a magnetic stripe area of the magnetic stripe card;
selecting account data associated with a second account based on any of an indication of a location of the magnetic stripe card relative to a geo-fence, or an indicated time, the account data associated with the second account to be applied to the magnetic stripe area of the magnetic stripe card; and
sending at least one message to cause the account data associated with the first card and the account data associated with the second account to be applied to the magnetic stripe area of the magnetic stripe card, such that after being so applied the magnetic stripe area has the account data associated with the first card and the account data associated with the second account.

17. The system of claim 16,
wherein the first card and the magnetic stripe card are payment cards of a payer, wherein the selection of the account data associated with the first card includes selecting the account data associated with the first card to use for a financial transaction involving the payer, and wherein the system is a mobile device of the payer.

18. The system of claim 16, wherein the second account is associated with a payment card of a payer and the magnetic stripe card is a payment card of the payer, wherein the selection of the account data associated with the second account includes selecting the account data associated with the second account to use for a financial transaction involving the payer and a merchant, wherein the operations further include:

receiving the indication of the location of the magnetic stripe card relative to the geo-fence, wherein the indication of the location of the magnetic stripe card relative to the geo-fence further indicates that the magnetic stripe card is at a place of business of the merchant, and wherein the selection of the account data associated with the second account includes selecting the account data associated with the second account based on the indication that the magnetic stripe card is at the place of business of the merchant.

19. A magnetic stripe card comprising:

a substantially flat substrate, a processor coupled to the substrate;

a magnetic stripe emulator coupled to the processor;

a communication interface coupled to the processor, through which to communicate over a network with remote devices;

a memory coupled to the processor, the memory storing instructions which when executed by the processor cause the magnetic stripe card to perform operations including:

accessing stored association information representing an association between the magnetic stripe card and a plurality of cards, the plurality of cards including a first card;

selecting, based on the association information, account data associated with the first card;

selecting account data associated with a second account based on an indication of a location of the magnetic stripe card relative to a geo-fence; and sending at least one signal to the magnetic stripe emulator to cause the account data associated with the first card and the account data associated with the second account to be applied to the magnetic stripe area of the magnetic stripe card, such that after being so applied the magnetic stripe area has the account data associated with the first card and the account data associated with the second card.

20. The magnetic stripe card of claim 19, wherein the magnetic stripe card is a first payment card of a payer, the second account is associated with a second payment card of the payer, and the second payment card is further a stored value card valid at a merchant, the operations further including:

receiving an indication that the magnetic stripe card is located at the merchant, wherein the indication that the magnetic stripe card is located at the merchant is the indication of the location of the magnetic stripe card relative to the geo-fence.

21. The magnetic stripe card of claim 19, wherein the operations further include:

receiving a signal that indicates the location of the magnetic stripe card relative to the geo-fence, wherein the signal was received from any of a point of sale (POS) system via short-range wireless transmission, a global positioning system (GPS) transmitter, a server via transmission over a wireless local area network (WLAN), or a cellular network transceiver.

22. The magnetic stripe card of claim 19, further comprising:

a GPS receiver coupled to the processor.

23. A method comprising:

receiving, by a transaction processing system and from a point of sale (POS) system, object information associated with a payment object of a payer, and transaction information associated with a financial transaction involving a payment made via the payment object, wherein the payment object is associated with a plurality of accounts, including a first account and a second account, and wherein the transaction processing system receives financial transactions from a plurality of merchants, and processes the financial transactions;

selecting, by the transaction processing system, account data associated with the first account to use for the payment;

selecting, by the transaction processing system, account data associated with the second account based on location information that indicates a location of the payment object;

transmitting, by the transaction processing system and to the POS system, information associated with the first account to use to obtain funds for the payment; and transmitting, by the transaction processing system and to the POS system, information associated with the second account to use in association with the financial transaction.

24. The method of claim 23, further comprising:

accessing, by the transaction processing system, stored association information representing an association between the payment object and a plurality of financial accounts of the payer, wherein the selection of the account data associated with the first account includes selecting the account data associated with the first account based on the association information.

25. The method of claim 23, wherein the selection of the account data associated with the first account includes selecting the account data associated with the first account based on a selection made by the payer, the method further comprising:

causing, by the transaction processing system, information associated with the plurality of financial accounts to be displayed on a mobile device associated with the payer to facilitate a selection to be made by the payer; and receiving an indication, by the transaction processing system, of the selection made by the payer using the mobile device.

26. The method of claim 23, wherein the financial transaction involves the payer and a payee, and wherein transmitting the information associated with the second account to use in association with the financial transaction includes transmitting the information associated with the second account to use in association with a loyalty program that provides loyalty program credits when used in association with financial transactions that include the payee.

* * * * *